(12) United States Patent
Nakano et al.

(10) Patent No.: US 12,549,067 B2
(45) Date of Patent: Feb. 10, 2026

(54) POWER GENERATION MODULE AND REMOTE CONTROL DEVICE

(71) Applicant: TOTO LTD., Kitakyushu (JP)

(72) Inventors: Yukimasa Nakano, Kitakyushu (JP);
Takashi Maeno, Kitakyushu (JP);
Takashi Iwanaga, Kitakyushu (JP);
Shingo Hashimoto, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 119 days.

(21) Appl. No.: 18/449,077

(22) Filed: Aug. 14, 2023

(65) Prior Publication Data
US 2024/0072608 A1 Feb. 29, 2024

(30) Foreign Application Priority Data

| Aug. 23, 2022 | (JP) | 2022-132524 |
| Mar. 17, 2023 | (JP) | 2023-043401 |
| May 31, 2023 | (JP) | 2023-089956 |

(51) Int. Cl.
*H02K 7/18* (2006.01)
*H01H 13/04* (2006.01)
*H01H 13/14* (2006.01)
*H02K 7/07* (2006.01)

(52) U.S. Cl.
CPC .......... *H02K 7/1853* (2013.01); *H01H 13/04* (2013.01); *H01H 13/14* (2013.01); *H02K 7/07* (2013.01)

(58) Field of Classification Search
CPC .......... H02K 7/1853; H02K 7/07; H02K 7/10; H02K 2213/03; H01H 13/04; H01H 13/14
See application file for complete search history.

(56) References Cited

U.S. PATENT DOCUMENTS

| 7,031,230 | B1 | 4/2006 | Nagasaka et al. | |
| 7,834,471 | B2 | 11/2010 | Cripps | |
| 2004/0119351 | A1* | 6/2004 | Schwarzli | H02K 7/1853 |
| | | | | 310/83 |
| 2013/0175806 | A1 | 7/2013 | Tsuneyoshi | |
| 2013/0270092 | A1 | 10/2013 | Kaneko et al. | |
| 2018/0316244 | A1 | 11/2018 | Fukumoto | |
| 2021/0079690 | A1* | 3/2021 | Von Matern | H02K 7/1853 |

FOREIGN PATENT DOCUMENTS

| CN | 1296579 A | 5/2001 |
| JP | 2004-211642 A | 7/2004 |
| JP | 2012-080702 A | 4/2012 |
| JP | 2018-191402 A | 11/2018 |
| WO | 01/67580 A2 | 9/2001 |

* cited by examiner

*Primary Examiner* — Tulsidas C Patel
*Assistant Examiner* — Joshua Kiel M Rodriguez
(74) *Attorney, Agent, or Firm* — McDonald Hopkins LLC

(57) ABSTRACT

A power generation module includes an input part, an elastic member, generator, a rotatable member, a transmission part, and a lock part. The elastic member stores energy input to the input part. The generator generates power when a rotor of the generator is rotated. The rotatable member rotates the rotor. The transmission part transmits the energy stored in the elastic member to the rotatable member. The lock part restricts a rotation of the rotor by the transmission part. The energy is stored in the elastic member by the lock part restricting the rotation of the rotor while the input part moves from an initial position to a prescribed position. The restriction of the rotor by the lock part is released and the rotor is rotated by the energy stored in the elastic member when the input part moves to the prescribed position.

14 Claims, 48 Drawing Sheets

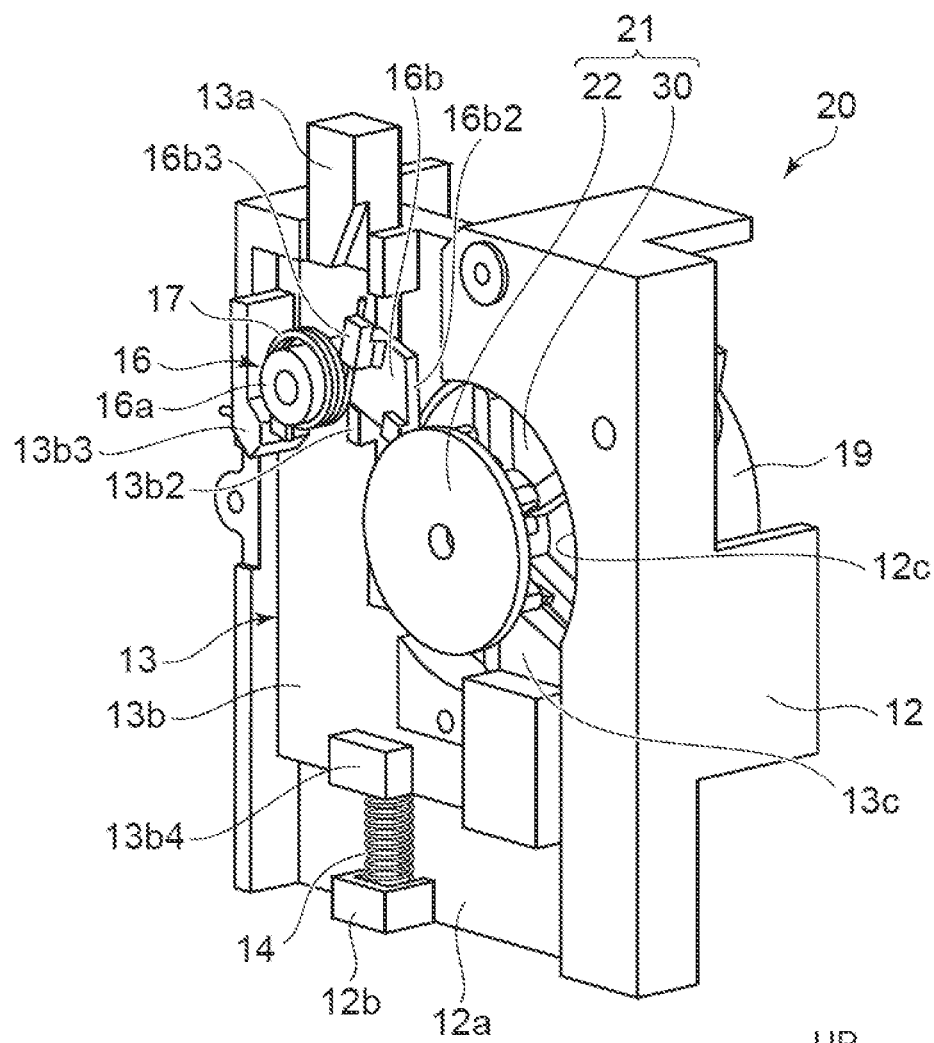
FIG. 10
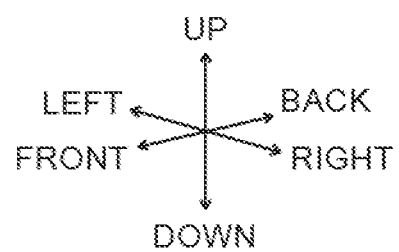

POWER GENERATION MODULE AND REMOTE CONTROL DEVICE

CROSS-REFERENCE TO RELATED APPLICATIONS

This application is based upon and claims the benefit of priority from Japanese Patent Application No. 2022-132524, filed on Aug. 23, 2022; the entire contents of which are incorporated herein by reference.

This application is based upon and claims the benefit of priority from Japanese Patent Application No. 2023-043401, filed on Mar. 17, 2023; the entire contents of which are incorporated herein by reference.

This application is based upon and claims the benefit of priority from Japanese Patent Application No. 2023-089956, filed on May 31, 2023; the entire contents of which are incorporated herein by reference.

FIELD

Embodiments described herein relate generally to a power generation module and a remote control device.

BACKGROUND

A power generation module is known in which an operation by a user generates power by rotating a generator.

In the power generation module, there is a risk that energy loss of the operating force may occur and the operationability may degrade because the generator and/or magnets rotate when the operating force is being input (when storing energy). Also, there is a risk that the operationability may degrade because the power generation module cannot generate power until the operating force is released.

SUMMARY

According to the embodiment, a power generation module includes an input part, an elastic member, generator, a rotatable member, a transmission part, and a lock part. The elastic member stores energy input to the input part. The generator generates power when a rotor of the generator is rotated. The rotatable member rotates the rotor. The transmission part transmits the energy stored in the elastic member to the rotatable member. The lock part restricts a rotation of the rotor by the transmission part. The energy is stored in the elastic member by the lock part restricting the rotation of the rotor while the input part moves from an initial position to a prescribed position. The restriction of the rotor by the lock part is released and the rotor is rotated by the energy stored in the elastic member when the input part moves to the prescribed position.

BRIEF DESCRIPTION OF THE DRAWINGS

FIG. 10 is a perspective view showing the power generation module according to the second embodiment of the invention.

DETAILED DESCRIPTION

Figure 1:
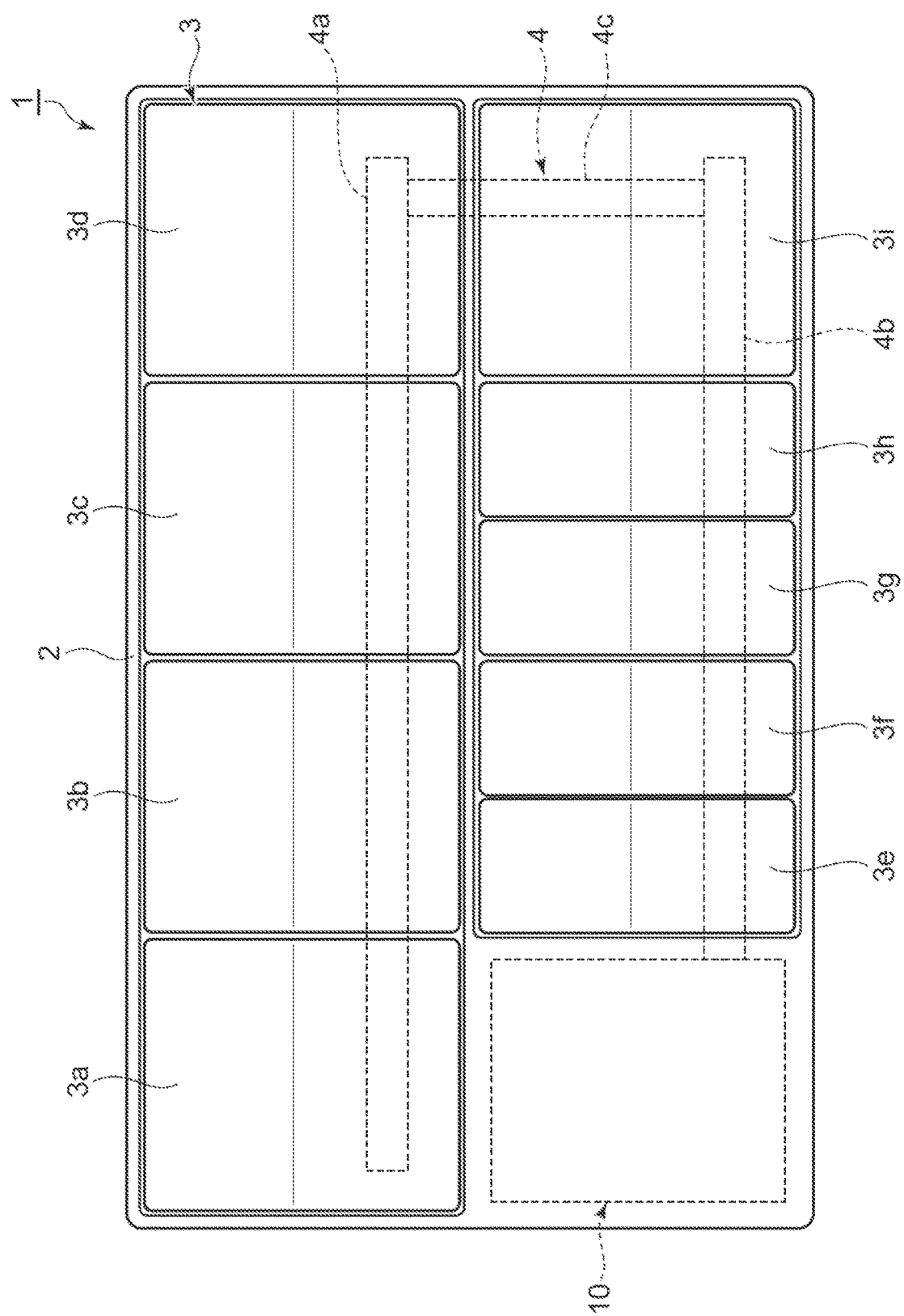
FIG. 1 is a front view of a remote control device including a power generation module according to a first embodiment of the invention when viewed from the front.

A first aspect is a power generation module including an input part, an elastic member configured to store energy input to the input part, a generator generating power when a rotor of the generator is rotated, a rotatable member rotating the rotor, a transmission part transmitting the energy stored in the elastic member to the rotatable member, and a lock part restricting a rotation of the rotor by the transmission part, wherein the energy is stored in the elastic member by the lock part restricting the rotation of the rotor while the input part moves from an initial position to a prescribed position, and the restriction of the rotor by the lock part is released and the rotor is rotated by the energy stored in the elastic member when the input part has moved to the prescribed position.

According to the power generation module, the loss of the operating force can be suppressed and the power generation efficiency can be increased because the generator is not rotated when storing the energy, and the generator is rotated when releasing the energy. Power can be generated by the energy released when the lock of the rotor is released when the input part has moved to the prescribed position. Accordingly, the operationability by the user can be improved compared to a configuration in which the lock part is released when the input to the input part ends.

A second aspect is the power generation module of the first aspect, wherein the rotor and the rotatable member are moved to a start position by a magnetic force of the generator when the input part moves from the prescribed position to the initial position.

According to the power generation module, the rotatable member is moved by the magnetic force of the generator to a designated position (the start position) after the power generation is performed by the energy release. Accordingly, the rotatable member can be stably moved to the position at which the next power generation is performed. Also, the power generation module can be continuously used because the rotor and the rotatable member can be moved to the start position by the magnetic force of the generator.

A third aspect is the power generation module of the first or second aspect, wherein a state is maintained in which the rotor remains at a current pole and does not move to an adjacent pole when the input part moves from the prescribed position to the initial position.

According to the power generation module, the rotation of the rotor after the power generation is reduced. Cogging torque of the generator can be reduced thereby, and stable power generation can be performed continuously.

A fourth aspect is the power generation module of the third aspect, wherein the rotatable member includes a first wheel rotated by the transmission part, the rotatable member includes a second wheel transmitting a rotation of the first wheel to the rotor, the transmission part rotates the second wheel and the rotor via the first wheel when the input part has moved to the prescribed position, and the state is maintained in which the rotor remains at the current pole and does not move to the adjacent pole when the input part moves from the prescribed position to the initial position.

According to the power generation module, the state is maintained in which the rotor remains at the current pole and does not move to the adjacent pole after the power generation. Stable power generation can be performed continuously thereby.

A fifth aspect is the power generation module of the third aspect, wherein the rotatable member includes a first wheel rotated by the transmission part, the rotatable member includes a second wheel transmitting a rotation of the first wheel to the rotor, the first wheel includes a disc part, and a gear part provided in the disc part, the second wheel includes a cylindrical part, a gear part that is provided in the cylindrical part and meshes with the gear part of the first wheel, and a block body that is provided to be movable inside the cylindrical part and is mounted to a rotary shaft of the generator, the transmission part rotates the second wheel and the rotor via the first wheel when the input part has moved to the prescribed position, and the state is maintained in which the rotor remains at the current pole and does not move to the adjacent pole when the input part moves from the prescribed position to the initial position.

According to the power generation module, the state is maintained in which the rotor remains at the current pole and does not move to the adjacent pole after the power generation. Stable power generation can be performed continuously thereby.

A sixth aspect is the power generation module of the third aspect, further including a withdrawing part allowing the transmission part to withdraw from the rotatable member while maintaining the state in which the rotor remains at the current pole and does not move to the adjacent pole when the input part moves from the prescribed position to the initial position.

According to the power generation module, the withdrawing part allows the transmission part to withdraw from the rotatable member while maintaining the state in which the rotor remains at the current pole and does not move to the adjacent pole after the power generation. Stable power generation can be performed continuously thereby.

A seventh aspect is the power generation module of the first aspect, wherein a distance of the lock part moving until the restriction of the rotor is released is less than a distance of the input part moving from the initial position to the prescribed position.

According to the power generation module, the effects of a friction force can be reduced while the lock part moves until the restriction of the rotor is released.

An eighth aspect is the power generation module of the first aspect, further including a lock part operation unit used as a point of force for moving the lock part, the lock part and the lock part operation unit are rotated around a same rotary fulcrum according to the movement of the input part, and a distance from the rotary fulcrum to the lock part operation unit is greater than a distance from the rotary fulcrum to the lock part.

According to the power generation module, the leverage principle is used to reduce the effects of a friction force while the lock part moves until the restriction of the rotor is released.

A ninth aspect is a remote control device including a case, an operation button located at the case, a link mechanism moved by an operation of the operation button, and the power generation module according to the first aspect that is connected to the link mechanism.

According to the remote control device, the power generation module is operated by the link mechanism when the operation button is operated. In such a case, vibrations due to cogging torque can be prevented from reaching the user because the rotor of the generator does not rotate when the operation button is being operated. Accordingly, the remote control device can have good operationability and ease of use.

A tenth aspect is a power generation module including a main part, a movable part moving with respect to the main part when energy is input, an elastic member configured to store the energy that is input, a generator generating power when a rotor of the generator is rotated, a rotatable member rotating the rotor, a transmission part transmitting the energy stored in the elastic member to the rotatable member, and a lock part restricting a rotation of the rotor by the transmission part, wherein the transmission part collides with the movable part inside the main part after the energy stored in the elastic member is released and the rotatable member is rotated.

According to the power generation module, the collision sound can be reduced compared to when the transmission part collides with the main part because the transmission part collides with the movable part inside the main part. Accordingly, discomfort of the user due to an abnormal noise can be suppressed.

An eleventh aspect is the power generation module of the tenth aspect, further including a first return elastic member returning the movable part to an original position when the input of the energy is released, wherein the first return elastic member connects the main part and the movable part.

According to the power generation module, the movable part can be returned to the initial position by the first return elastic member after the power generation. Also, the first return elastic member can absorb collision energy when the transmission part collides with the movable part.

A twelfth aspect is the power generation module of the tenth or eleventh aspect, wherein the transmission part moves in a same direction as a movement direction of the movable part.

According to the power generation module, the collision energy of the transmission part when the transmission part and the movable part collide can be dissipated in the movement direction of the movable part. The collision sound between the transmission part and the movable part can be reduced thereby.

A thirteenth aspect is the power generation module of the twelfth aspect, wherein the transmission part collides with the movable part while the movable part is moving.

According to the power generation module, the transmission part and the movable part collide while the relative velocity between the transmission part and the movable part is low. The collision sound between the transmission part and the movable part can be reduced thereby.

A fourteenth aspect is the power generation module of the tenth aspect, further including a second return elastic member, wherein the transmission part that has moved in a direction away from the rotatable member is returned to an original position by the second return elastic member when the input of the energy is released and the movable part is returned to an original position.

According to the power generation module, the transmission part can be returned to the original position by the second return elastic member after the power generation.

A fifteenth aspect is a remote control device including a case, an operation button located at the case, a link mechanism moved by an operation of the operation button, and the power generation module according to the tenth aspect that is connected to the link mechanism.

According to the remote control device, the operation of the operation button by the user can generate power and perform a remote control operation.

Exemplary embodiments will now be described with reference to the drawings. Similar components in the drawings are marked with the same reference numerals; and a detailed description is omitted as appropriate.

FIG. 1 is a front view of a remote control device including a power generation module according to a first embodiment of the invention when viewed from the front.

For example, the remote control device 1 remotely operates a toilet device (not illustrated) and is mounted in a toilet room. The remote control device 1 includes multiple operation buttons 3. Each operation button 3 is, for example, a so-called push-button that can be operated by being pressed down. The remote control device 1 detects the operation of each operation button 3 and transmits a wireless signal corresponding to the operated operation button 3 to the toilet device. The toilet device receives the wireless signal transmitted from the remote control device 1 and performs an operation corresponding to the wireless signal.

The remote control device 1 includes a case 2 forming the contour, the operation buttons 3, a link mechanism 4, and a power generation module 10. The operation buttons 3 are provided in the case 2 to be arranged in two rows in the vertical direction. In each operation button 3, for example, the upper end side is a rotatable fixed end (a fulcrum), and the lower end side is a free end that can be pressed down. The operation buttons 3 are, for example, a stop button 3a, a bottom wash button 3b, a bidet wash button 3c, a sound producing button 3d, a discharge rate reduction button 3e, a discharge rate increase button 3f, a volume reduction button 3g, a volume increase button 3h, a nozzle wash button 3i, etc.

The link mechanism 4 is located inside the case 2. The link mechanism 4 connects between the power generation module 10 and each operation button 3. The link mechanism 4 includes a first link 4a that is positioned at the upper row side and extends in the longitudinal direction of the remote control device 1, a second link 4b that is positioned at the lower row side (lower than the first link 4a) and extends in the longitudinal direction of the remote control device 1, and a connecting rod 4c connecting the first link 4a and the second link 4b. The link mechanism 4 presses an input part 13a of the power generation module 10 by being moved (slid) in the lateral direction by the operations of the operation buttons 3.

The power generation module 10 is located inside the case 2. In the example, the power generation module 10 is mounted at the lower left of the case 2. The power generation module 10 is connected to each operation button 3 via the link mechanism 4 and is caused to generate power by the press-down operation of any of the operation buttons 3.

Figure 2:
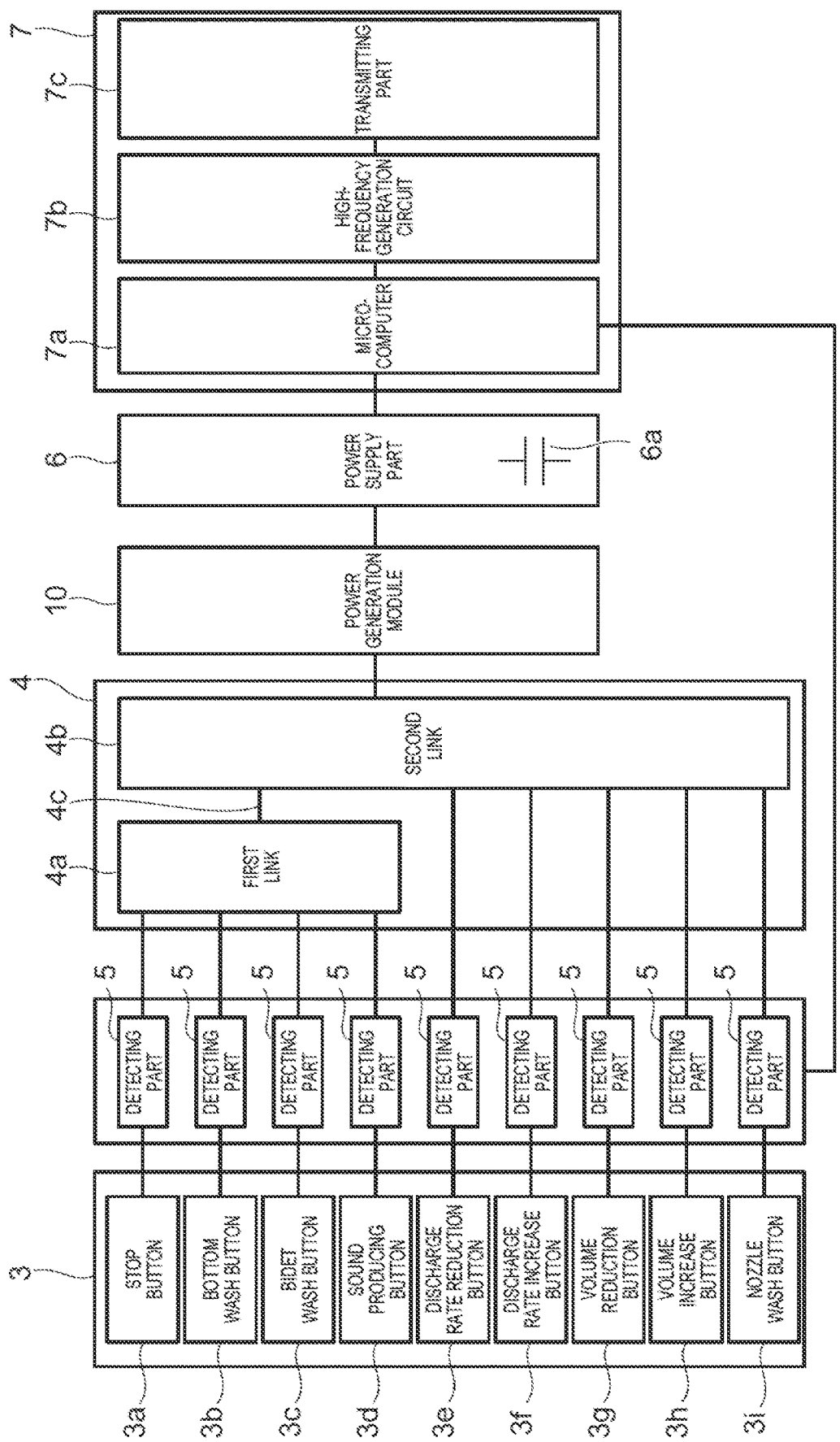
FIG. 2 is a block diagram showing an electrical system of the remote control device.

FIG. 2 is a block diagram showing an electrical system of the remote control device.

As shown in FIG. 2, the remote control device 1 includes detecting parts 5 detecting the press-down operations of the operation buttons 3, a power supply part 6 including an electrical storage element 6a that stores the power generated by the power generation module 10, and a controller 7 that operates by using the power generated by the power generation module 10.

The power supply part 6 activates the controller 7 by supplying the power stored in the electrical storage element 6a to the controller 7 when the voltage of the electrical storage element 6a reaches or exceeds a prescribed value. The electrical storage element 6a includes, for example, a capacitor, a storage battery, etc. For example, the capacity of the electrical storage element 6a is set to the minimum capacity that can store the power necessary for activating the controller 7 and transmitting the wireless signal. For example, a larger electrical storage element 6a can be suppressed thereby. The excess power remaining in the electrical storage element 6a can suppress a malfunction of the controller 7.

The controller 7 is electrically connected with each of the multiple detecting parts 5. The controller 7 remotely operates the toilet device by transmitting, to the toilet device, a wireless signal corresponding to the operation button 3 discriminated based on the detection result of the detecting part 5.

The controller 7 includes, for example, a microcomputer 7a, a high-frequency generation circuit 7b, and a transmitting part 7c. For example, the microcomputer 7a discriminates the operation button 3 that is pressed down and generates a signal corresponding to the discriminated operation button 3. For example, the high-frequency generation circuit 7b converts the signal generated by the microcomputer 7a into a high-frequency signal. For example, the high-frequency generation circuit 7b generates a high-frequency signal of 2.4 GHz. The transmitting part 7c includes, for example, an antenna, converts the high-frequency signal generated by the high-frequency generation circuit 7b into a wireless signal, and transmits the wireless signal to the toilet device.

The power generation module 10 according to the first embodiment will now be described with reference to FIGS. 3 to 9D.

Figure 3:
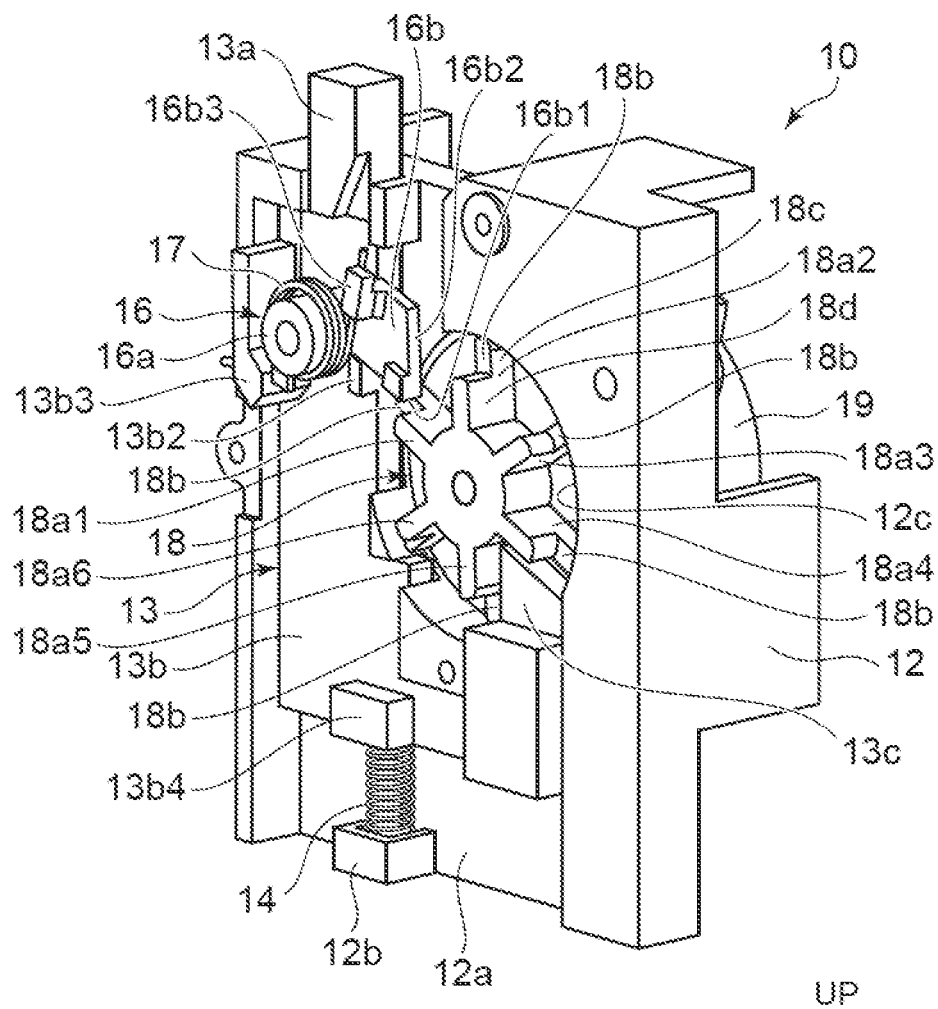
FIG. 3 is a perspective view showing the power generation module alone.

FIG. 3 is a perspective view showing the power generation module alone.

Figure 4:
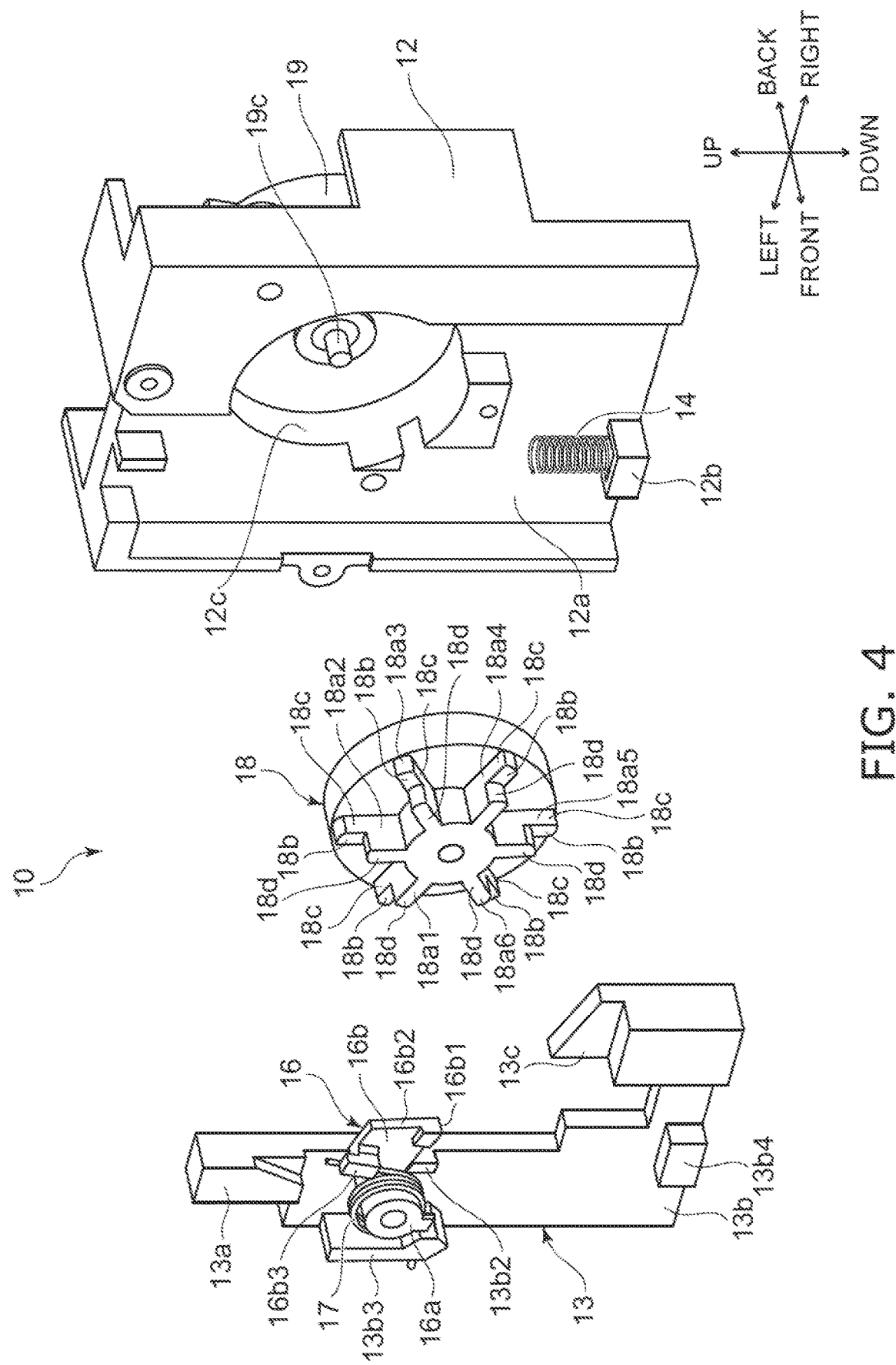
FIG. 4 is an exploded perspective view showing the disassembled power generation module of FIG. 3.

FIG. 4 is an exploded perspective view showing the disassembled power generation module of FIG. 3.

Figure 5:
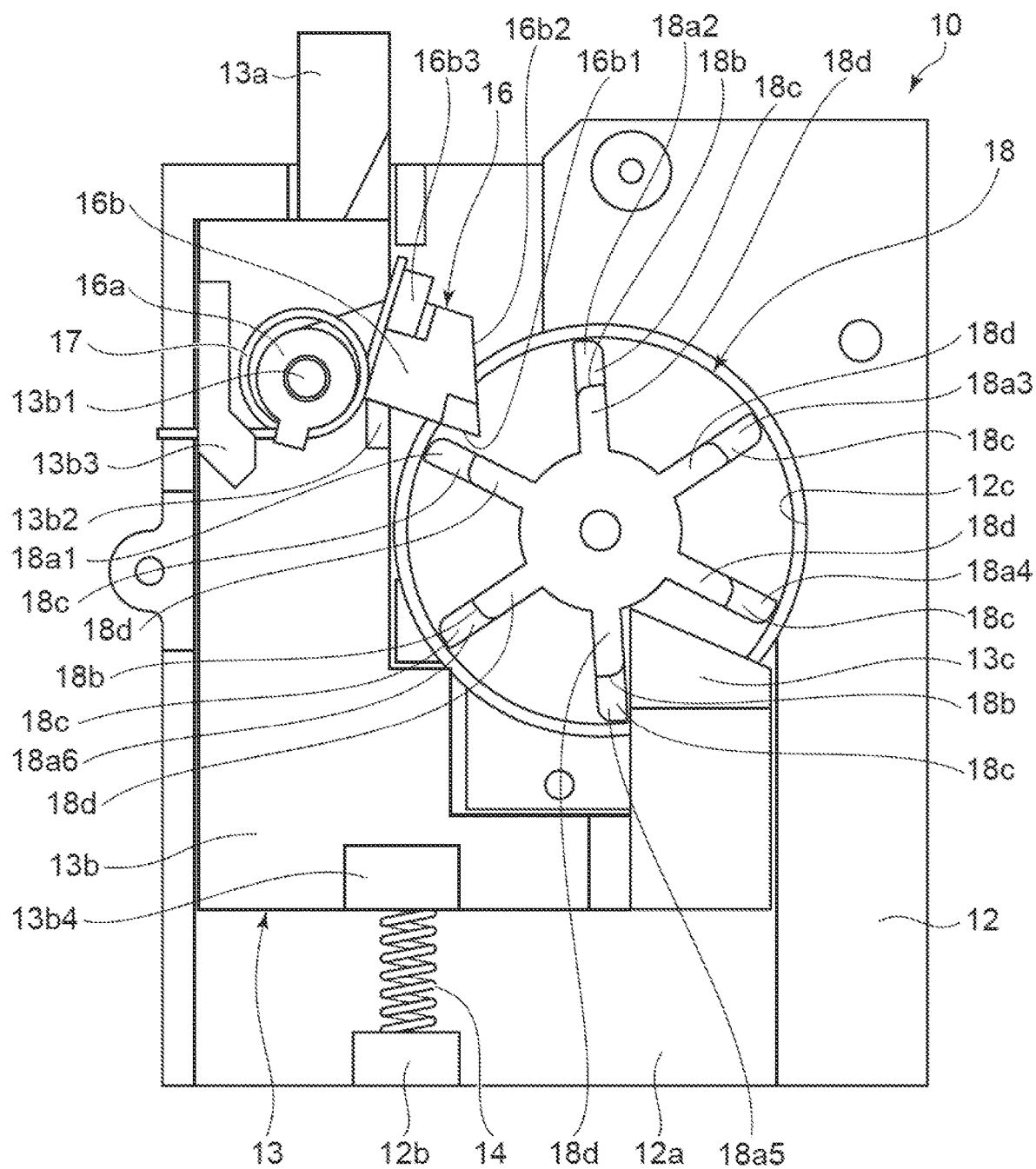
FIG. 5 is a front view of the power generation module when viewed from the front.

FIG. 5 is a front view of the power generation module when viewed from the front.

Figure 6:
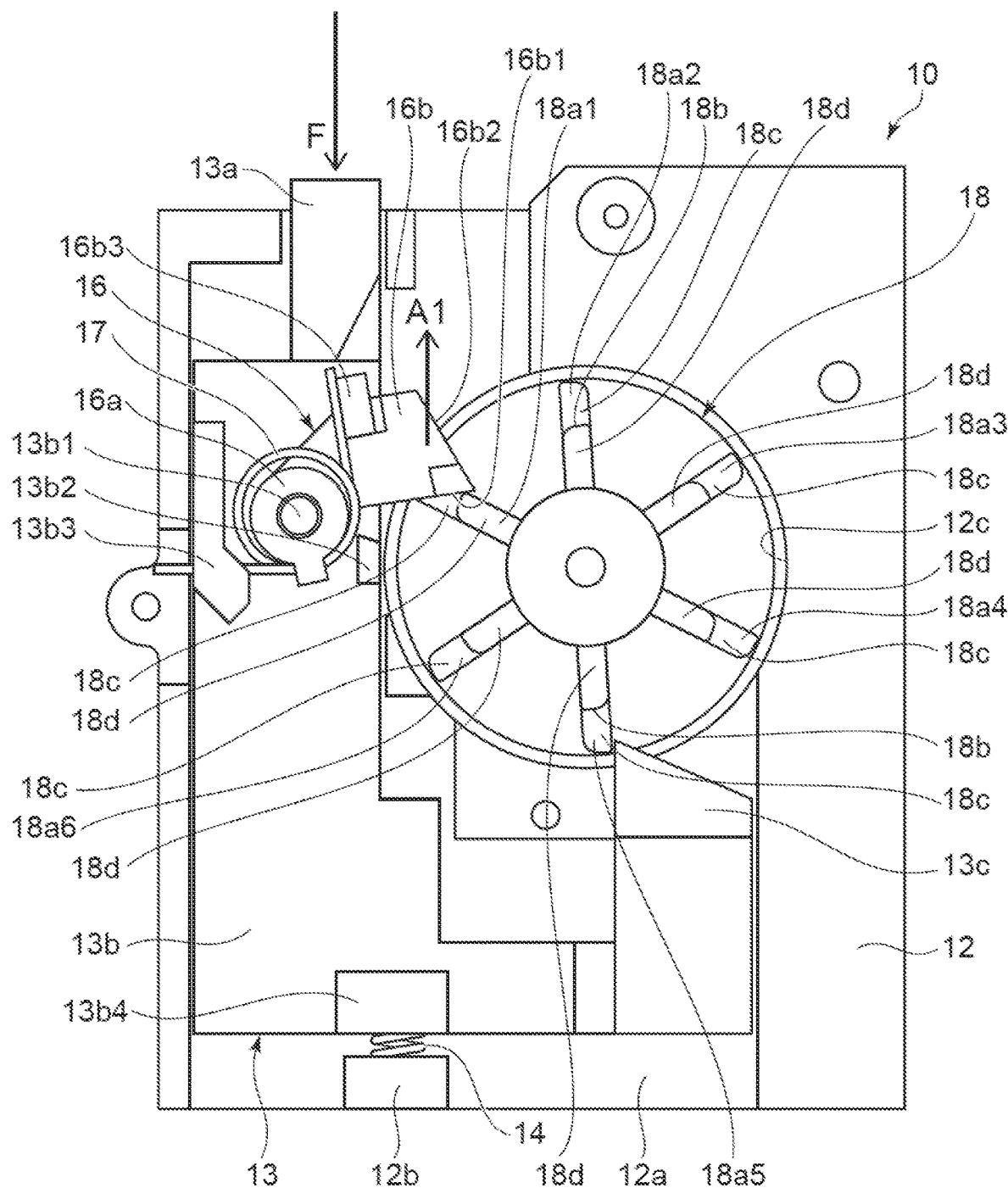
FIG. 6 is a front view showing the state when the input part is input.

FIG. 6 is a front view showing the state when the input part is input.

Figure 7:
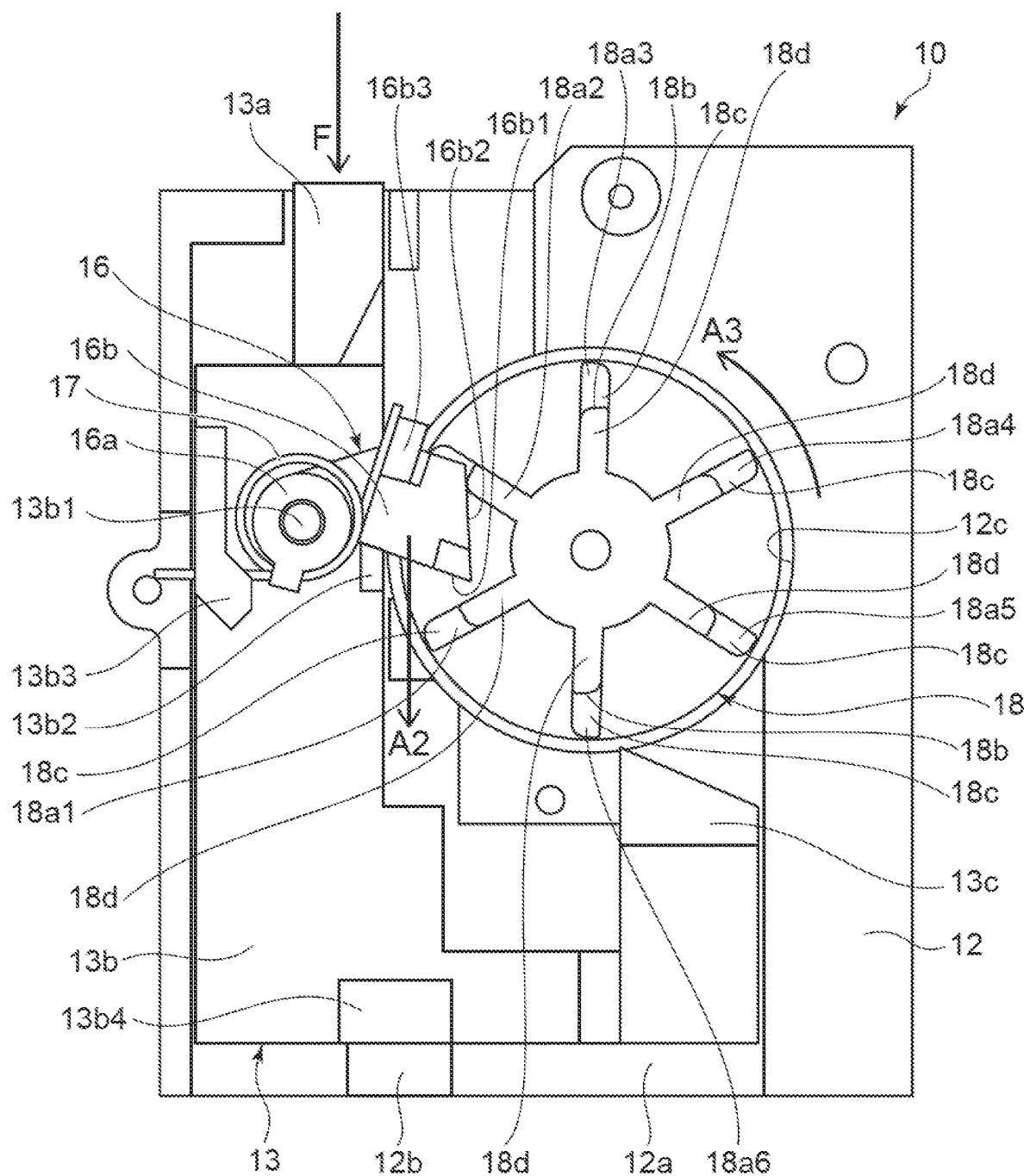
FIG. 7 is a front view showing the state when the generator generates power.

FIG. 7 is a front view showing the state when the generator generates power.

Figure 8:
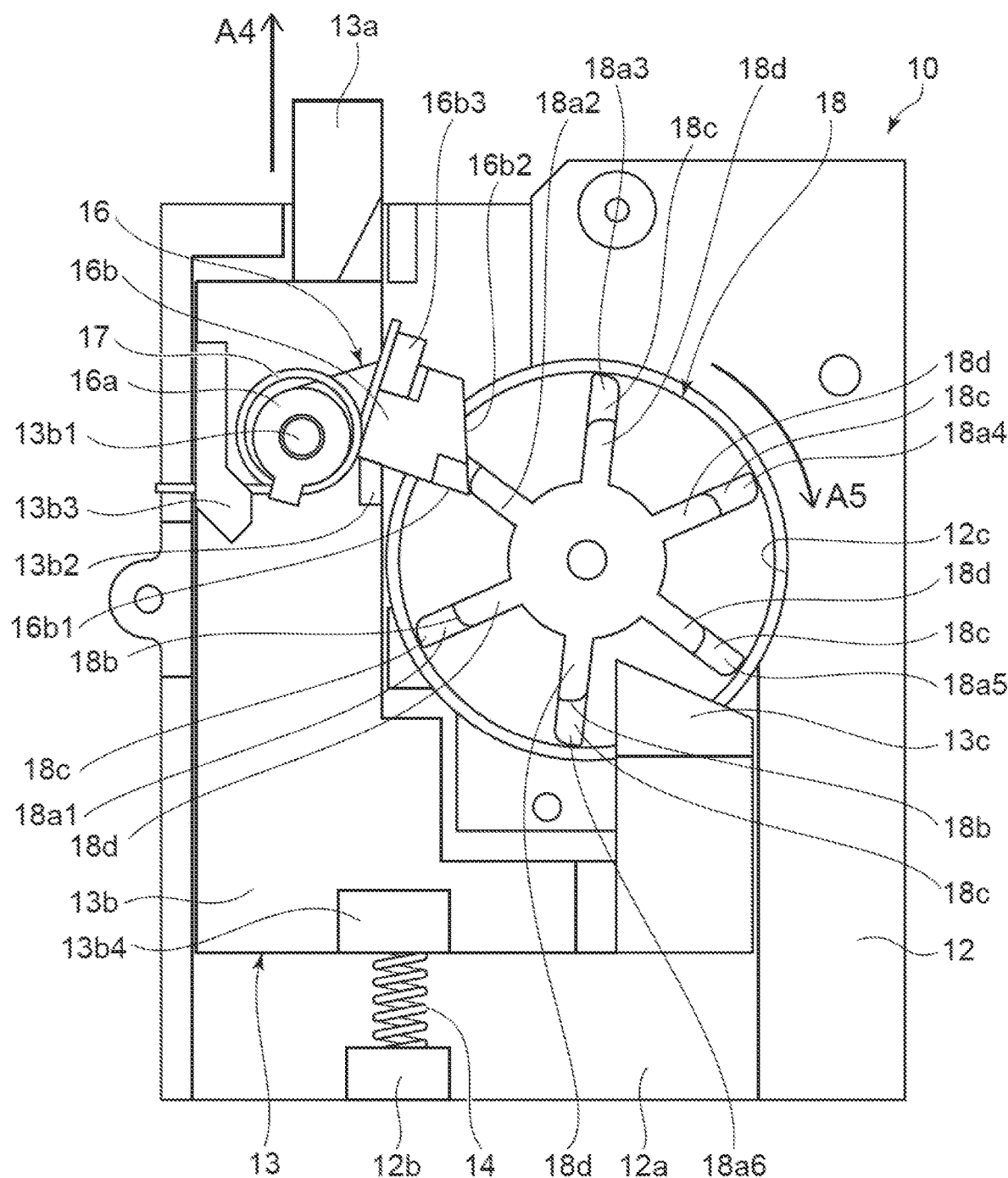
FIG. 8 is a front view showing the state when the input to the input part is released.

FIG. 8 is a front view showing the state when the input to the input part is released.

Figure 9A:
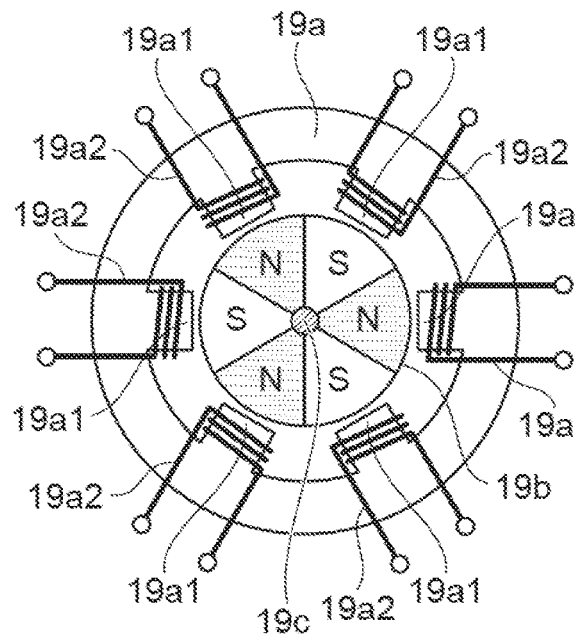
FIGS. 9A to 9D are explanatory drawings showing states of the stator and rotor of the generator.
Figure 9B:
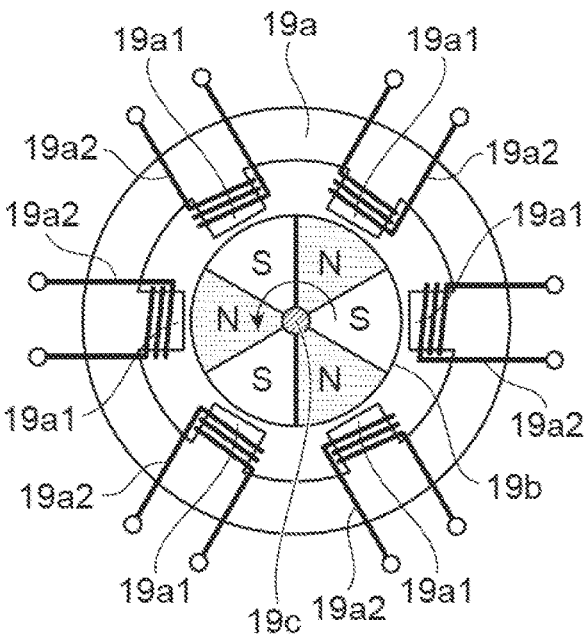
Figure 9C:
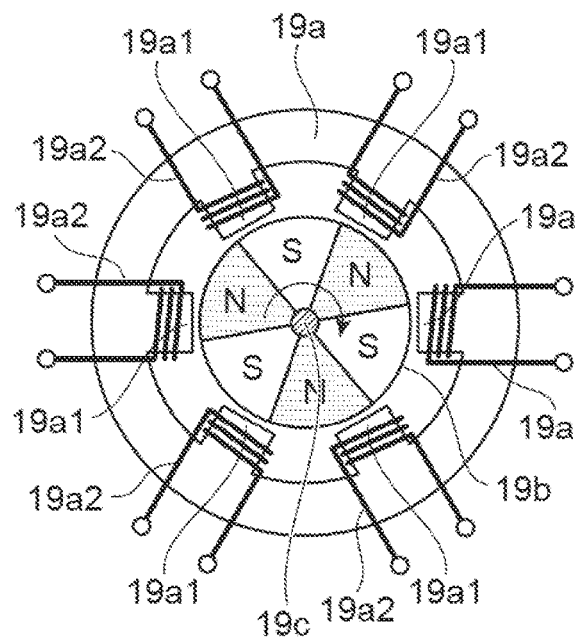
Figure 9D:
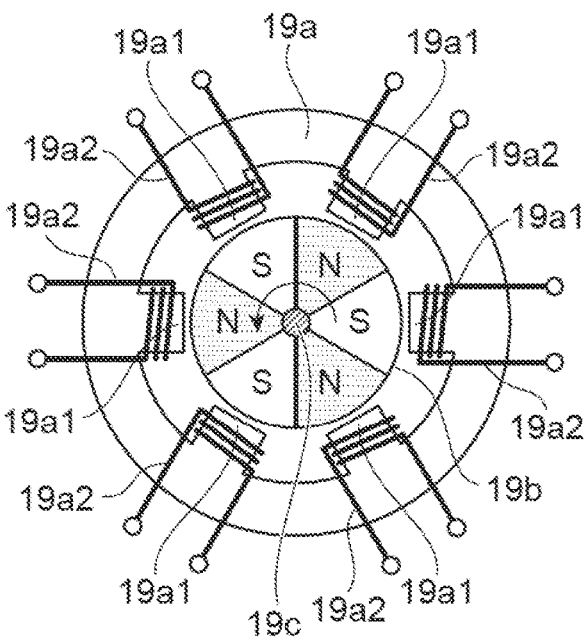

FIGS. 9A to 9D are explanatory drawings showing states of the stator and rotor of the generator. FIG. 9A is an explanatory drawing when the input part is at the initial position (no input). FIG. 9B is an explanatory drawing when the generator generates power. FIG. 9C is an explanatory drawing showing the state when the input part returns to the initial position. FIG. 9D is an explanatory drawing showing the state when the input part returns to the initial position.

For example, the power generation module 10 is located inside the case 2 of the remote control device 1. The power generation module 10 generates power by utilizing the operating force (the energy) when the operation button 3 is operated. The power generation module 10 includes a main part 12, a moving member 13, a first elastic member 14, a transmission part 16, a second elastic member 17, a wheel 18, and a generator 19.

In this specification, the terms "up", "down", "left", and "right" in the power generation module 10 respectively refer to up, down, left, and right referenced to the state in which the input part 13a is positioned at the upper side when the moving member 13 is viewed from the front. In this specification, the direction in which the moving member 13 is located is called the "front" direction; and the direction in which the generator 19 is located is called the "back" direction.

For example, the main part 12 is formed of a resin material or a metal material. For example, the main part 12 is covered with a not-illustrated cover. The main part 12 includes a guide part 12a slidably guiding the moving member 13, a receiving part 12b in which the first elastic member 14 is located, and a through-hole 12c extending through the main part 12 in the thickness direction (the longitudinal direction). The guide part 12a and the receiving part 12b are located at the front surface side of the main part 12. The through-hole 12c extends from the front surface toward the back surface of the main part 12; and the generator 19 is mounted to the back surface.

For example, the moving member 13 is formed of a resin material or a metal material and is provided to be slidable in the guide part 12a of the main part 12. The moving member 13 includes the input part 13a protruding from the main part 12, an intermediate part 13b that is connected to the input part 13a and positioned inside the guide part 12a, and a lock part 13c that is connected to the intermediate part 13b and protrudes from the guide part 12a toward the through-hole 12c. The moving member 13 is formed in a concave shape made of the input part 13a, the intermediate part 13b, and the lock part 13c when viewed in front-view. The moving member 13 is a movable part that moves with respect to the main part 12 when an operating force (energy) is input to the input part 13a.

The input part 13a is a part to which the operating force of the user is input. For example, the input part 13a is connected to the second link 4b of the remote control device 1. When the user presses the operation button 3 of the remote control device 1, the moving member 13 is moved (slid) by the second link 4b pressing the input part 13a. The position to which the input part 13a protrudes from the main part 12 is the initial position (the state of FIG. 3). In other words, the initial position is the state in which the input part 13a is not pressed by the second link 4b. In other words, the initial position is the state when there is no input to the input part 13a.

As shown in FIGS. 3 to 5, the intermediate part 13b is formed in an L-shape when viewed in front-view. The intermediate part 13b connects the input part 13a and the lock part 13c. In other words, the moving member 13 includes the input part 13a at the proximal side, and the lock part 13c at the distal side. The dimension in the vertical direction of the intermediate part 13b is less than the dimension in the vertical direction of the guide part 12a.

Accordingly, the intermediate part 13*b* is slidable through the guide part 12*a* in the vertical direction.

The intermediate part 13*b* includes a mounting part 13*b*1 that is positioned below the input part 13*a* and to which the transmission part 16 is mounted, a stopper 13*b*2 that is positioned rightward of the mounting part 13*b*1 and restricts the movement of the transmission part 16, an engaging part 13*b*3 that is positioned leftward of the mounting part 13*b*1 and engages the second elastic member 17, and a pressing part 13*b*4 provided to face the receiving part 12*b*.

The stopper 13*b*2 restricts the downward movement of the transmission part 16. The engaging part 13*b*3 fixes the second elastic member 17 at one end and stabilizes the movement of the moving member 13 by contacting the side surface of the guide part 12*a*. The pressing part 13*b*4 supports the first elastic member 14 between the pressing part 13*b*4 and the receiving part 12*b*.

The first elastic member 14 urges the moving member 13 upward by pressing the pressing part 13*b*4. In other words, the first elastic member 14 urges the input part 13*a* in the direction of returning to the initial position. Accordingly, when the pressing on the operation button 3 of the remote control device 1 is released, the urging force of the first elastic member 14 causes the input part 13*a* to return to the initial position while pressing the second link 4*b*. In other words, the first elastic member 14 is a first return elastic member that returns the moving member 13 (the movable part) to the original position when the energy (the input) to the input part 13*a* is released. The first elastic member 14 (the first return elastic member) connects the receiving part 12*b* of the main part 12 and the pressing part 13*b*4 of the moving member 13.

The lock part 13*c* restricts the rotation of a rotor 19*b* of the generator 19 by the transmission part 16. In the example, the lock part 13*c* extends upward from the distal end of the intermediate part 13*b*. The movement distance of the lock part 13*c* is equal to the movement distance of the input part 13*a*. When the input part 13*a* is at the initial position as shown in FIG. 5, the lock part 13*c* protrudes inside the through-hole 12*c*. On the other hand, when the input part 13*a* has moved to the prescribed position as shown in FIG. 7, the lock part 13*c* is released from the through-hole 12*c*.

For example, the prescribed position is the end position (the final position) when a force is applied to the input part 13*a* and the input part 13*a* (the moving member 13) moves. The lock part 13*c* restricts the rotation of the wheel 18 positioned inside the through-hole 12*c* when the input part 13*a* is between the initial position and the prescribed position. In other words, the lock part 13*c* indirectly restricts the rotation of the rotor 19*b* by restricting the rotation of the wheel 18.

The transmission part 16 is rotatably mounted to the mounting part 13*b*1 of the moving member 13. The transmission part 16 transmits the energy stored in the second elastic member 17 described below to the wheel 18. The transmission part 16 includes a shaft part 16*a* mounted to the mounting part 13*b*1, and an extension part 16*b* extending from the shaft part 16*a* toward the through-hole 12*c*.

For example, the shaft part 16*a* is formed in a circular tubular shape; and the mounting part 13*b*1 is inserted into the shaft part 16*a*. The shaft part 16*a* can rotate in the clockwise direction or counterclockwise direction around the mounting part 13*b*1. The extension part 16*b* is positioned above the stopper 13*b*2. When the input part 13*a* is at the initial position as shown in FIG. 5, the stopper 13*b*2 abuts the lower surface of the extension part 16*b*. In other words, when the input part 13*a* is at the initial position, the clockwise rotation of the transmission part 16 is restricted by the stopper 13*b*2.

The distal side of the lower surface of the extension part 16*b* is an abutment surface 16*b*1 abutting the wheel 18 positioned inside the through-hole 12*c*. The transmission part 16 rotates the wheel 18 by the abutment surface 16*b*1 pressing the wheel 18 downward.

The side surface of the extension part 16*b* is a sloped surface 16*b*2 that extends obliquely leftward and upward from the abutment surface 16*b*1 in the state in which the extension part 16*b* abuts the stopper 13*b*2. The sloped surface 16*b*2 presses the wheel 18 to rotate the wheel 18 clockwise when the input part 13*a* is returned from the prescribed position to the initial position. The relationship between the transmission part 16 and the wheel 18 is described below in detail. The extension part 16*b* also includes an engaging part 16*b*3 at the upper end side of the extension part 16*b* that engages the second elastic member 17 at the other end of the second elastic member 17. For example, the engaging part 16*b*3 protrudes from the front surface of the extension part 16*b*.

The second elastic member 17 is located at the transmission part 16. The second elastic member 17 is, for example, a torsion coil spring. The second elastic member 17 is provided to be wound on the outer circumference of the shaft part 16*a*, engages the engaging part 13*b*3 at one end, and engages the engaging part 16*b*3 at the other end. Accordingly, the second elastic member 17 urges the transmission part 16 in the clockwise direction. The second elastic member 17 is an elastic member that stores the energy of the force input to the input part 13*a*.

The wheel 18 is positioned inside the through-hole 12*c* of the main part 12 and is located at a rotary shaft 19*c* of the generator 19. The wheel 18 is included in the rotatable member of the invention. The rotary shaft 19*c* of the generator 19 is mounted to the central part of the wheel 18. Accordingly, the rotary shaft 19*c* of the generator 19 can be rotated by rotating the wheel 18. In other words, the wheel 18 and the rotary shaft 19*c* rotate together in the same direction. The wheel 18 is rotated by the pressing by the transmission part 16 due to the energy (the urging force) of the second elastic member 17. In this specification, the rotational direction of the wheel and rotor is described as a forward rotation in the rotational direction when the generator 19 generates power, and is described as a reverse rotation when rotating in the reverse direction.

The wheel 18 includes multiple (in the example, six) protruding parts 18*a*1 to 18*a*6 spreading radially from the central part. Each of the protruding parts 18*a*1 to 18*a*6 includes a notched part 18*b* notched backward at the radially outer end portion. In other words, the protruding parts 18*a*1 to 18*a*6 each include a radially outer part 18*c* and a radially inner part 18*d* formed in a step shape in the longitudinal direction.

Due to the notched parts 18*b* of the protruding parts 18*a*1 to 18*a*6, the radially outer parts 18*c* are positioned backward of the transmission part 16. On the other hand, the protruding parts 18*a*1 to 18*a*6 abut the extension part 16*b* of the transmission part 16 by the radially inner parts 18*d* protruding further frontward than the radially outer parts 18*c*.

As shown in FIGS. 3 and 5, the lock part 13*c* is inserted between the adjacent protruding parts (in the example, between a protruding part 18*a*4 and a protruding part 18*a*5). Accordingly, the lock part 13*c* restricts the rotation of the wheel 18 in the counterclockwise direction (the forward rotation) by abutting the protruding parts 18a1 to 18a6 (in the example, the protruding part 18a5).

The generator 19 is positioned backward of the wheel 18 and is located at the back surface of the main part 12. The generator 19 is, for example, a stepper motor. As shown in FIGS. 9A to 9D, the generator 19 includes a stator 19a, the rotor 19b, and the rotary shaft 19c.

For example, the stator 19a is formed in a circular-ring shape. In the stator 19a, a coil 19a2 is wound on a magnetic pole 19a1. In the example, the stator 19a includes six magnetic poles 19a1 to match the protruding parts 18a1 to 18a6 of the wheel 18. The coils 19a2 are connected to the power supply part 6 of the remote control device 1.

The rotor 19b is positioned inside the stator 19a. The rotor 19b is a magnetic body that includes magnets. In the example, the rotor 19b includes six magnetic poles (three N-poles and three S-poles) to match the protruding parts 18a1 to 18a6 of the wheel 18. The rotary shaft 19c is located at the center of the rotor 19b. In other words, the magnetic poles are arranged in the circumferential direction at the periphery of the rotary shaft 19c.

The generator 19 generates power when the rotor 19b is rotated. In other words, a current is caused to flow in the coils 19a2 by rotating the rotor 19b. The power that is generated by the generator 19 is stored in the electrical storage element 6a of the power supply part 6. The number of the magnetic poles 19a1 of the stator 19a and the number of magnetic poles of the rotor 19b may be integer multiples of the number of protruding parts of the wheel 18.

Thus, the power generation module 10 according to the first embodiment has a configuration such as that described above, and operations of the power generation module 10 will now be described with reference to FIGS. 5 to 9D.

FIG. 5 is a state in which a force does not act on the input part 13a. In other words, the operation button 3 of the remote control device 1 is not operated in this state. In such a case, the distal end of the input part 13a is positioned at the initial position protruding from the main part 12. The wheel 18 is stationary at the start position. In such a case, as shown in FIG. 9A, the rotor 19b of the generator 19 is stationary at a stable position (the start position).

As shown in FIG. 6, when a force F (an operating force) acts on the input part 13a, the moving member 13 moves (slides) through the guide part 12a against the urging force of the first elastic member 14. In such a case, the rotation of the wheel 18 in the counterclockwise direction is restricted because the lock part 13c contacts the protruding part 18a5.

Accordingly, the extension part 16b of the transmission part 16 is pressed on the protruding part 18a1 of the wheel 18. The transmission part 16 moves in the arrow A1-direction against the urging force of the second elastic member 17. In other words, the transmission part 16 moves relative to the moving member 13. In other words, when the force F acts on the input part 13a, the second elastic member 17 stores energy (a spring force) by being contracted by the transmission part 16 while the lock part 13c restricts the rotation of the wheel 18.

As shown in FIG. 7, when the force F further acts on the input part 13a and when the input part 13a moves to the prescribed position, the rotation restriction of the wheel 18 by the lock part 13c is released. Accordingly, the transmission part 16 presses the protruding part 18a1 of the wheel 18 in the arrow A2-direction by the urging force of the second elastic member 17.

As a result, the wheel 18 rotates (a forward rotation) in the arrow A3-direction (counterclockwise). Further rotation of the wheel 18 is restricted by a protruding part 18a2 contacting the transmission part 16. In such a case, as shown in FIG. 9B, the rotor 19b of the generator 19 rotates (a forward rotation) in the counterclockwise direction together with the wheel 18. Accordingly, in the generator 19, a current flows in the coils 19a2 (power is generated).

As shown in FIG. 8, when the input to the input part 13a is released, the moving member 13 moves in the arrow A4-direction due to the urging force of the first elastic member 14. In other words, the input part 13a is returned from the prescribed position to the initial position by the urging force of the first elastic member 14. In other words, the first elastic member 14 is a first return elastic member that returns the moving member 13 (the movable part) to the original position when the energy (the input) to the input part 13a is released. The first elastic member 14 (the first return elastic member) connects the main part 12 and the moving member 13. In such a case, the protruding part 18a2 of the wheel 18 moves along the sloped surface 16b2 of the transmission part 16, and the wheel 18 rotates (a reverse rotation) in the arrow A5-direction (clockwise) by being pressed by the transmission part 16. In such a case, as shown in FIG. 9C, the rotor 19b of the generator 19 rotates (a reverse rotation) clockwise against the magnetic force between the stator 19a and the rotor 19b.

Then, when the input part 13a returns to the initial position, the protruding part 18a2 is positioned below the transmission part 16. Accordingly, the rotation restriction of the wheel 18 in the counterclockwise direction by the transmission part 16 is released. Accordingly, as shown in FIG. 9D, the rotor 19b of the generator 19 is rotated in the counterclockwise direction to a stable position by the magnetic force. Accordingly, the wheel 18 is rotated to the same state as FIG. 5 (the start position) and waits for the next input to the input part 13a.

When the next input is provided to the input part 13a, the transmission part 16 rotates the wheel 18 and the rotor 19b by pressing the protruding part 18a2. In the example, the wheel 18 makes one revolution by six operations of the operation buttons 3 (i.e., power generated six times).

According to the power generation module 10 according to the first embodiment, energy is stored in the second elastic member 17 by the lock part 13c restricting the rotation of the wheel 18 while the input part 13a moves from the initial position to the prescribed position. Then, when the input part 13a has moved to the prescribed position, the restriction of the wheel 18 by the lock part 13c is released, and the energy that is stored in the second elastic member 17 causes the transmission part 16 to cause the forward rotation of the wheel 18 and the rotation of the rotor 19b of the generator 19.

Accordingly, in the power generation module 10, the energy can be efficiently stored because the wheel 18 does not rotate when the input is provided to the input part 13a. Also, cogging torque due to the generator 19 can be suppressed because the rotor 19b of the generator 19 does not rotate until the input part 13a has moved from the initial position to the prescribed position. As a result, the operationability of the remote control device 1 can be improved.

Even when the wheel 18 is rotated by the process of returning the input part 13a from the prescribed position to the initial position, the wheel 18 is returned to the start position by the generator 19. Accordingly, the power generation module 10 can stably generate power.

The transmission part 16 collides with the movable part (the stopper 13b2 of the moving member 13) when generating power. In other words, the transmission part 16 collides with the stopper 13b2 of the moving member 13 inside the main part 12 after releasing the energy stored in the second elastic member 17 to rotate the rotatable member (the wheel 18). The main part 12 is covered with a cover. Because the transmission part 16 collides with the moving member 13 inside the main part 12, the collision sound can be less than when the transmission part 16 collides with the main part 12. Discomfort of the user due to an abnormal noise can be suppressed thereby.

The first elastic member 14 is the first return elastic member that returns the moving member 13 to the original position when the energy (the input) to the input part 13a is released. The first elastic member 14 (the first return elastic member) connects the main part 12 and the moving member 13. Accordingly, the moving member 13 can be returned to the initial position by the first elastic member 14 after the power generation. Also, the first elastic member 14 can absorb the collision energy when the transmission part 16 collides with the moving member 13.

The transmission part 16 moves in the same direction as the movement direction of the moving member 13. In other words, the moving member 13 moves downward when the force F acts on the input part 13a. Then, when the rotation restriction of the wheel 18 by the lock part 13c is released, the transmission part 16 moves downward due to the urging force of the second elastic member 17. In such a case, the transmission part 16 collides with the stopper 13b2 of the moving member 13 after rotating the wheel 18. Thus, the collision energy of the transmission part 16 when the transmission part 16 and the moving member 13 collide can be dissipated in the movement direction of the moving member 13 because the movement directions of the transmission part 16 and the moving member 13 are the same direction (downward). Accordingly, the collision sound between the transmission part 16 and the moving member 13 can be reduced.

The transmission part 16 may collide with the moving member 13 while the moving member 13 is moving. In other words, the rotation restriction of the wheel 18 by the lock part 13c may be released while the moving member 13 is moving. Accordingly, the transmission part 16 and the moving member 13 can collide when the relative velocity between the transmission part 16 and the moving member 13 is small. Accordingly, the collision sound between the transmission part 16 and the moving member 13 can be reduced.

FIGS. 10 to 16 show a power generation module 20 according to a second embodiment of the invention. In the power generation module 20 according to the second embodiment, a wheel 21 includes a first wheel 22 and a second wheel 30. According to the second embodiment, the same components as those of the first embodiment are marked with the same reference numerals; and a description is omitted.

FIG. 10 is a perspective view showing the power generation module according to the second embodiment of the invention.

Figure 11:
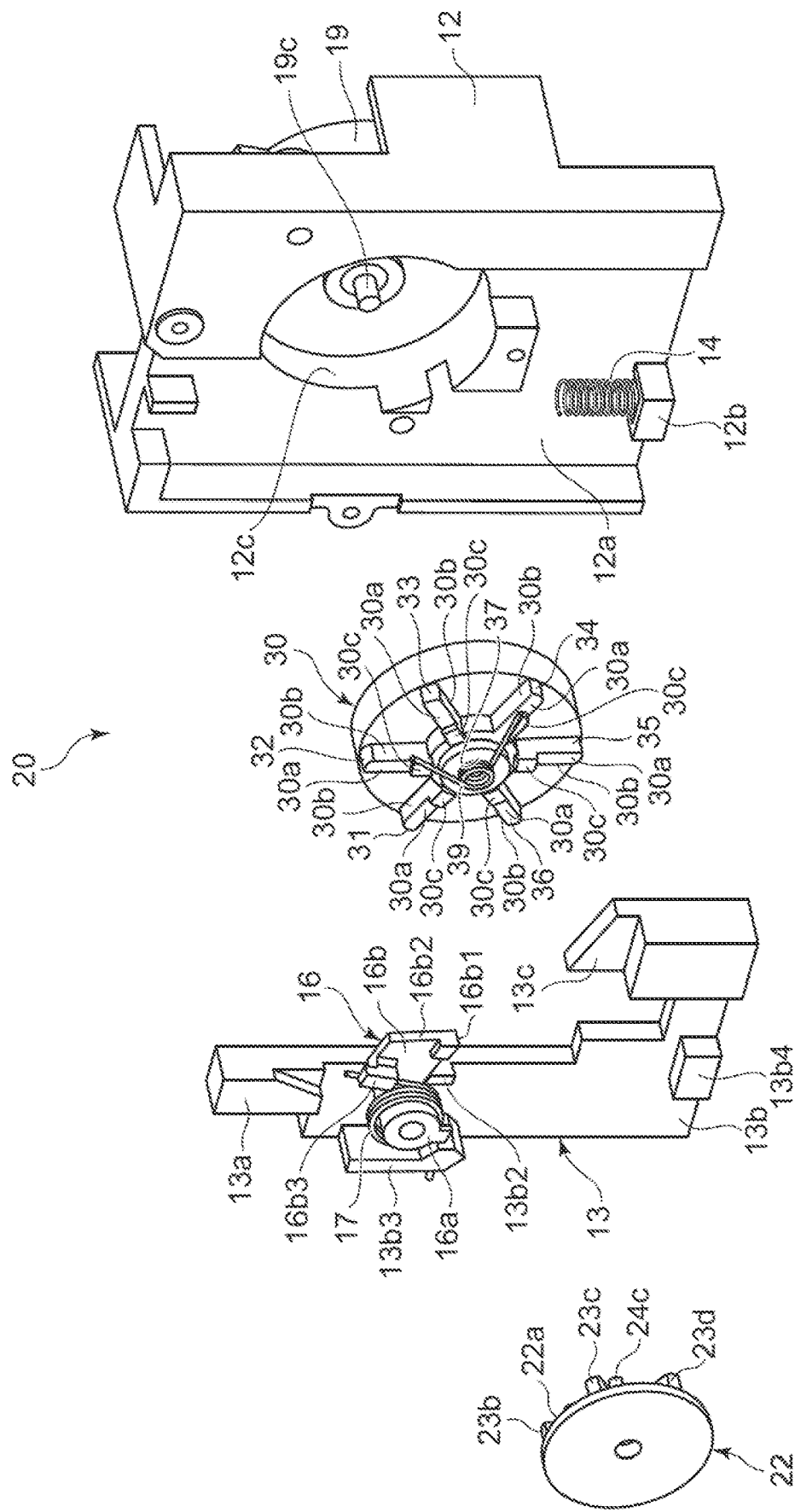
FIG. 11 is an exploded perspective view showing the disassembled power generation module of FIG. 10.

FIG. 11 is an exploded perspective view showing the disassembled power generation module of FIG. 10.

Figure 12:
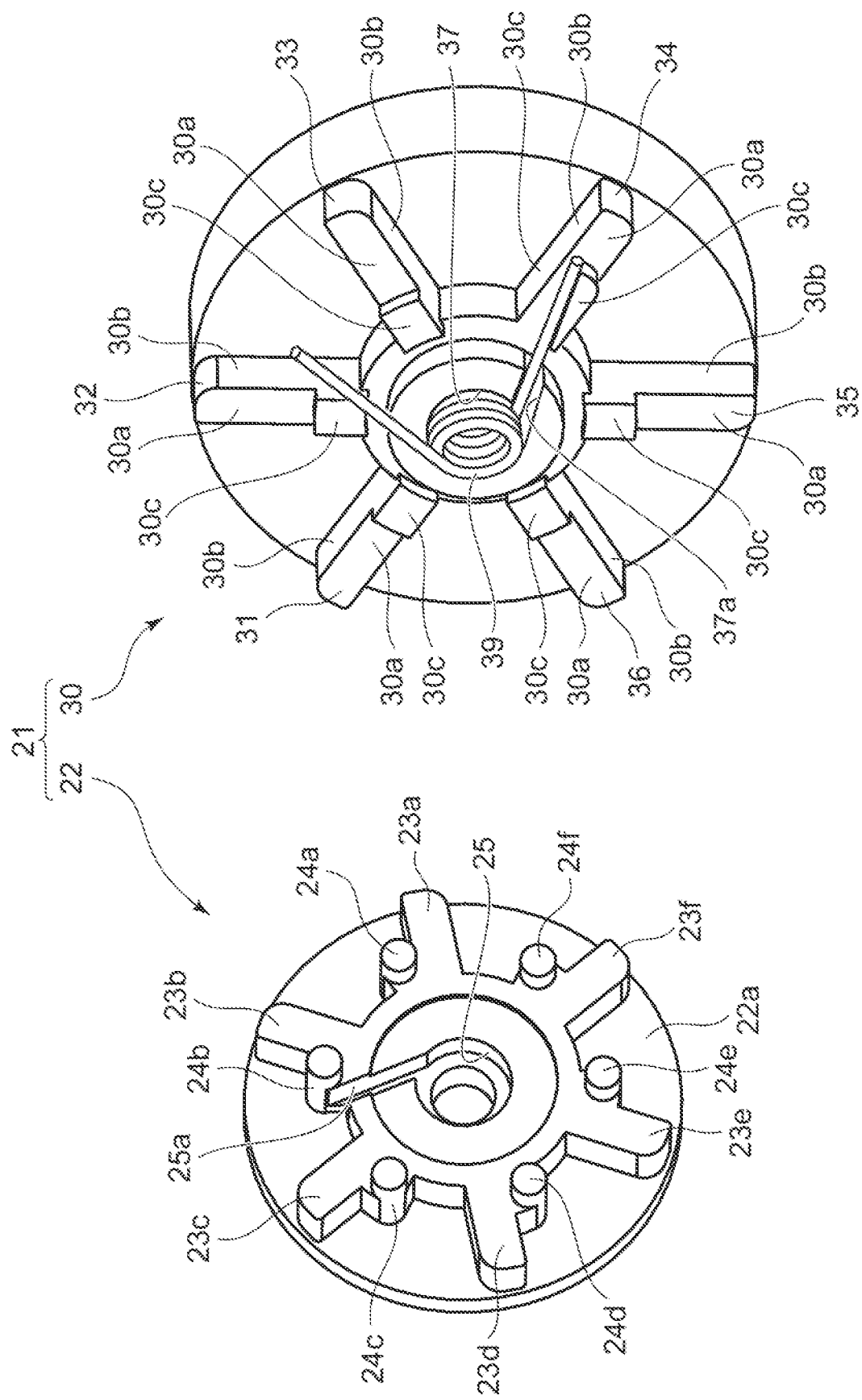
FIG. 12 is a perspective view showing the first wheel and the second wheel.

FIG. 12 is a perspective view showing the first wheel and the second wheel.

The wheel 21 of the power generation module 20 includes the first wheel 22 and the second wheel 30. The wheel 21 is included in the rotatable member of the invention. The first wheel 22 and the second wheel 30 overlap in the longitudinal direction. The first wheel 22 is a part that receives the energy of the second elastic member 17 from the transmission part 16. The second wheel 30 is a part that is positioned between the first wheel 22 and the generator 19 and transmits the energy received by the first wheel 22 to the generator 19.

The first wheel 22 is positioned frontward of the second wheel 30. The diameter of the first wheel 22 is less than the diameter of the second wheel 30. As shown in FIG. 12, the first wheel 22 includes multiple (in the example, six) first projections 23a to 23f and second projections 24a to 24f protruding from a back surface 22a toward the second wheel 30.

The first projections 23a to 23f are provided to be separated from each other in the circumferential direction of the first wheel 22. The first projections 23a to 23f extend radially from the central part toward the end portions of the first wheel 22. The first projections 23a to 23f do not contact the second wheel 30.

The extension part 16b of the transmission part 16 abuts the first projections 23a to 23f. In other words, the first wheel 22 is rotated (a forward rotation) in the counterclockwise direction by the transmission part 16 pressing the first projections 23a to 23f due to the energy stored in the second elastic member 17.

The second projections 24a to 24f are provided to be adjacent respectively to the first projections 23a to 23f at the radially inner sides of the first projections 23a to 23f (at the center of the first wheel 22). The protrusion dimensions from the back surface 22a of the second projections 24a to 24f are greater than those of the first projections 23a to 23f.

The second projections 24a to 24f are positioned respectively between protruding parts 31 to 36 of the second wheel 30. The second projections 24a to 24f respectively contact the side surfaces of the protruding parts 31 to 36 of the second wheel 30. The first wheel 22 transmits the energy transmitted from the transmission part 16 from the second projections 24a to 24f to the second wheel 30.

The first wheel 22 also includes an insertion hole 25 at the central part of the first wheel 22, into which a third elastic member 39 is inserted. The insertion hole 25 includes an engaging part 25a engaged by one end of the third elastic member 39.

The second wheel 30 is positioned between the first wheel 22 and the generator 19. The second wheel 30 is rotated by the first wheel 22. The rotary shaft 19c of the generator 19 is mounted to the central part of the back surface side of the second wheel 30. Accordingly, the rotary shaft 19c and the rotor 19b of the generator 19 rotate when the second wheel 30 rotates.

As shown in FIG. 12, the second wheel 30 includes the multiple (in the example, six) protruding parts 31 to 36 spreading radially from the central part. Each of the protruding parts 31 to 36 includes a notched part 30a notched backward at the radially outer end portion. In other words, the protruding parts 31 to 36 each include a radially outer part 30b and a radially inner part 30c formed in a step shape in the longitudinal direction.

The protruding parts 31 to 36 face the first projections 23a to 23f of the first wheel 22 in the longitudinal direction. Also, the radially outer parts 30b of the protruding parts 31 to 36 face the extension part 16b of the transmission part 16 in the longitudinal direction. The extension part 16b of the transmission part 16 is positioned between the first wheel 22 and the second wheel 30 and abuts the first projections 23a to 23f of the first wheel 22.

The radially inner parts 30c of the protruding parts 31 to 36 protrude further frontward than the radially outer parts 30b. The second projections 24a to 24f of the first wheel 22 abut the side surfaces of the radially inner parts 30c. In other words, the second projections 24a to 24f are positioned respectively between the adjacent radially inner parts 30c. The second wheel 30 is caused to have a forward rotation by the radially inner parts 30c pressing the second projections 24a to 24f of the first wheel 22.

Figure 13:
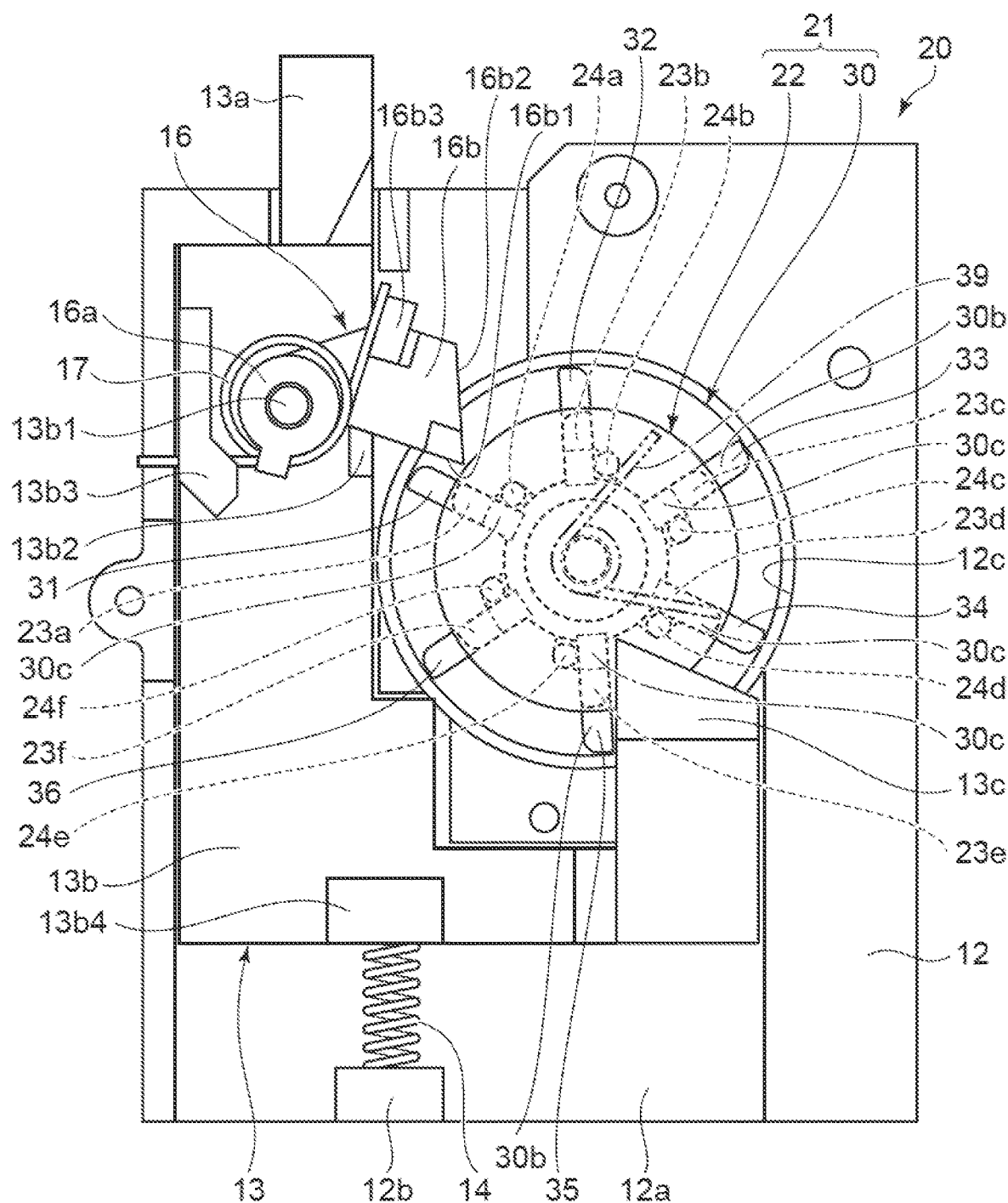
FIG. 13 is an explanatory drawing showing a state when there is no input to the input part.

As shown in FIGS. 10 and 13, the lock part 13c is inserted between the adjacent protruding parts (in the example, between the protruding part 34 and the protruding part 35). Accordingly, the lock part 13c restricts the rotation (the forward rotation) of the second wheel 30 in the counterclockwise direction by abutting the protruding parts 31 to 36 (in the example, the protruding part 35).

An insertion hole 37 into which the third elastic member 39 is inserted is provided in the central part of the front surface side of the second wheel 30. The insertion hole 37 includes an engaging part 37a engaged by the other end of the third elastic member 39. In the example as shown in FIG. 12, the radially inner part 30c of the protruding part 34 is notched backward to be engaged by the other end of the third elastic member 39.

The third elastic member 39 elastically connects the first wheel 22 and the second wheel 30. The third elastic member 39 is, for example, a torsion coil spring. The front side of the third elastic member 39 is inserted into the insertion hole 25 of the first wheel 22; and the back side of the third elastic member 39 is inserted into the insertion hole 37 of the second wheel 30. In this state, one end of the third elastic member 39 engages the engaging part 25a of the insertion hole 25; and the other end of the third elastic member 39 engages the engaging part 37a of the insertion hole 37. The third elastic member 39 urges the first wheel 22 in the counterclockwise direction (the forward rotational direction) with respect to the second wheel 30.

The spring constant of the third elastic member 39 is less than the magnetic force between the stator 19a and the rotor 19b of the generator 19. In other words, the rotation of the rotor 19b of the generator 19 is not restricted by the urging force of the third elastic member 39.

Thus, the power generation module 20 according to the second embodiment has a configuration such as that described above; operations of the power generation module 20 will now be described with reference to FIGS. 13 to 16.

FIG. 13 is an explanatory drawing showing a state when there is no input to the input part.

Figure 14:
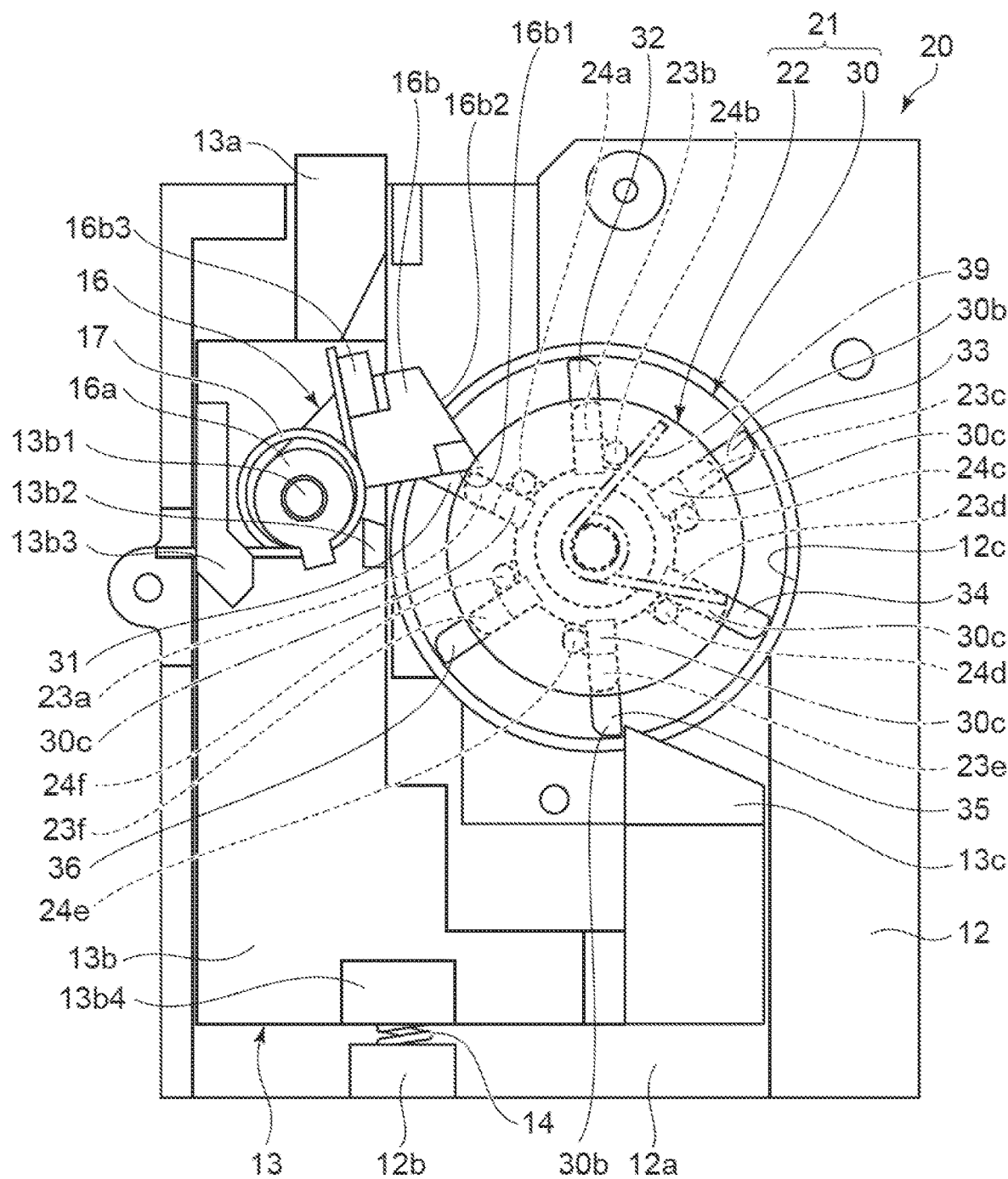
FIG. 14 is an explanatory drawing showing a state when an input is provided to the input part.

FIG. 14 is an explanatory drawing showing a state when an input is provided to the input part.

Figure 15:
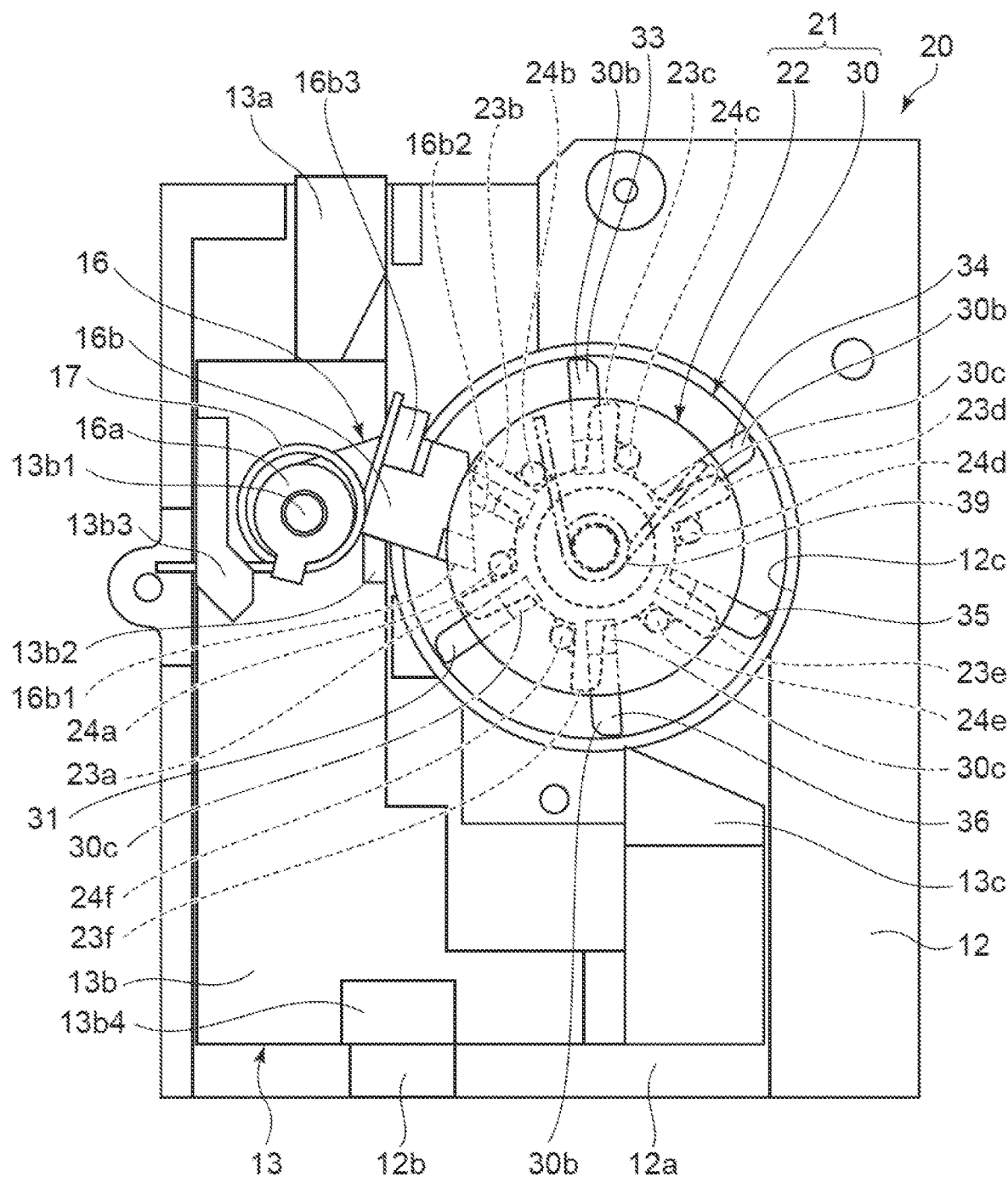
FIG. 15 is an explanatory drawing showing a state when the generator generates power.

FIG. 15 is an explanatory drawing showing a state when the generator generates power.

Figure 16:
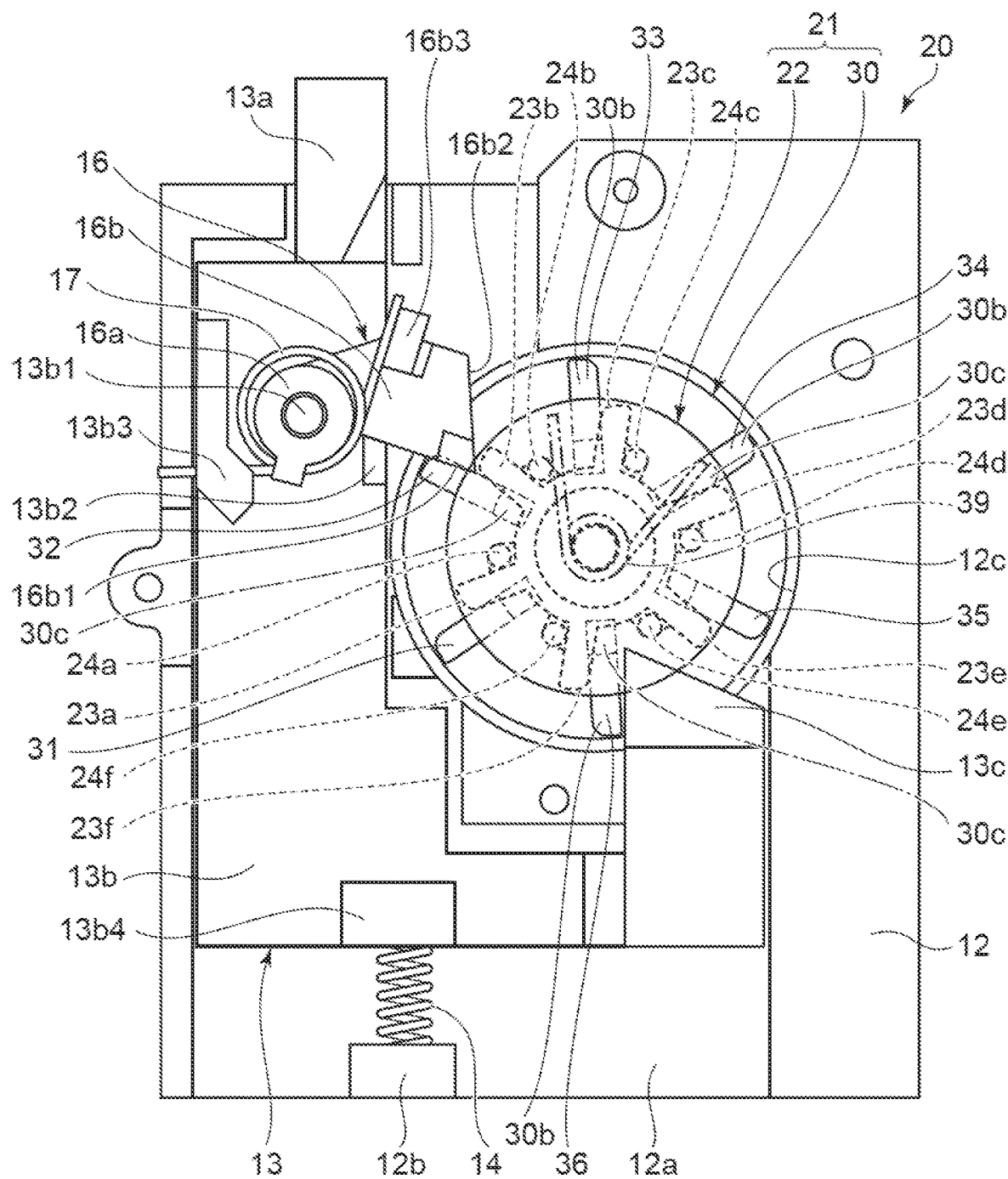
FIG. 16 is an explanatory drawing showing a state when the input to the input part is released.

FIG. 16 is an explanatory drawing showing a state when the input to the input part is released.

FIGS. 13 to 16 show states of the first and second wheels 22 and 30 in which the first wheel 22 is see-through.

First, when the operation button 3 is not operated as shown in FIG. 13, the input part 13a is at the initial position, and the first wheel 22, the second wheel 30, and the rotor 19b are at start positions. In such a case, the first projections 23a to 23f of the first wheel 22 respectively overlap the protruding parts 31 to 36 of the second wheel 30 in the longitudinal direction. The second projections 24a to 24f of the first wheel 22 abut the side surfaces of the protruding parts 31 to 36 of the second wheel 30.

When the operation button 3 is operated, the link mechanism 4 presses the input part 13a. Accordingly, as shown in FIG. 14, the moving member 13 moves (slides) through the guide part 12a against the urging force of the first elastic member 14. In such a case, the rotation of the second wheel 30 in the counterclockwise direction is restricted because the protruding part 35 contacts the lock part 13c. Accordingly, the rotation of the first wheel 22 in the counterclockwise direction also is restricted. In other words, the rotation of the rotor 19b is indirectly restricted by the lock part 13c restricting the rotation of the second wheel 30.

Accordingly, the extension part 16b of the transmission part 16 presses the first projection 23a of the first wheel 22. The transmission part 16 rotates in the counterclockwise direction around the mounting part 13b1 against the urging force of the second elastic member 17. In other words, the transmission part 16 moves relative to the moving member 13. In other words, when a force acts on the input part 13a, the second elastic member 17 stores energy (a spring force) by being contracted by the transmission part 16 while the lock part 13c restricts the rotation of the wheel 21.

As shown in FIG. 15, when the force acts further on the input part 13a and the input part 13a moves to the prescribed position, the rotation restriction of the wheel 21 by the lock part 13c is released. Accordingly, the transmission part 16 presses the first projection 23a of the first wheel 22 due to the urging force of the second elastic member 17.

As a result, the first wheel 22 rotates (a forward rotation) in the counterclockwise direction. The protruding parts 31 to 36 press the second projections 24a to 24f of the first wheel 22; and the second wheel 30 rotates in the counterclockwise direction together with the first wheel 22. In such a case, as shown in FIG. 9B, the rotor 19b of the generator 19 rotates (a forward rotation) in the counterclockwise direction together with the second wheel 30. Accordingly, the generator 19 generates power by a current flowing in the coils 19a2.

The first wheel 22 restricts further rotation by a first projection 23b contacting the sloped surface 16b2 of the transmission part 16. Here, the spring force of the third elastic member 39 located between the first wheel 22 and the second wheel 30 is less than the magnetic force of the generator 19. Accordingly, as shown in FIG. 15, the second wheel 30 is rotated in the counterclockwise direction by the magnetic force of the generator 19 to the next start position against the urging force of the third elastic member 39.

As shown in FIG. 16, the input to the input part 13a is released when the operation of the operation button 3 is released. Therefore, the moving member 13 is returned by the urging force of the first elastic member 14. In other words, the input part 13a is returned from the prescribed position to the initial position by the urging force of the first elastic member 14. In other words, the first elastic member 14 is the first return elastic member that returns the moving member 13 (the movable part) to the original position when the energy (the input) to the input part 13a is released. The first elastic member 14 (the first return elastic member) connects the receiving part 12b of the main part 12 and the pressing part 13b4 of the moving member 13.

In such a case, the first projection 23b of the first wheel 22 moves along the sloped surface 16b2 of the transmission part 16. At this time, the first wheel 22 is rotated (a reverse rotation) in the clockwise direction against the urging force of the third elastic member 39 by the transmission part 16 pressing the first projection 23b. The start position of the second wheel 30 is maintained without rotating together with the first wheel 22 because the magnetic force of the generator 19 is greater than the spring force of the third elastic member 39. In other words, the rotor 19b of the generator 19 does not rotate when the input part 13a moves from the prescribed position to the initial position.

When the input part 13a moves from the prescribed position to the initial position, it is sufficient for the state to be maintained in which the rotor 19*b* remains at the current pole and does not move to the adjacent pole. In other words, the second wheel 30 and the rotor 19*b* are allowed to move (rotate) in a range in which the rotor 19*b* does not move to the adjacent pole. In other words, the second wheel 30 and the rotor 19*b* may have a slight reverse rotation when the input part 13*a* moves from the prescribed position to the initial position.

Then, when the input part 13*a* returns to the initial position, the first projection 23*b* of the first wheel 22 is positioned below the transmission part 16. The rotation restriction of the first wheel 22 in the counterclockwise direction by the transmission part 16 is released thereby. Accordingly, the first wheel 22 is rotated by the urging force of the third elastic member 39 to the same state as FIG. 13 (the start position) and waits for the next input to the input part 13*a*. Then, when an input is provided to the input part 13*a*, the transmission part 16 rotates the second wheel 30 and the rotor 19*b* by pressing the first projection 23*b* of the first wheel 22. In the example, the wheel 21 makes one revolution by six operations of the operation buttons 3 (i.e., power generated six times).

According to the power generation module 20 according to the second embodiment, the wheel 21 includes the first wheel 22 that is rotated by the transmission part 16, and the second wheel 30 that transmits the rotation of the first wheel 22 to the rotor 19*b*. When the input part 13*a* has moved from the initial position to the prescribed position, the transmission part 16 causes the generator 19 to generate power by causing a forward rotation of the second wheel 30 and the rotor 19*b* via the first wheel 22. Subsequently, when the input part 13*a* moves from the prescribed position to the initial position, the state is maintained in which the rotor 19*b* remains at the current pole and does not move to the adjacent pole. In other words, the rotation amounts of the second wheel 30 and the rotor 19*b* are small when the input part 13*a* returns from the prescribed position to the initial position after the power generation.

Accordingly, because the rotor 19*b* of the generator 19 does not rotate when the operation button 3 of the remote control device 1 is being operated, cogging torque due to the generator 19 can be suppressed, and the operationability of the remote control device 1 can be improved. Also, the rotation of the rotor 19*b* of the generator 19 after the power generation is small. Accordingly, the power generation by the generator 19 in the power generation module 20 can be stable.

The transmission part 16 collides with the movable part (the stopper 13*b*2 of the moving member 13) when generating power. In other words, the transmission part 16 collides with the stopper 13*b*2 of the moving member 13 inside the main part 12 after the energy stored in the second elastic member 17 is released to rotate the rotatable member (the wheel 21). The main part 12 is covered with a cover. Because the transmission part 16 collides with the moving member 13 inside the main part 12, the collision sound can be less than when the transmission part 16 collides with the main part 12. Discomfort of the user due to an abnormal noise can be suppressed thereby.

The first elastic member 14 is the first return elastic member that returns the moving member 13 to the original position when the energy (the input) to the input part 13*a* is released. The first elastic member 14 (the first return elastic member) connects the main part 12 and the moving member 13. Accordingly, the moving member 13 can be returned to the initial position by the first elastic member 14 after the power generation. Also, the first elastic member 14 can absorb the collision energy when the transmission part 16 collides with the moving member 13.

The transmission part 16 moves in the same direction as the movement direction of the moving member 13. In other words, the moving member 13 moves downward when the force F acts on the input part 13*a*. Then, when the rotation restriction of the wheel 21 by the lock part 13*c* is released, the transmission part 16 moves downward due to the urging force of the second elastic member 17. In such a case, the transmission part 16 collides with the stopper 13*b*2 of the moving member 13 after rotating the wheel 21. Thus, the collision energy of the transmission part 16 when the transmission part 16 and the moving member 13 collide can be dissipated in the movement direction of the moving member 13 because the movement directions of the transmission part 16 and the moving member 13 are the same direction (down). Accordingly, the collision sound between the transmission part 16 and the moving member 13 can be small.

The transmission part 16 may collide with the moving member 13 while the moving member 13 is moving. In other words, the rotation restriction of the wheel 18 by the lock part 13*c* may be released while the moving member 13 is moving. Accordingly, the transmission part 16 and the moving member can collide when the relative velocity between the transmission part 16 and the moving member 13 is small. Accordingly, the collision sound between the transmission part 16 and the moving member 13 can be small.

FIGS. 17 to 23 show a power generation module 40 according to a third embodiment of the invention. In the power generation module 40 according to the third embodiment, a wheel 50 includes a first wheel 52 and a second wheel 60. In the third embodiment, the same components as those of the first embodiment are marked with the same reference numerals; and a description is omitted.

Figure 17:
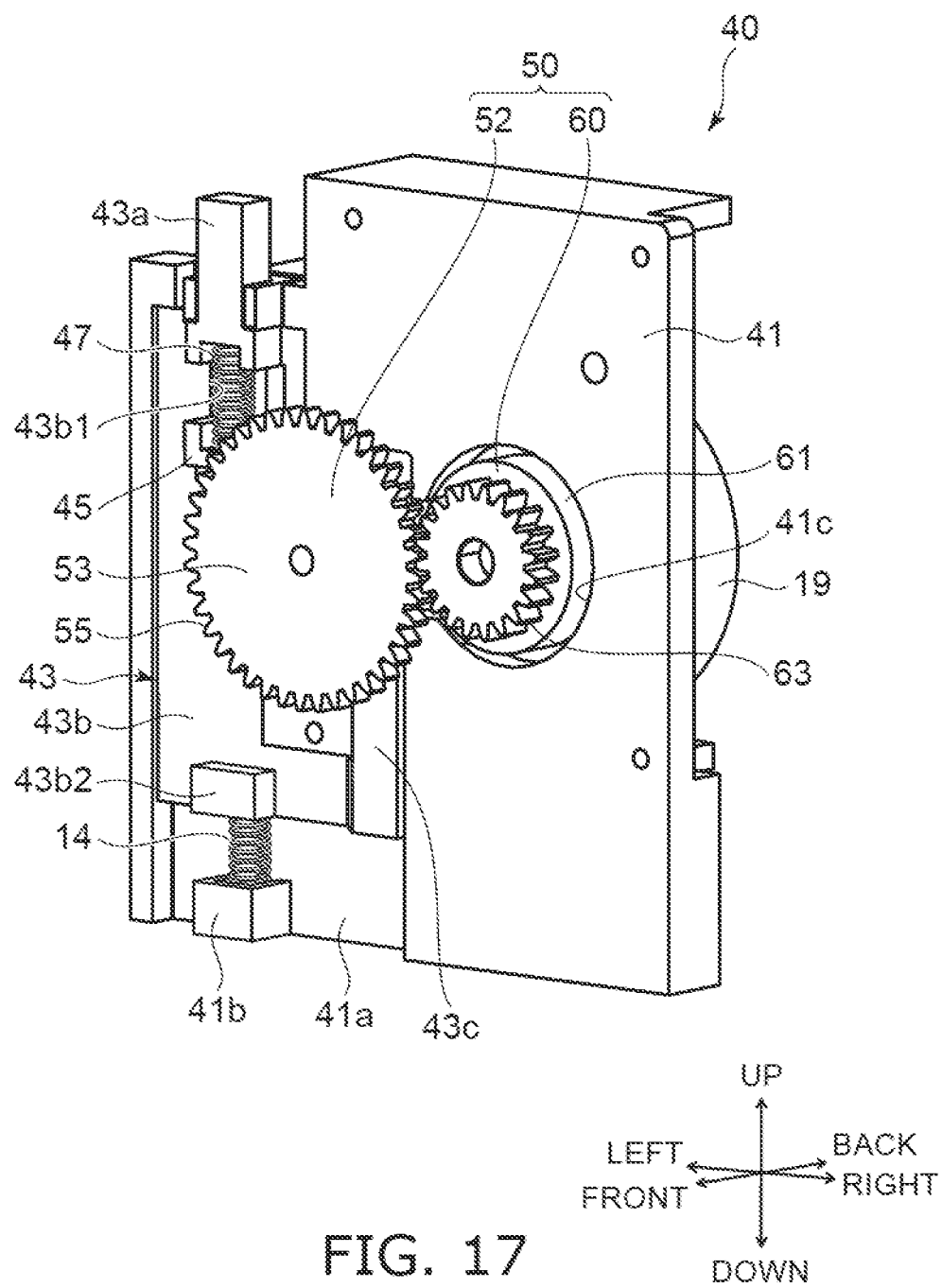
FIG. 17 is a perspective view showing the power generation module according to the third embodiment of the invention.

FIG. 17 is a perspective view showing the power generation module according to the third embodiment of the invention.

Figure 18:
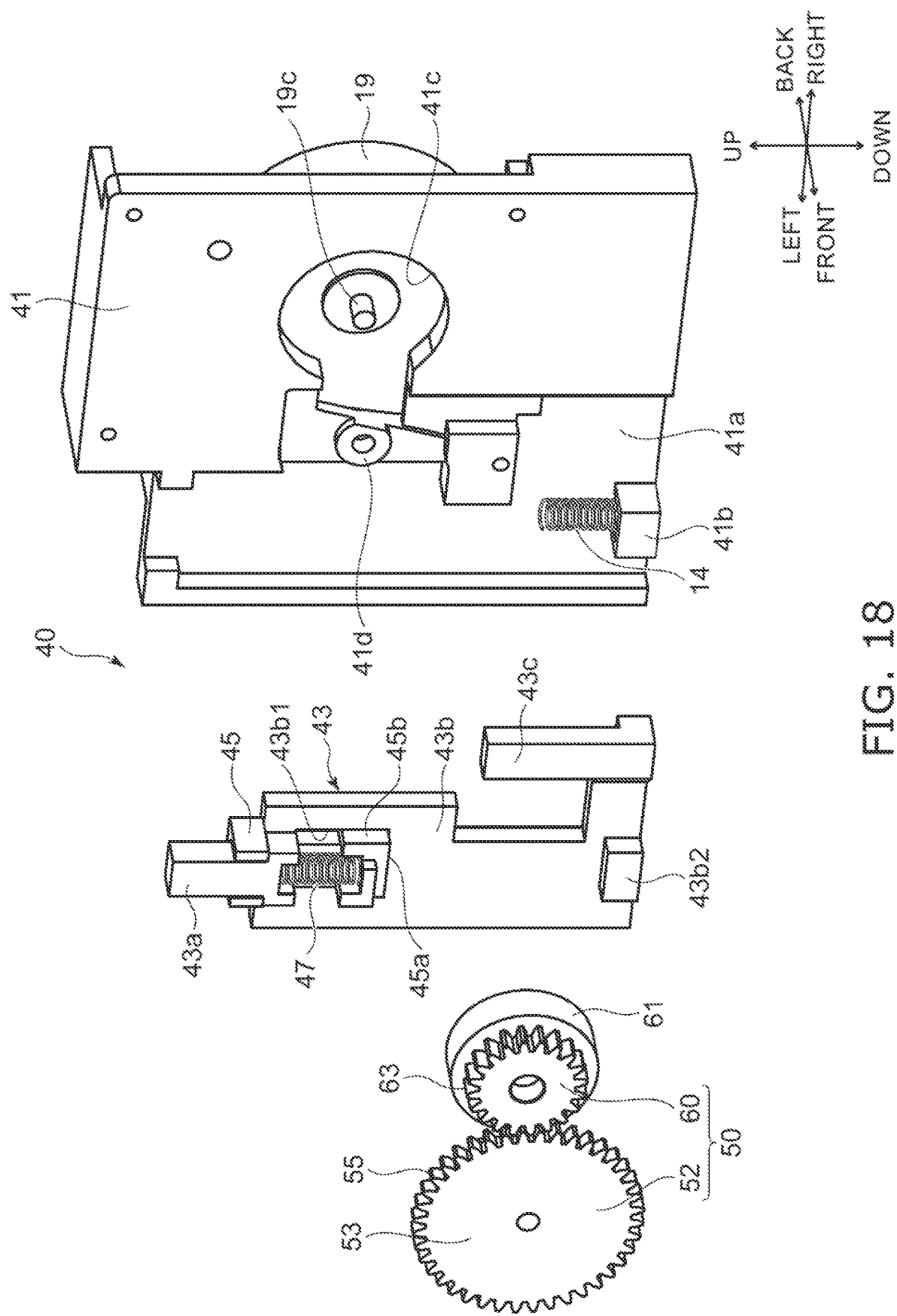
FIG. 18 is an exploded perspective view showing the disassembled power generation module of FIG. 17.

FIG. 18 is an exploded perspective view showing the disassembled power generation module of FIG. 17.

Figure 19:
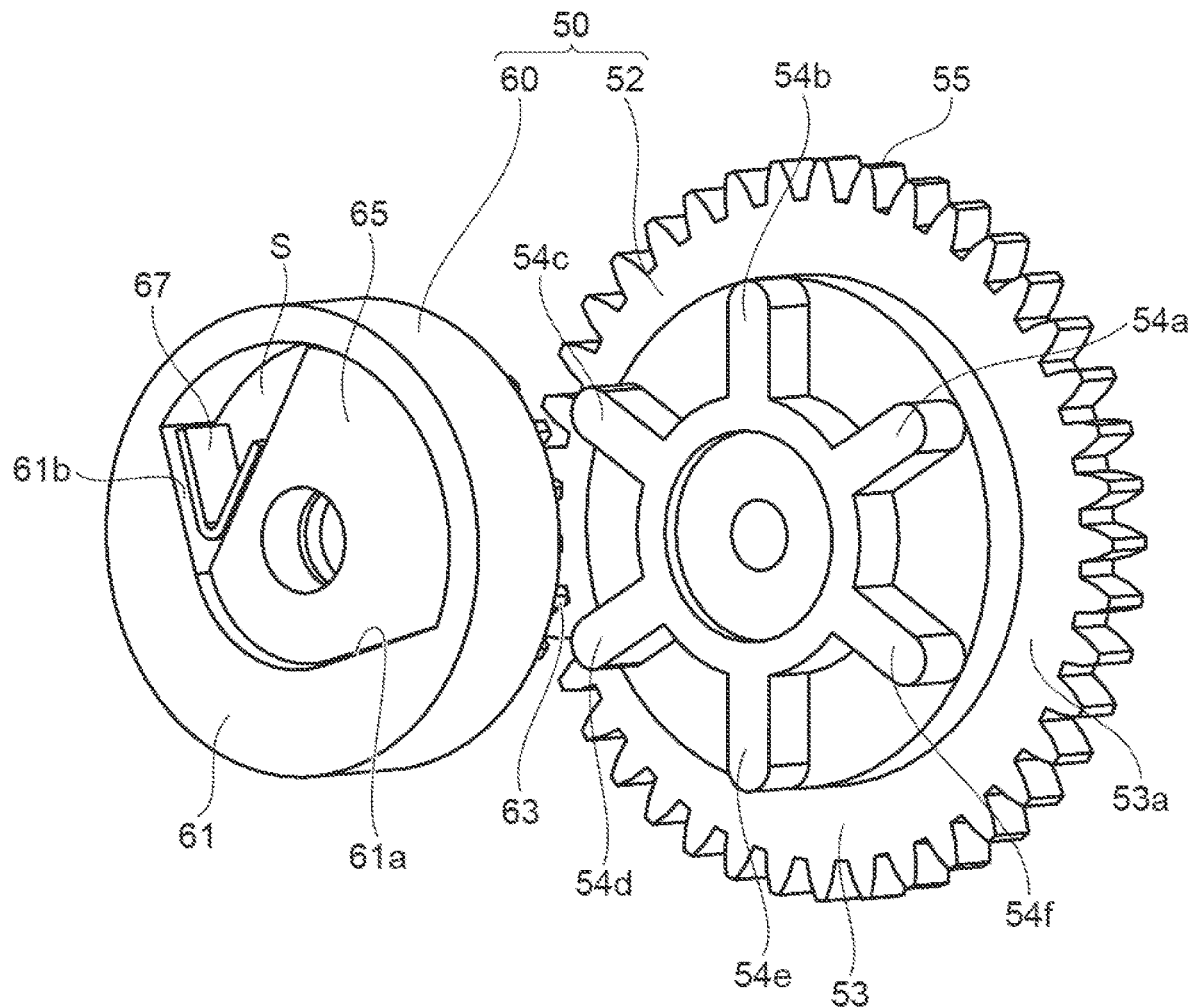
FIG. 19 is a perspective view showing the back surface of the first wheel and the back surface of the second wheel.

FIG. 19 is a perspective view showing the back surface of the first wheel and the back surface of the second wheel.

A main part 41 includes a guide part 41*a* slidably guiding a moving member 43, a receiving part 41*b* in which the first elastic member 14 is located, a through-hole 41*c* extending through the main part 41 in the thickness direction (the longitudinal direction), and a supporter 41*d* positioned at the side of the through-hole 41*c*. The through-hole 41*c* extends from the front surface toward the back surface of the main part 41; and the generator 19 is mounted at the back surface. The second wheel 60 described below is located in the through-hole 41*c*. The supporter 41*d* is located between the guide part 41*a* and the through-hole 41*c*. The first wheel 52 described below is rotatably mounted to the supporter 41*d*.

The moving member 43 includes an input part 43*a* protruding from the main part 41, an intermediate part 43*b* that is positioned inside the guide part 41*a* and connected to the input part 43*a*, and a lock part 43*c* that is connected to the intermediate part 43*b* and extends from the guide part 41*a* toward the space between the main part 41 and the first wheel 52. The moving member 43 is formed in a concave shape made of the input part 43*a*, the intermediate part 43*b*, and the lock part 43*c* when viewed in front-view. The moving member 43 is a movable part that moves with respect to the main part 41 when an operating force (energy) is input to the input part 43*a*.

Figure 20:
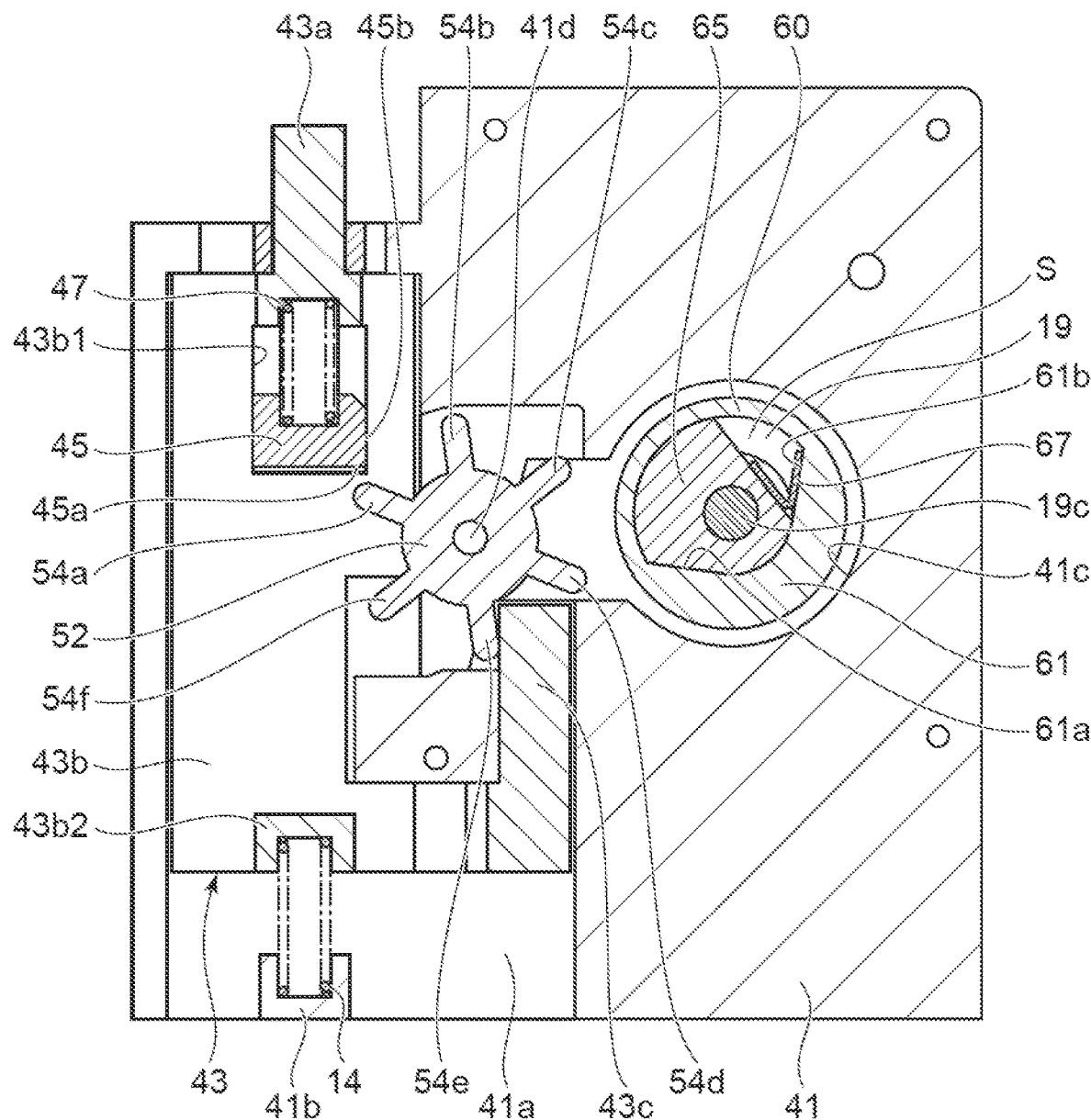
FIG. 20 is an explanatory drawing showing a state when there is no input to the input part.

Similarly to the input part 13a according to the first embodiment, the input part 43a is a part to which the operating force of the user is input. The input part 43a protrudes frontward from the intermediate part 43b. A second elastic member 47 that is described below is supported at the lower surface of the input part 43a. As shown in FIGS. 17 and 20, the position to which the input part 43a protrudes from the main part 12 is the initial position.

The intermediate part 43b is formed in an L-shape when viewed in front-view. The intermediate part 43b connects the input part 43a and the lock part 43c. The dimension in the vertical direction of the intermediate part 43b is less than the dimension in the vertical direction of the guide part 41a. Accordingly, the intermediate part 43b can slide in the vertical direction through the guide part 41a.

The intermediate part 43b includes a mounting part 43b1 to which the transmission part 45 is mounted below the input part 43a. The mounting part 43b1 is a through-hole that extends in the vertical direction and extends through the intermediate part 43b in the thickness direction (the longitudinal direction). The intermediate part 43b also includes a pressing part 43b2 engaged by the first elastic member 14 at a position facing the receiving part 41b.

Figure 22:
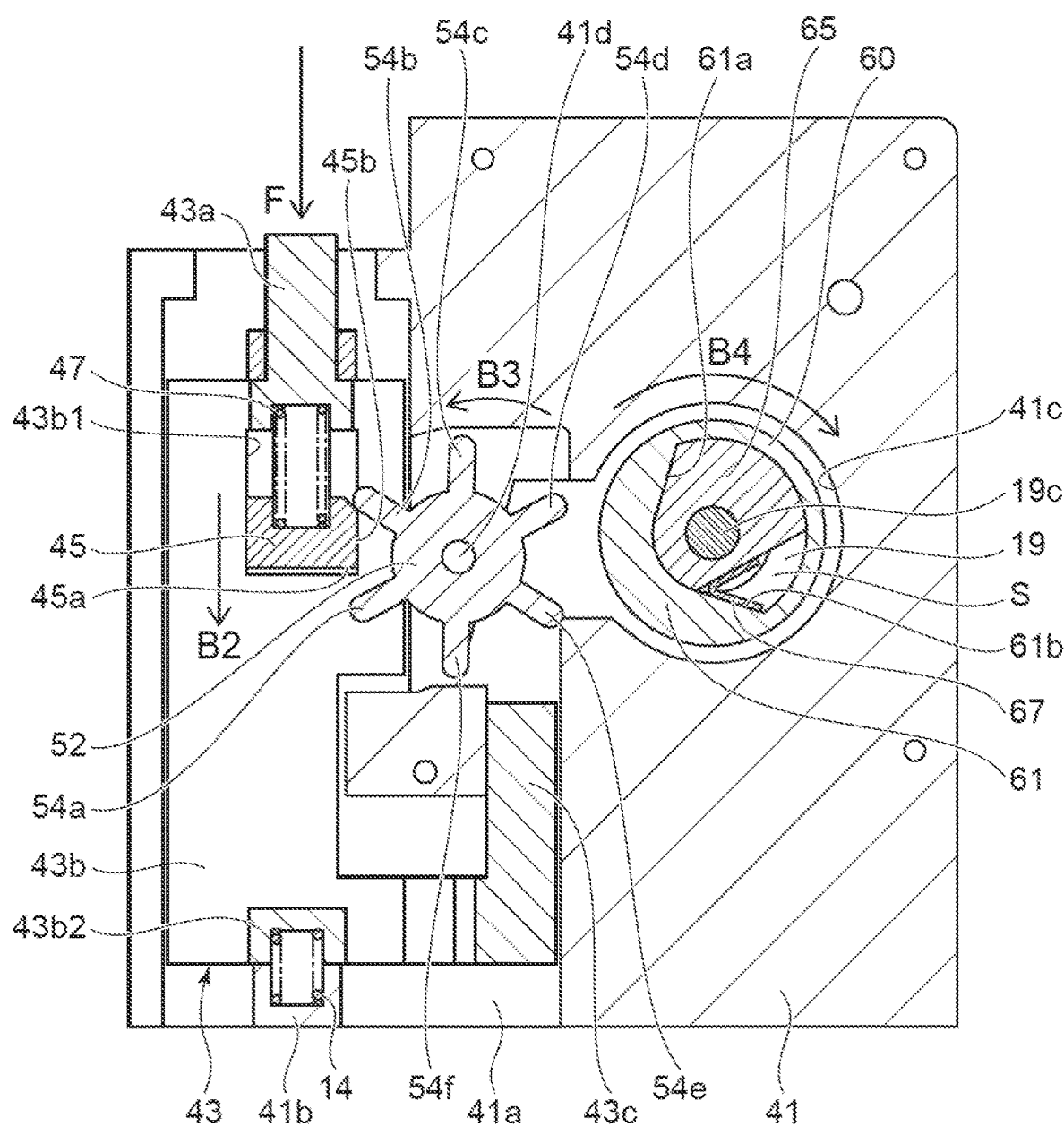
FIG. 22 is an explanatory drawing showing a state when the generator generates power.

The lock part 43c restricts the rotation of the rotor 19b of the generator 19 by a transmission part 45. In the example, the lock part 43c extends upward from the distal end of the intermediate part 43b. The movement distance of the lock part 43c is equal to the movement distance of the input part 43a. When the input part 43a is at the initial position as shown in FIG. 20, the lock part 43c restricts the rotation of the first wheel 52. In other words, the lock part 43c indirectly restricts the rotation of the rotor 19b by restricting the rotation of the first wheel 52. On the other hand, when the input part 43a has moved to the prescribed position as shown in FIG. 22, the lock part 43c releases the rotation restriction of the first wheel 52.

The transmission part 45 is mounted to the mounting part 43b1 of the moving member 43 to be slidable in the vertical direction. The transmission part 45 moves relative to the moving member 43 in the vertical direction. The transmission part 45 is formed in a concave shape having an opening at the front side. The second elastic member 47 that is described below is located inside the transmission part 45. The transmission part 45 transmits the energy stored in the second elastic member 47 to the wheel 50. The transmission part 45 enters between the moving member 43 and the first wheel 52. The lower surface of the transmission part 45 is an abutment surface 45a that abuts the first wheel 52. The side surface of the transmission part 45 at the first wheel 52 side is a contact surface 45b that contacts the first wheel 52.

The second elastic member 47 is located at the transmission part 45. The second elastic member 47 is, for example, a compression coil spring. One end (the upper end side) of the second elastic member 47 is supported by the upper surface of the mounting part 43b1; and the other end (the lower end side) of the second elastic member 47 is supported by the bottom surface of the transmission part 45. Accordingly, the second elastic member 47 urges the transmission part 45 downward. The second elastic member 47 is an elastic member that stores the energy of the force input to the input part 43a.

The wheel 50 includes the first wheel 52 rotated by the transmission part 45, and the second wheel 60 that transmits the rotation of the first wheel 52 to the rotor 19b. The wheel 50 is included in the rotatable member of the invention. The first wheel 52 and the second wheel 60 are arranged in the lateral direction. The first wheel 52 is a part that receives the energy of the second elastic member 47 from the transmission part 45. The second wheel 60 is a part that is positioned between the first wheel 52 and the generator 19 and transmits the energy received by the first wheel 52 to the generator 19.

The first wheel 52 is rotatably mounted to the supporter 41d of the main part 41. The first wheel 52 includes a disc part 53, and a gear part 55 located in the disc part 53. As shown in FIG. 19, multiple (in the example, six) protruding parts 54a to 54f are located at a back surface 53a of the disc part 53 to be separated from each other in the circumferential direction and protrude backward. The protruding parts 54a to 54f extend radially outward from the central portion of the back surface 53a.

The first wheel 52 is rotated by the protruding parts 54a to 54f being pressed by the transmission part 45. As shown in FIGS. 17 and 20, the lock part 43c is inserted between the adjacent protruding parts (in the example, between a protruding part 54d and a protruding part 54e). Accordingly, the lock part 43c restricts the rotation of the first wheel 52 in the counterclockwise direction (the forward rotation) by abutting the protruding parts 54a to 54f (in the example, the protruding part 54e).

The gear part 55 is located at the side surface (the radially outer end portion) of the disc part 53. As shown in FIG. 17, the gear part 55 is positioned further frontward than the transmission part 45. The gear part 55 meshes with a gear part 63 of the second wheel 60.

The second wheel 60 is positioned between the first wheel 52 and the generator 19. The second wheel 60 is rotated by the first wheel 52. The second wheel 60 includes a cylindrical part 61, the gear part 63 that is provided in the cylindrical part 61 and meshes with the gear part 55 of the first wheel 52, and a block body 65 that is provided to be movable inside the cylindrical part 61 and is mounted to the rotary shaft 19c of the generator 19.

For example, the cylindrical part 61 is formed in a step shape. As shown in FIG. 19, the cylindrical part 61 has a bottomed tubular shape in which a fan-like space S is formed in the back surface side. The gear part 63 is provided in the side surface (the radially outer end portion) of the cylindrical part 61. The cylindrical part 61 is rotated together with the first wheel 52 by the gear part 63 meshing with the gear part 55 of the first wheel 52. In the example, the number of teeth of the gear part 63 of the second wheel 60 is less than the number of teeth of the gear part 55 of the first wheel 52. Accordingly, the rotation angle of the second wheel 60 can be greater than the rotation angle of the first wheel 52.

The block body 65 is located inside the space S of the cylindrical part 61. The rotary shaft 19c of the generator 19 is mounted to the central part of the block body 65. In other words, the block body 65 and the rotary shaft 19c (the rotor 19b) of the generator 19 rotate together. The cylindrical part 61 is not mounted to the rotary shaft 19c of the generator 19. The cylindrical part 61 is mounted to the block body 65.

As shown in FIG. 19, the block body 65 is formed to be smaller than the space S of the cylindrical part 61. The block body 65 is rotated by being pressed by one inner surface 61a of the cylindrical part 61. By forming the block body 65 to be smaller than the space S of the cylindrical part 61, the cylindrical part 61 and the block body 65 can be relatively rotated.

A third elastic member 67 is located between the block body 65 and another inner surface 61b of the cylindrical part 61 inside the cylindrical part 61 (the space S). The third elastic member 67 is, for example, a V-shaped leaf spring and urges the block body 65 toward the inner surface 61a of the cylindrical part 61. The spring constant of the third elastic member 67 is less than the magnetic force between the stator 19a and the rotor 19b of the generator 19. In other words, the rotation of the rotor 19b of the generator 19 is not restricted by the urging force of the third elastic member 67.

Thus, the power generation module 40 according to the third embodiment has a configuration such as that described above, and operations of the power generation module 40 will now be described with reference to FIGS. 20 to 23.

FIG. 20 is an explanatory drawing showing a state when there is no input to the input part.

Figure 21:
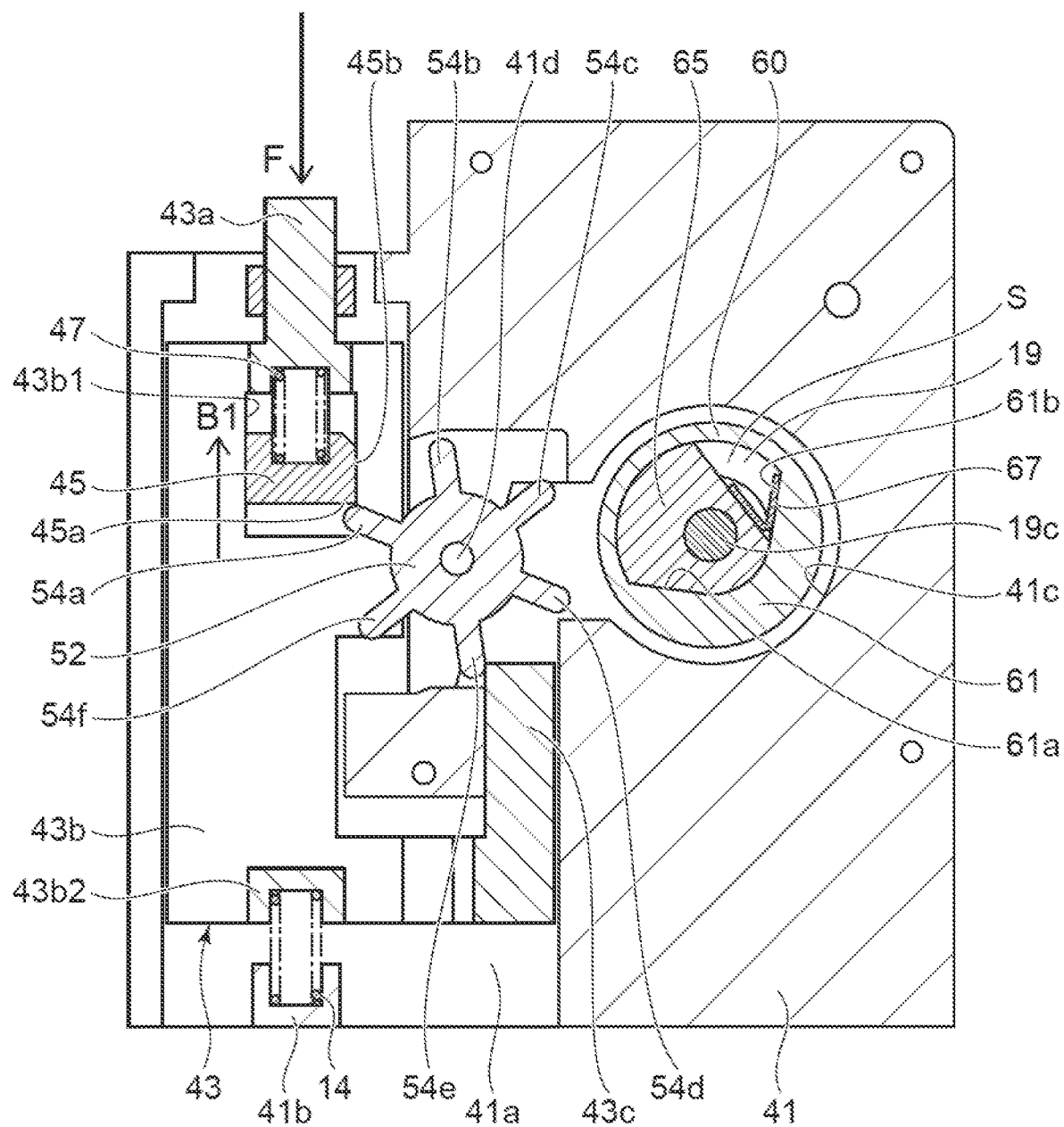
FIG. 21 is an explanatory drawing showing a state when an input is provided to the input part.

FIG. 21 is an explanatory drawing showing a state when an input is provided to the input part.

FIG. 22 is an explanatory drawing showing a state when the generator generates power.

Figure 23:
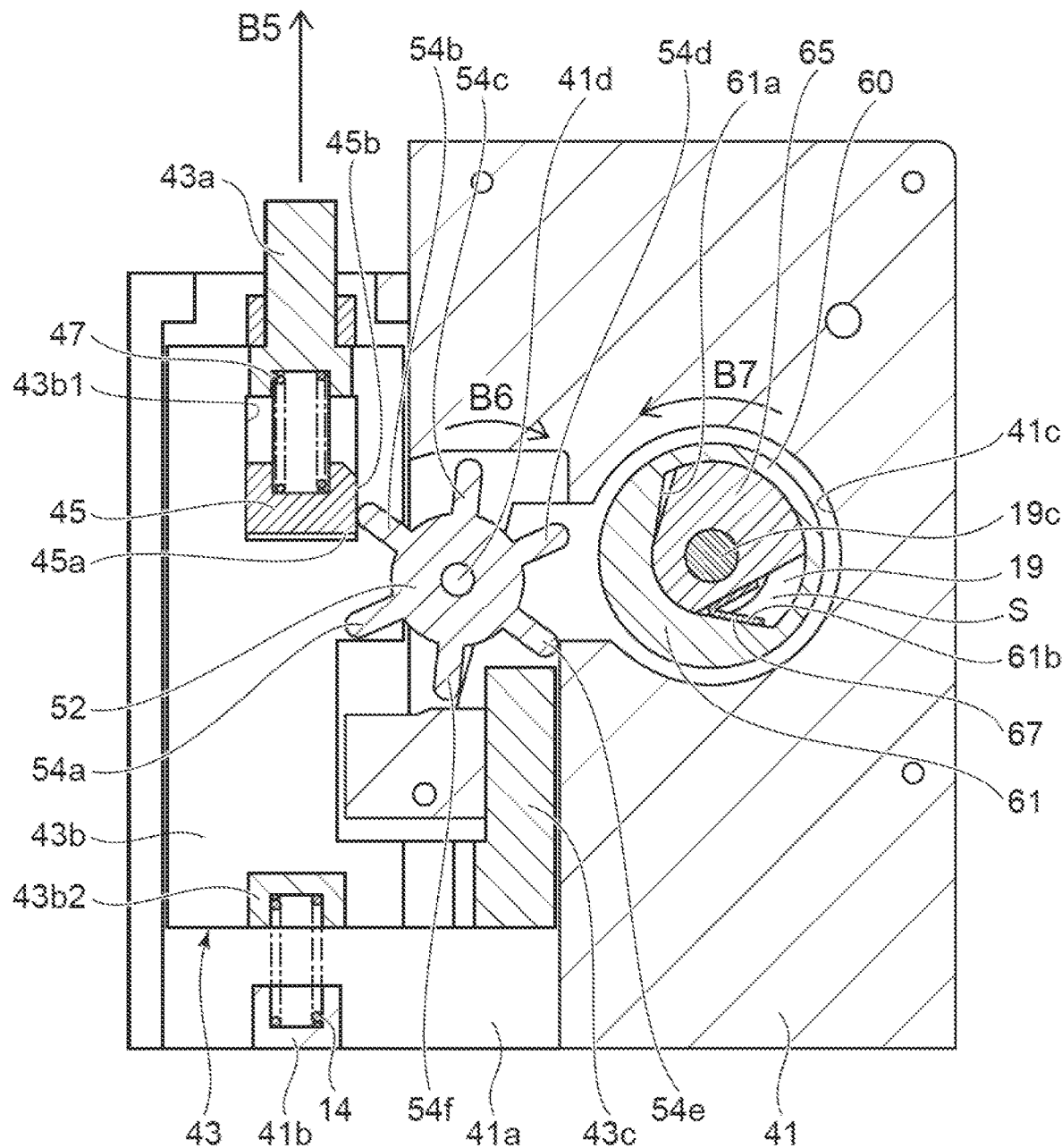
FIG. 23 is an explanatory drawing showing a state when the input to the input part is released.

FIG. 23 is an explanatory drawing showing a state when the input to the input part is released.

The longitudinal cross-sectional views of FIGS. 20 to 23 show operations of the moving member 43, the transmission part 45, the protruding parts 54a to 54f of the first wheel 52, the cylindrical part 61 of the second wheel 60, and the block body 65.

First, when the operation button 3 is not operated as shown in FIG. 20, the input part 43a is at the initial position, and the first wheel 52, the second wheel 60, and the rotor 19b are at start positions. In such a case, the lock part 43c is positioned between the protruding parts 54d and 54e. The third elastic member 67 urges the block body 65 toward the inner surface 61a of the cylindrical part 61.

When the operation button 3 is operated, the link mechanism 4 presses the input part 43a. Accordingly, as shown in FIG. 21, the force F (the operating force) acts on the input part 43a; and the moving member 43 moves (slides) through the guide part 41a against the urging force of the first elastic member 14. In such a case, the rotation of the first wheel 52 in the counterclockwise direction is restricted because the protruding part 54e contacts the lock part 43c. Accordingly, the rotation of the second wheel 60 in the clockwise direction also is restricted.

The abutment surface 45a of the transmission part 45 presses the protruding part 54a of the first wheel 52. The transmission part 45 moves in the arrow B1-direction relative to the moving member 43 against the urging force of the second elastic member 47. In other words, when the force F acts on the input part 43a, the second elastic member 47 stores energy (a spring force) by being contracted by the transmission part 45 while the lock part 43c restricts the rotation of the wheel 50.

As shown in FIG. 22, when the force F further acts on the input part 43a and the input part 43a moves to the prescribed position, the rotation restriction of the first wheel 52 by the lock part 43c is released. Accordingly, the transmission part 45 presses the protruding part 54a of the first wheel 52 in the arrow B2-direction due to the urging force of the second elastic member 47.

As a result, the first wheel 52 rotates (a forward rotation) in the arrow B3-direction (the counterclockwise direction). Further rotation of the first wheel 52 is restricted by a protruding part 54b contacting the contact surface 45b of the transmission part 45. When the first wheel 52 rotates, the second wheel 60 that meshes with the gear part 55 of the first wheel 52 rotates (a forward rotation) in the arrow B4-direction (the clockwise direction).

In such a case, the block body 65 of the second wheel 60 is rotated in the clockwise direction together with the cylindrical part 61 by being pressed by the inner surface 61a of the cylindrical part 61. The rotary shaft 19c of the generator 19 also is rotated by the rotation of the block body 65. Accordingly, the generator 19 generates power due to the rotation of the rotor 19b.

When the operation of the operation button 3 is released as shown in FIG. 23, the input to the input part 43a is released. Then, the moving member 43 moves in the arrow B5-direction due to the urging force of the first elastic member 14. In other words, the input part 43a is returned from the prescribed position to the initial position by the urging force of the first elastic member 14. In other words, the first elastic member 14 is the first return elastic member that returns the moving member 43 (the movable part) to the original position when the energy (the input) to the input part 43a is released. The first elastic member 14 (the first return elastic member) connects the receiving part 41b of the main part 41 and the pressing part 43b2 of the moving member 43.

In such a case, the protruding part 54b of the first wheel 52 moves along the contact surface 45b of the transmission part 45. At this time, the first wheel 52 is rotated (a reverse rotation) in the arrow B6-direction (the clockwise direction) by the protruding part 54b being pressed by the transmission part 45. Because the magnetic force of the generator 19 is greater than the spring force of the third elastic member 67, only the cylindrical part 61 of the second wheel 60 has a reverse rotation in the arrow B7-direction (the clockwise direction) against the urging force of the third elastic member 67. In other words, when the input part 43a moves from the prescribed position to the initial position, the rotor 19b of the generator 19 does not rotate even when the cylindrical part 61 of the second wheel 60 rotates.

It is sufficient for the state to be maintained in which the rotor 19b remains at the current pole and does not move to the adjacent pole when the input part 43a moves from the prescribed position to the initial position. In other words, the rotor 19b and the block body 65 of the second wheel 60 are allowed to move (rotate) in a range in which the rotor 19b does not move to the adjacent pole. In other words, the rotor 19b and the block body 65 of the second wheel 60 may have a slight reverse rotation when the input part 43a moves from the prescribed position to the initial position.

Then, when the input part 43a returns to the initial position, the protruding part 54b of the first wheel 52 is positioned below the transmission part 45. The rotation restriction of the first wheel 52 in the counterclockwise direction by the transmission part 45 is released thereby. Accordingly, the first wheel 52 and the second wheel 60 are rotated by the urging force of the third elastic member 67 to the start positions and wait for the next input to the input part 43a. When the next input is provided to the input part 43a, the transmission part 45 rotates the second wheel 60 and the rotor 19b by pressing the protruding part 54b of the first wheel 52. In the example, the first wheel 52 makes one revolution by six operations of the operation buttons 3 (i.e., power generated six times).

According to the power generation module 40 according to the third embodiment, the wheel 50 includes the first wheel 52 rotated by the transmission part 45, and the second wheel 60 that transmits the rotation of the first wheel 52 to the rotor 19b. The first wheel 52 includes the disc part 53, and the gear part 55 provided in the disc part 53. The second wheel 60 includes the cylindrical part 61, the gear part 63 that is provided in the cylindrical part 61 and meshes with the gear part 55 of the first wheel 52, and the block body 65 that is provided to be movable inside the cylindrical part 61 and is mounted to the rotary shaft 19c of the generator 19.

Then, when the input part 43a has moved to the prescribed position, the transmission part 45 causes a forward rotation of the second wheel 60 and the rotor 19b via the first wheel 52. Subsequently, when the input part 43a moves from the prescribed position to the initial position, the state is maintained in which the rotor 19b remains at the current pole and does not move to the adjacent pole. In other words, the rotation amount of the block body 65 of the second wheel 60 after the power generation is small due to the third elastic member 67 and the magnetic force of the generator 19.

Accordingly, because the rotor 19b of the generator 19 is not rotated when the operation button 3 of the remote control device 1 is being operated, cogging torque due to the generator 19 can be suppressed, and the operationability of the remote control device 1 can be improved. Also, the rotation of the rotor 19b of the generator 19 after the power generation is small. Accordingly, the power generation by the generator 19 in the power generation module 40 can be stable.

The transmission part 45 collides with the bottom surface of the mounting part 43b1 of the moving member 43 when generating power. In other words, the transmission part 45 collides with the movable part inside the main part 41 after rotating the rotatable member (the wheel 50) by releasing the energy stored in the second elastic member 47. The main part 41 is covered with a cover. Because the transmission part 45 collides with the moving member 43 inside the main part 41, the collision sound can be less than when the transmission part 45 collides with the main part 41. Discomfort of the user due to an abnormal noise can be suppressed thereby.

The first elastic member 14 is the first return elastic member that returns the moving member 43 to the original position when the energy (the input) to the input part 43a is released. The first elastic member 14 (the first return elastic member) connects the main part 41 and the moving member 43. Accordingly, the moving member 43 can be returned to the initial position by the first elastic member 14 after the power generation. Also, the first elastic member 14 can absorb the collision energy when the transmission part 45 collides with the moving member 43.

The transmission part 45 moves in the same direction as the movement direction of the moving member 43. In other words, the moving member 43 moves downward when the force F acts on the input part 43a. Then, when the rotation restriction of the first wheel 52 by the lock part 43c is released, the transmission part 45 moves downward due to the urging force of the second elastic member 47. In such a case, the transmission part 45 collides with the bottom surface of the mounting part 43b1 after rotating the first wheel 52. Thus, the collision energy of the transmission part 45 when the transmission part 45 and the moving member 43 collide can be dissipated in the movement direction of the moving member 43 because the movement directions of the transmission part 45 and the moving member 43 are the same direction (down). Accordingly, the collision sound between the transmission part 45 and the moving member 43 can be small.

The transmission part 45 may collide with the moving member 43 while the moving member 43 is moving. In other words, the rotation restriction of the first wheel 52 by the lock part 43c may be released while the moving member 43 is moving. Accordingly, the transmission part 45 and the moving member 43 can collide when the relative velocity between the transmission part 45 and the moving member 43 is small. Accordingly, the collision sound between the transmission part 45 and the moving member 43 can be small.

FIGS. 24 to 29 show a power generation module 70 according to a fourth embodiment of the invention. The power generation module 70 according to the fourth embodiment includes a withdrawing part 75 that allows a transmission part 80 to withdraw from a wheel 90. According to the fourth embodiment, the same components as those of the first embodiment are marked with the same reference numerals; and a description is omitted.

Figure 24:
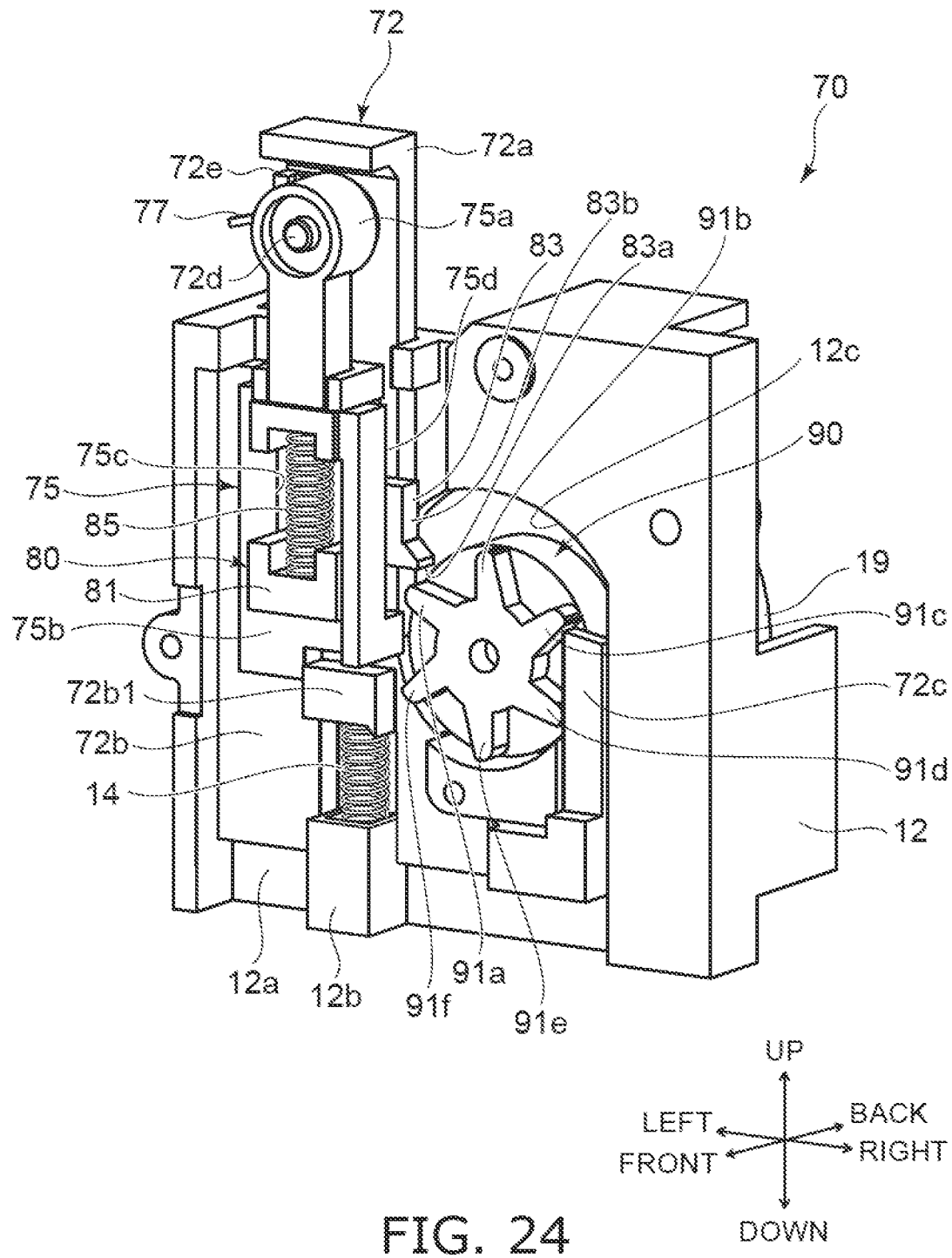
FIG. 24 is a perspective view showing the power generation module according to the fourth embodiment of the invention.

FIG. 24 is a perspective view showing the power generation module according to the fourth embodiment of the invention.

Figure 25:
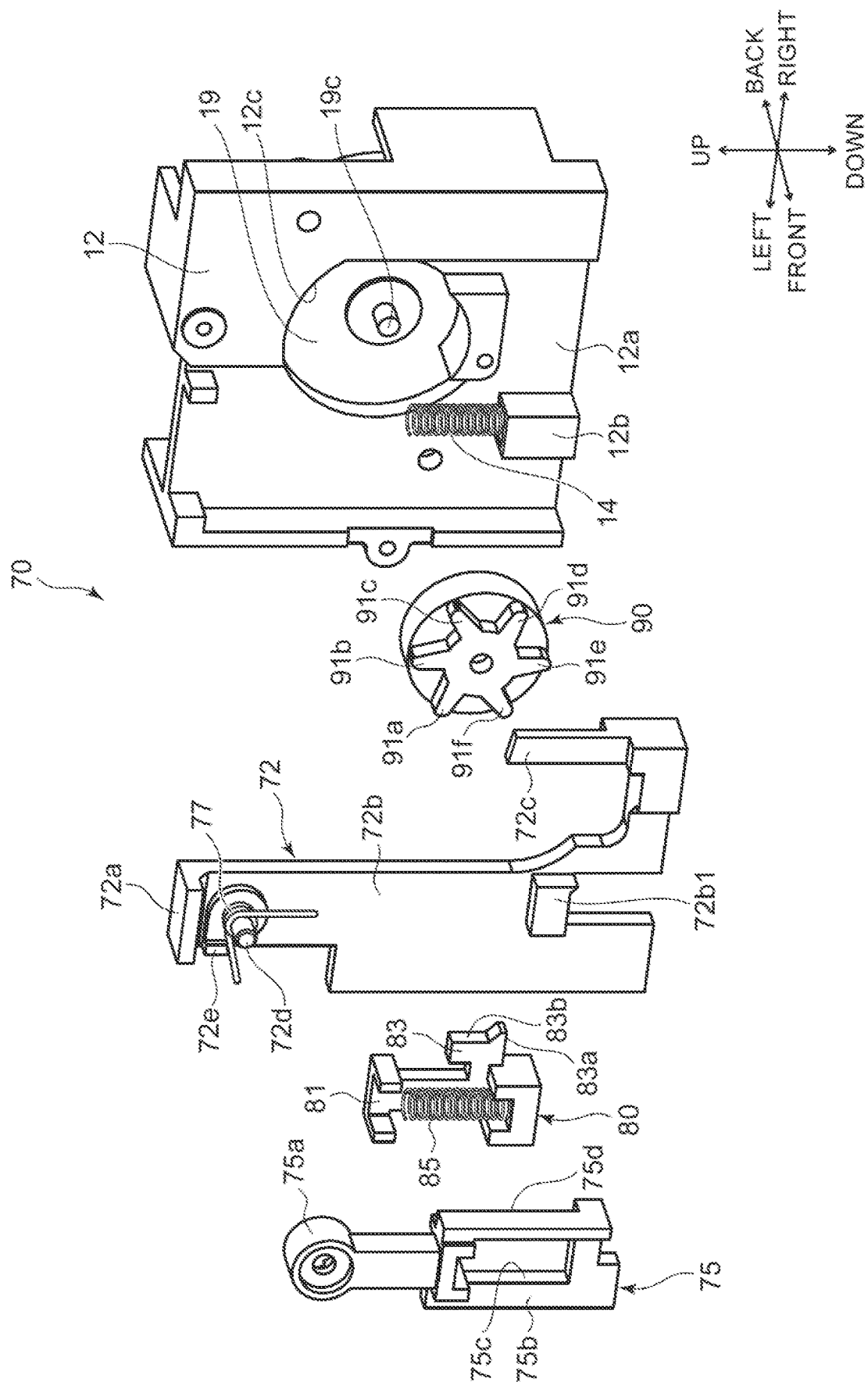
FIG. 25 is an exploded perspective view showing the disassembled power generation module of FIG. 24.

FIG. 25 is an exploded perspective view showing the disassembled power generation module of FIG. 24.

A moving member 72 includes an input part 72a protruding from the main part 12, an intermediate part 72b that is connected to the input part 72a and positioned inside the guide part 12a, and a lock part 72c that is connected to the intermediate part 72b and protrudes from the guide part 12a toward the through-hole 12c. The moving member 72 is formed in a concave shape made of the input part 72a, the intermediate part 72b, and the lock part 72c when viewed in front-view.

The input part 72a is a part to which the operating force of the user is input. For example, the input part 72a is connected to the second link 4b of the remote control device 1. When the user presses the operation button 3 of the remote control device 1, the moving member 72 is moved (slid) by the second link 4b pressing the input part 72a. The position to which the input part 72a protrudes from the main part 12 is the initial position (the state of FIG. 24). In other words, the initial position is the state in which the input part 72a is not pressed by the second link 4b. In other words, the initial position is the state when there is no input to the input part 72a.

A shaft part 72d that protrudes frontward is provided in the input part 72a. The withdrawing part 75 that is described below is rotatably mounted to the shaft part 72d. The shaft part 72d may be located at the intermediate part 72b. The input part 72a also includes an engaging part 72e that engages one end of a second elastic member 77 at a position adjacent to the shaft part 72d. The intermediate part 72b includes a pressing part 72b1 engaged by the first elastic member 14 at a position facing the receiving part 12b.

Figure 26:
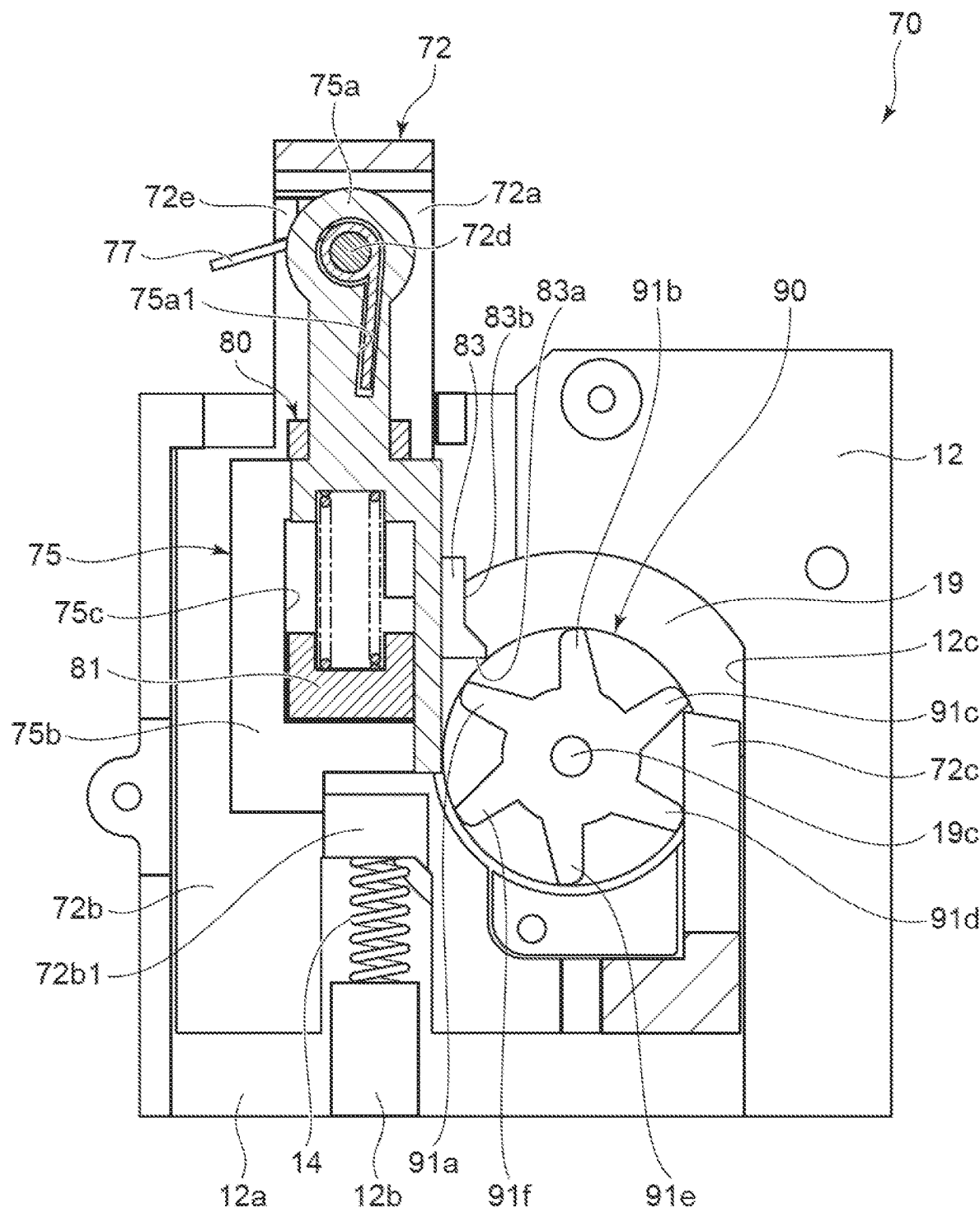
FIG. 26 is an explanatory drawing showing a state when there is no input to the input part.
Figure 28:
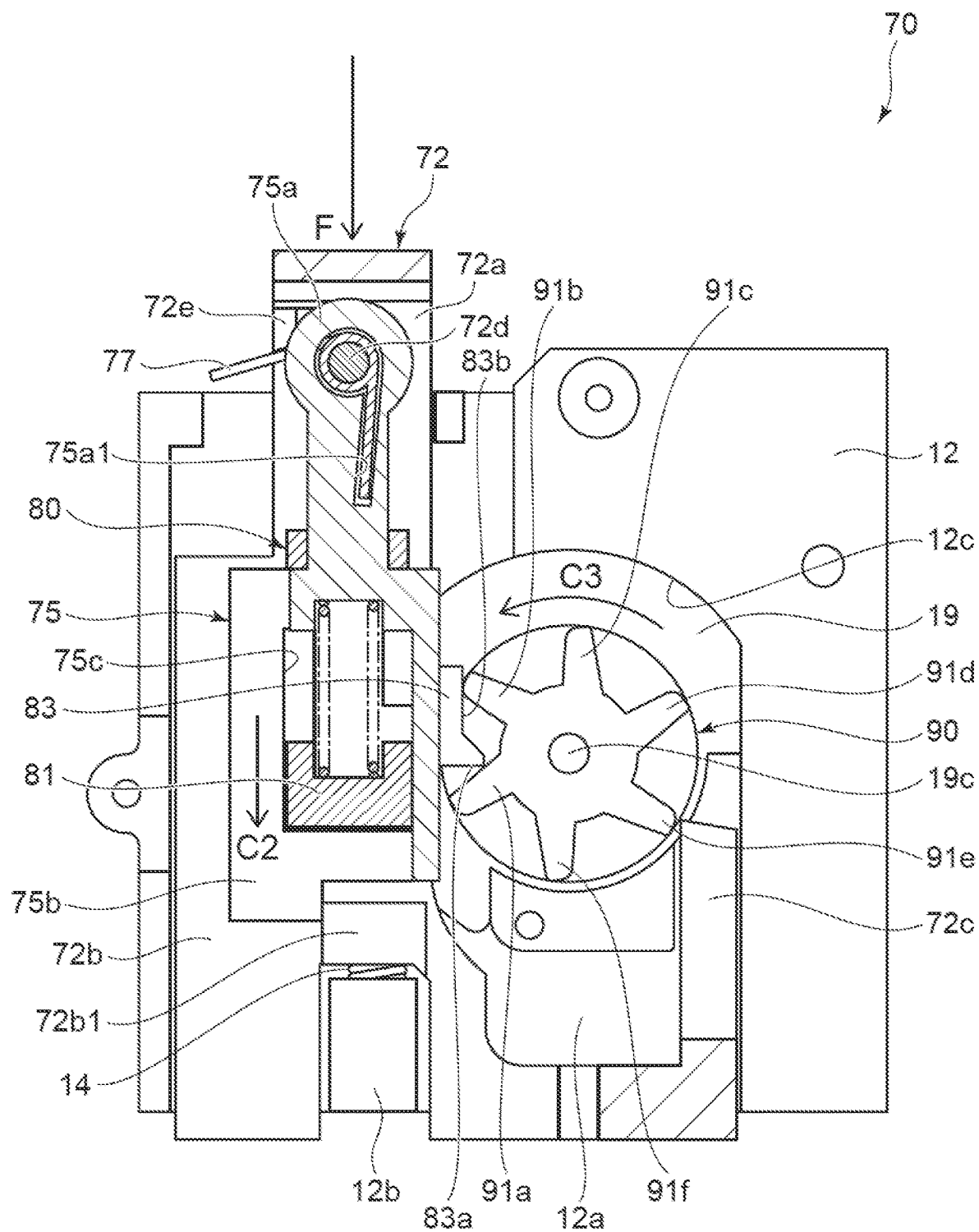
FIG. 28 is an explanatory drawing showing a state when the generator generates power.

The lock part 72c restricts the rotation of the rotor 19b of the generator 19 by the transmission part 80. In the example, the lock part 72c extends upward from the distal end of the intermediate part 72b. The movement distance of the lock part 72c is equal to the movement distance of the input part 72a. As shown in FIG. 26, the lock part 72c protrudes into the through-hole 12c when the input part 72a is at the initial position. On the other hand, as shown in FIG. 28, the lock part 72c is outside the through-hole 12c when the input part 72a has moved to the prescribed position.

The prescribed position is, for example, the end position (the final position) when a force is applied to the input part 72a and the input part 72a (the moving member 72) moves. The lock part 72c restricts the rotation of the wheel 90 positioned inside the through-hole 12c when the input part 72a is between the initial position and the prescribed position. In other words, the lock part 72c indirectly restricts the rotation of the rotor 19b by restricting the rotation of the wheel 90.

The withdrawing part 75 is rotatably mounted to the shaft part 72d of the moving member 72. The withdrawing part 75 extends from the input part 72a toward the intermediate part 72b while being mounted to the shaft part 72d. The withdrawing part 75 includes a rotation part 75a mounted to the shaft part 72*d*, and a hanging part 75*b* that extends downward from the rotation part 75*a*. The moving member 72 and the withdrawing part 75 are movable parts that move with respect to the main part 12 when the operating force (the energy) is input to the input part 72*a*.

The rotation part 75*a* is formed in a tubular shape having an opening at the back surface side. The rotation part 75*a* includes an engaging part 75*a*1 engaged by the other end of the second elastic member 77 at the back surface side of the rotation part 75*a*. In the withdrawing part 75, the rotation part 75*a* is a rotatable fixed end, and the hanging part 75*b* is a free end. In other words, the withdrawing part 75 is suspended from the shaft part 72*d*.

The hanging part 75*b* is formed in a step shape in the vertical direction. The hanging part 75*b* includes a mounting part 75*c* to which the transmission part 80 that is described below is mounted. The mounting part 75*c* is a through-hole that extends in the vertical direction and extends through the hanging part 75*b* in the thickness direction (the longitudinal direction). The hanging part 75*b* also includes an insertion through-hole 75*d* at the side (the wheel 90 side) of the mounting part 75*c* through which an extension part 83 of the transmission part 80 is inserted. Similarly to the mounting part 75*c*, the insertion through-hole 75*d* extends in the vertical direction.

For example, the second elastic member 77 is made of a torsion coil spring and is wound on the outer circumference of the shaft part 72*d*. One end of the second elastic member 77 engages the engaging part 72*e* of the moving member 72; and the other end of the second elastic member 77 engages the engaging part 75*a*1 of the withdrawing part 75. The spring constant of the second elastic member 77 is less than the magnetic force between the stator 19*a* and the rotor 19*b* of the generator 19.

The second elastic member 77 urges the withdrawing part 75 in the counterclockwise direction. When the input part 72*a* is at the initial position, the rotation of the withdrawing part 75 in the counterclockwise direction is restricted by the lower end of the withdrawing part 75 contacting the side surface of the pressing part 72*b*1 of the moving member 72. The second elastic member 77 is a second return elastic member that returns, to the original position, the transmission part 80 that moved in a direction away from the wheel 90 when the input of the energy to the input part 72*a* was released and the movable part returned to the original position.

The transmission part 80 is provided to be movable relative to the withdrawing part 75 at the mounting part 75*c* of the withdrawing part 75. The transmission part 80 includes a supporter 81 formed in a concave shape and supported by a third elastic member 85, and the extension part 83 that extends from the supporter 81 toward the wheel 90. As shown in FIG. 24, the supporter 81 is positioned inside the mounting part 75*c*.

The extension part 83 protrudes from the insertion through-hole 75*d* of the withdrawing part 75 toward the through-hole 12*c*. The distal side of the lower surface of the extension part 83 is an abutment surface 83*a* that abuts the wheel 90 positioned inside the through-hole 12*c*. The transmission part 80 rotates the wheel 90 by the abutment surface 83*a* pressing protruding parts 91*a* to 91*f* of the wheel 90 downward. The side surface of the extension part 83 is a contact surface 83*b* contacted by the protruding parts 91*a* to 91*f* when the wheel 90 rotates in the counterclockwise direction.

The third elastic member 85 is located at the transmission part 80. The third elastic member 85 is, for example, a compression coil spring. One end (the upper end side) of the third elastic member 85 is supported by the upper surface of the mounting part 75*c*; and the other end (the lower end side) of the third elastic member 85 is supported by the bottom surface of the transmission part 80. Accordingly, the third elastic member 85 urges the transmission part 80 downward. The third elastic member 85 is an elastic member that stores the energy of the force input to the input part 72*a*.

The wheel 90 is positioned inside the through-hole 12*c* of the main part 12 and located at the rotary shaft 19*c* of the generator 19. The wheel 90 is included in the rotatable member of the invention. The rotary shaft 19*c* of the generator 19 is mounted to the central part of the wheel 90. Accordingly, the rotary shaft 19*c* of the generator 19 can be rotated by rotating the wheel 90. In other words, the wheel 90 and the rotary shaft 19*c* rotate together in the same direction. The wheel 90 is rotated by the pressing of the transmission part 80 due to the energy (the urging force) of the third elastic member 85.

The wheel 90 includes the multiple (in the example, six) protruding parts 91*a* to 91*f* spreading radially from the central part. The wheel 90 rotates (a forward rotation) in the counterclockwise direction by the protruding parts 91*a* to 91*f* being pressed by the extension part 83 of the transmission part 80.

As shown in FIGS. 24 and 26, the protruding part (in the example, the protruding part 91*d*) abuts the lock part 72*c* while the input part 72*a* moves from the initial position to the prescribed position. Accordingly, the lock part 72*c* restricts the rotation of the wheel 90 in the counterclockwise direction (the forward rotation).

Thus, the power generation module 70 according to the fourth embodiment has a configuration such as that described above, and operations of the power generation module 70 will now be described with reference to FIGS. 26 to 29.

FIG. 26 is an explanatory drawing showing a state when there is no input to the input part.

Figure 27:
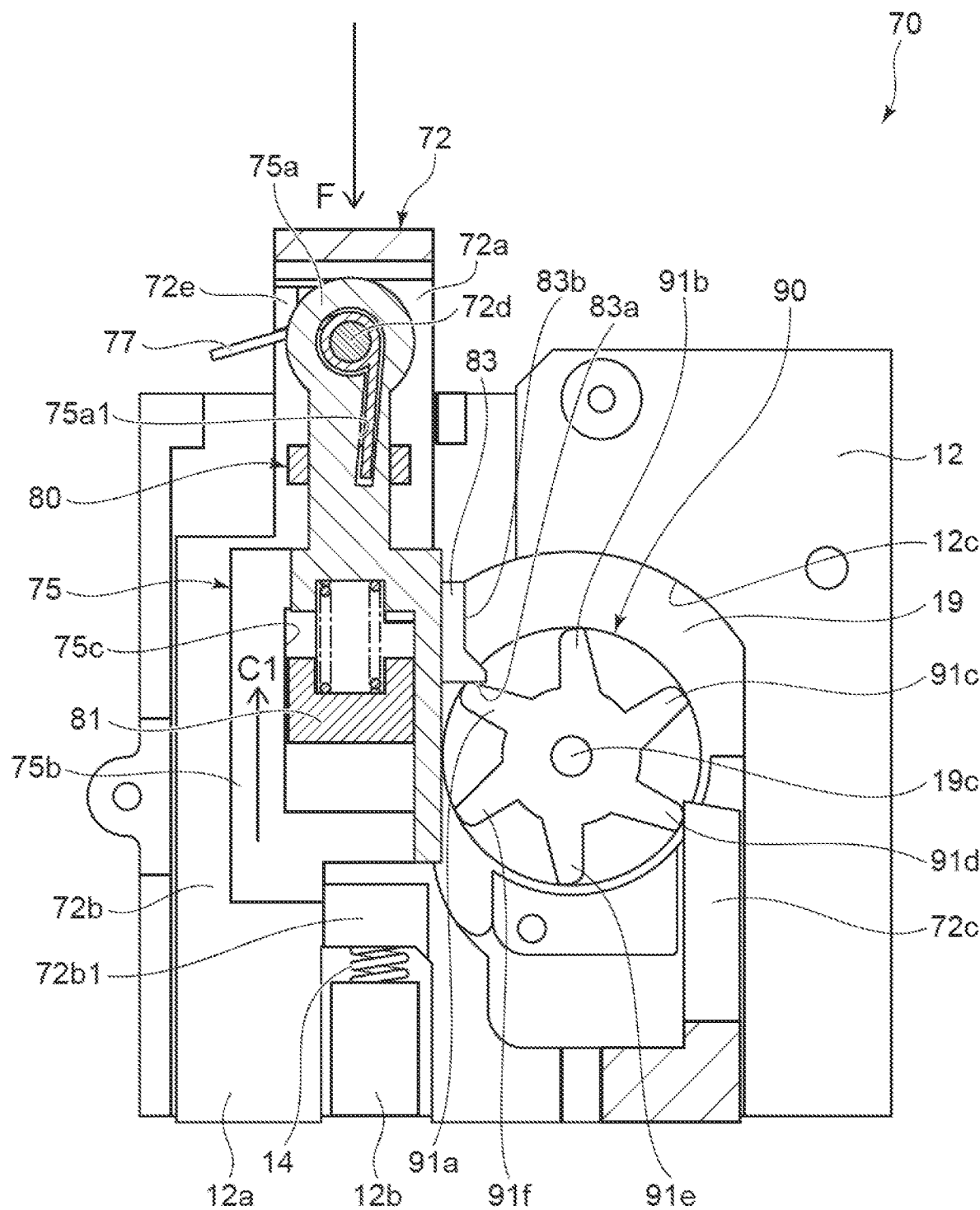
FIG. 27 is an explanatory drawing showing a state when an input is provided to the input part.

FIG. 27 is an explanatory drawing showing a state when an input is provided to the input part.

FIG. 28 is an explanatory drawing showing a state when the generator generates power.

Figure 29:
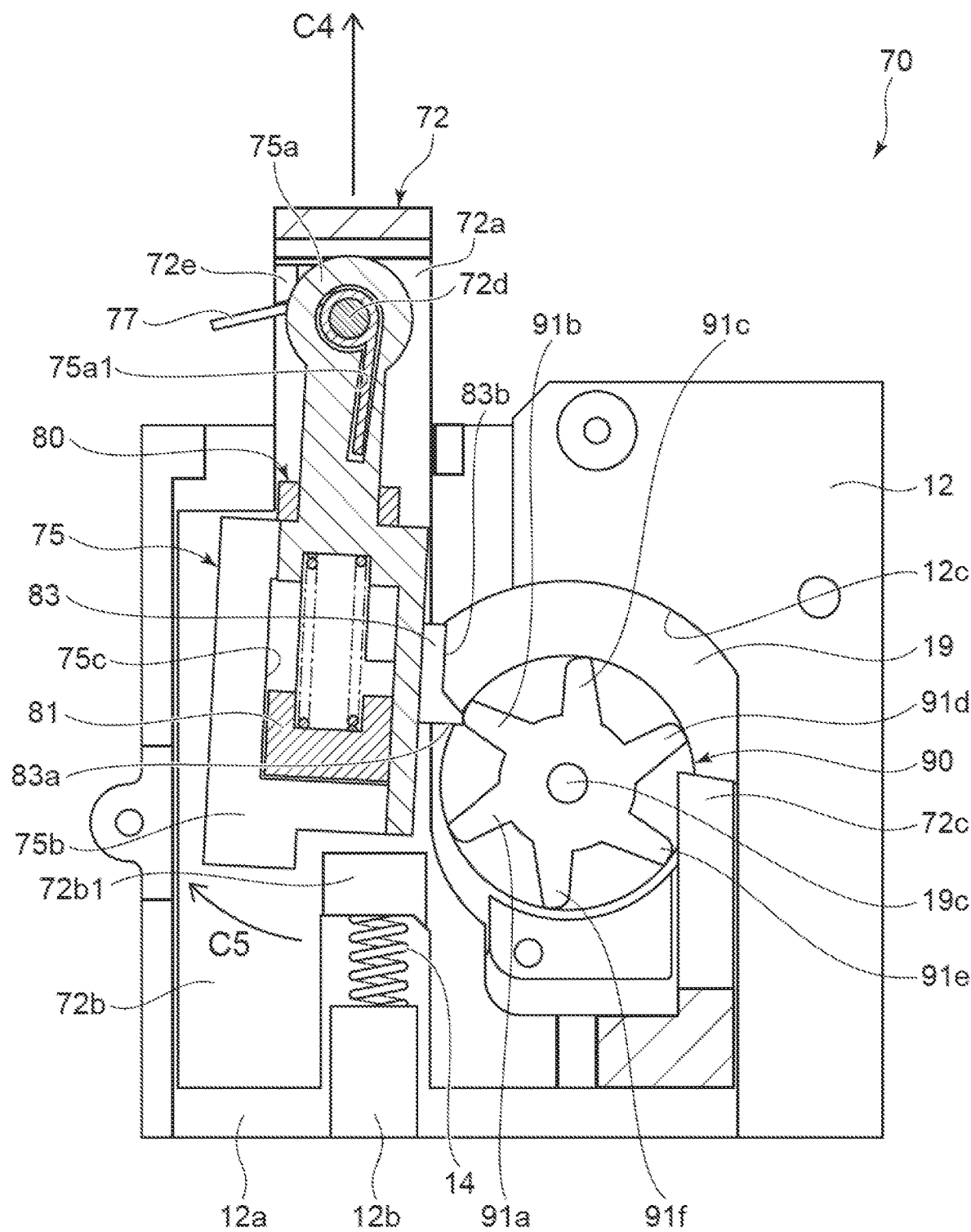
FIG. 29 is an explanatory drawing showing a state when the input to the input part is released.

FIG. 29 is an explanatory drawing showing a state when the input to the input part is released.

The longitudinal cross-sectional views of FIGS. 26 to 29 show operations of the moving member 72, the transmission part 80, the withdrawing part 75, and the protruding parts 91*a* to 91*f* of the wheel 90.

First, when the operation button 3 is not operated as shown in FIG. 26, the input part 72*a* is at the initial position, and the wheel 90 and the rotor 19*b* are at start positions. In such a case, the rotation of the wheel 90 in the counterclockwise direction is restricted by the protruding part 91*d* contacting the lock part 72*c*.

When the operation button 3 is operated, the link mechanism 4 presses the input part 72*a*. Accordingly, as shown in FIG. 27, the force F (the operating force) acts on the input part 72*a*; and the moving member 72 moves (slides) through the guide part 12*a* against the urging force of the first elastic member 14. In such a case, the rotation of the wheel 90 in the counterclockwise direction is restricted by the lock part 72*c*.

Because the rotation of the wheel 90 is restricted, the abutment surface 83*a* of the transmission part 80 is pressed by the protruding part 91*a* of the wheel 90. The transmission part 80 moves relative to the moving member 72 in the arrow C1-direction against the urging force of the third elastic member 85. In other words, when the force F acts on the input part 72a, the third elastic member 85 stores energy (a spring force) by being contracted by the transmission part 80 while the lock part 72c restricts the rotation of the wheel 90.

As shown in FIG. 28, when the force F further acts on the input part 72a and the input part 72a moves to the prescribed position, the rotation restriction of the wheel 90 by the lock part 72c is released. Accordingly, the transmission part 80 presses the protruding part 91a of the wheel 90 in the arrow C2-direction due to the urging force of the third elastic member 85.

As a result, the wheel 90 rotates (a forward rotation) in the arrow C3-direction (the counterclockwise direction). Further rotation of the wheel 90 is restricted by the protruding part 91b contacting the contact surface 83b of the transmission part 80. The rotor 19b of the generator 19 is rotated by the rotation of the wheel 90. Accordingly, a current flows in the coils 19a2 in the generator 19 (power is generated). After the generator 19 generates power, the wheel 90 and the rotor 19b are positioned at start positions.

When the input to the input part 72a is released as shown in FIG. 29, the moving member 72 is moved in the arrow C4-direction by the urging force of the first elastic member 14. In other words, the input part 72a is returned from the prescribed position to the initial position by the urging force of the first elastic member 14. In other words, the first elastic member 14 is the first return elastic member that returns the movable part (the moving member 72 and the withdrawing part 75) to the original position when the energy (the input) to the input part 72a is released. The first elastic member 14 (the first return elastic member) connects the receiving part 12b of the main part 12 and the pressing part 72b1 of the moving member 72 included in the movable part.

Here, the spring force of the second elastic member 77 urging the withdrawing part 75 is less than the magnetic force of the generator 19. Accordingly, the withdrawing part 75 is moved in the arrow C5-direction (a direction away from the wheel 90) by the extension part 83 of the transmission part 80 being pressed by the protruding part 91b of the wheel 90. In other words, the extension part 83 of the transmission part 80 moves in a direction to avoid the protruding parts 91a to 91f of the wheel 90 when the input part 72a returns from the prescribed position to the initial position. In other words, the wheel 90 and the rotor 19b of the generator 19 do not rotate when the input part 72a moves from the prescribed position to the initial position.

It is sufficient for the state to be maintained in which the rotor 19b remains at the current pole and does not move to the adjacent pole when the input part 72a moves from the prescribed position to the initial position. In other words, the wheel 90 and the rotor 19b are allowed to move (rotate) in a range in which the rotor 19b does not move to the adjacent pole. In other words, the wheel 90 and the rotor 19b may have a slight reverse rotation when the input part 72a moves from the prescribed position to the initial position.

Then, when the input part 72a returns to the initial position, the protruding part 91b of the wheel 90 is positioned below the extension part 83. Accordingly, the wheel 90 waits for the next input to the input part 72a. Then, when the input is provided to the input part 72a, the wheel 90 and the rotor 19b are rotated by the transmission part 80 pressing the protruding part 91b of the wheel 90. In the example, the wheel 90 makes one revolution by six operations of the operation buttons 3 (i.e., power generated six times).

The power generation module 70 according to the fourth embodiment further includes the withdrawing part 75 that allows the transmission part 80 to withdraw from the rotatable member (the wheel 90) while maintaining the state in which the rotor 19b remains at the current pole and does not move to the adjacent pole when the input part 72a moves from the prescribed position to the initial position. In other words, the rotation amount of the wheel 90 after the power generation is small due to the withdrawing part 75, the second elastic member 77, and the magnetic force of the generator 19.

Accordingly, because the rotor 19b of the generator 19 does not rotate when the operation button 3 of the remote control device 1 is being operated, cogging torque due to the generator 19 can be suppressed, and the operationability of the remote control device 1 can be improved. Also, the rotation of the rotor 19b of the generator 19 after the power generation is small. Accordingly, the power generation by the generator 19 in the power generation module 40 can be stable.

The transmission part 80 collides with the bottom surface of the mounting part 75c of the withdrawing part 75 when generating power. In other words, the transmission part 80 collides with the movable part (the withdrawing part 75) inside the main part 12 after rotating the rotatable member (the wheel 90) due to the energy stored in the third elastic member 85 being released. The main part 12 is covered with a cover. Because the transmission part 80 collides with the movable part inside the main part 12, the collision sound can be less than when the transmission part 80 collides with the main part 12. Discomfort of the user due to an abnormal noise can be suppressed thereby.

The first elastic member 14 is the first return elastic member that returns the movable part (the moving member 72 and the withdrawing part 75) to the original position when the energy (the input) to the input part 72a is released. The first elastic member 14 (the first return elastic member) connects the main part 12 and the moving member 72. Accordingly, the movable part can be returned to the initial position by the first elastic member 14 after the power generation. Also, the first elastic member 14 can absorb the collision energy when the transmission part 16 collides with the movable part.

The transmission part 80 moves in the same direction as the movement direction of the movable part. In other words, the moving member 72 and the withdrawing part 75 move together downward when the force F acts on the input part 72a. Then, when the rotation restriction of the wheel 90 by the lock part 72c is released, the transmission part 80 moves downward due to the urging force of the third elastic member 85. In such a case, the transmission part 80 collides with the withdrawing part 75 included in the movable part after rotating the wheel 90. Thus, the collision energy of the transmission part 80 when the transmission part 80 and the withdrawing part 75 collide can be dissipated in the movement direction of the withdrawing part 75 because the movement directions of the transmission part 80 and the withdrawing part 75 are the same direction (down). Accordingly, the collision sound between the transmission part 80 and the withdrawing part 75 can be small.

The transmission part 80 may collide with the movable part while the movable part is moving. In other words, the rotation restriction of the wheel 90 by the lock part 72c may be released while the movable part (the moving member 72 and the withdrawing part 75) is moving. Accordingly, the transmission part 80 and the movable part can collide while the relative velocity between the transmission part 80 and the movable part is small. Accordingly, the collision sound between the transmission part 80 and the movable part can be small.

The power generation module 70 further includes the second return elastic member (the second elastic member 77) that returns, to the original position, the transmission part 80 that moves in the direction away from the rotatable member (the wheel 90) when the input of the energy to the input part 72a was released and the movable part (the moving member 72 and the withdrawing part 75) was returned to the original position. The transmission part 80 moves in a direction away from the wheel 90 together with the withdrawing part 75. The second elastic member 77 returns, to the space between the protruding parts of the wheel 90, the abutment surface 83a of the transmission part 80 that moved in the direction away from the wheel 90 by being pressed by the wheel 90. Accordingly, the second elastic member 77 can return the transmission part 80 to the original position after the power generation.

FIGS. 30 to 35 show a power generation module 100 according to a fifth embodiment of the invention. In the power generation module 100 according to the fifth embodiment, a lock part 150 restricts the movement of a transmission part 140. According to the fifth embodiment, the same components as those of the first embodiment are marked with the same reference numerals; and a description is omitted.

Figure 30:
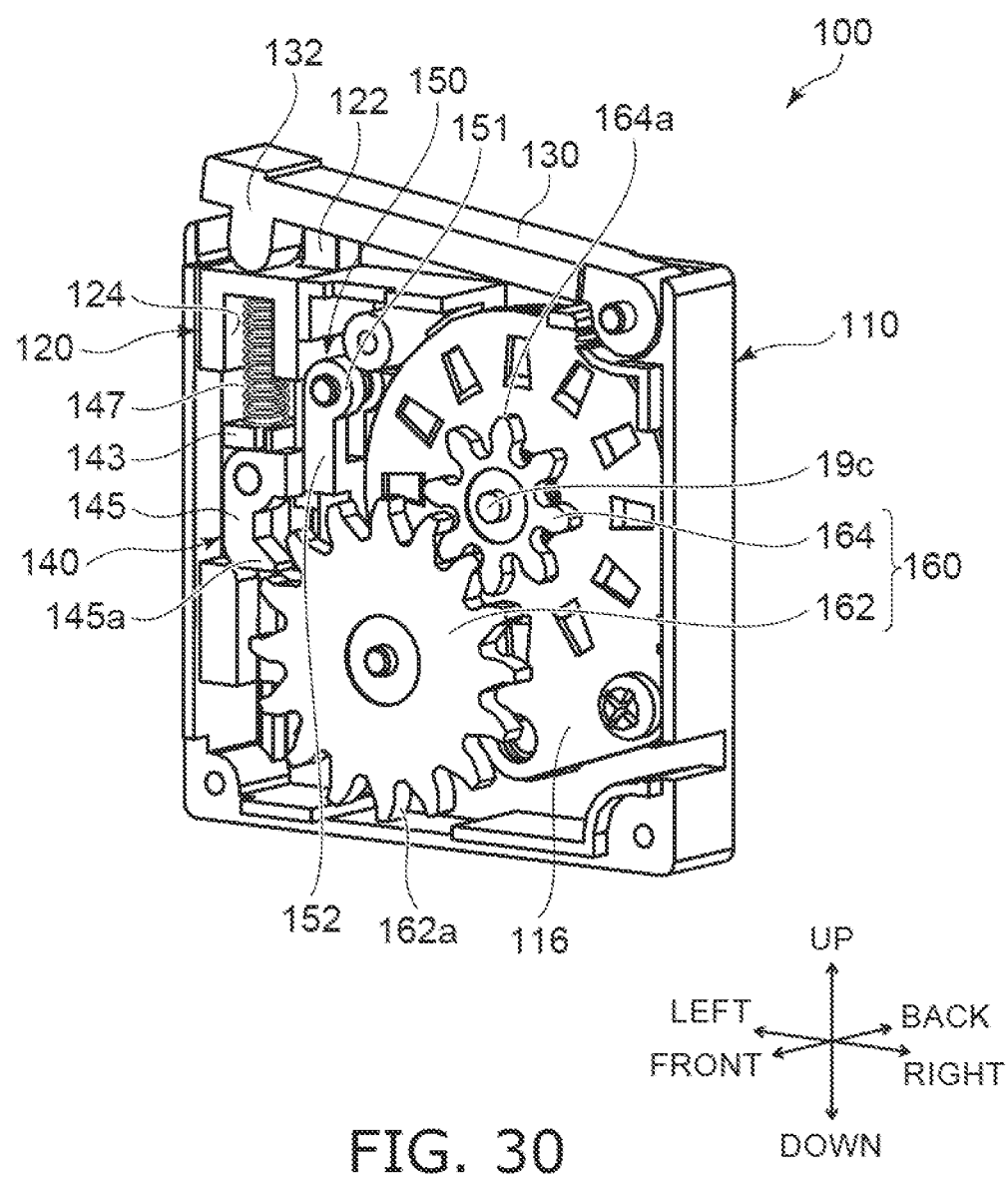
FIG. 30 is a perspective view showing the power generation module according to the fifth embodiment of the invention.

FIG. 30 is a perspective view showing the power generation module according to the fifth embodiment of the invention.

Figure 31:
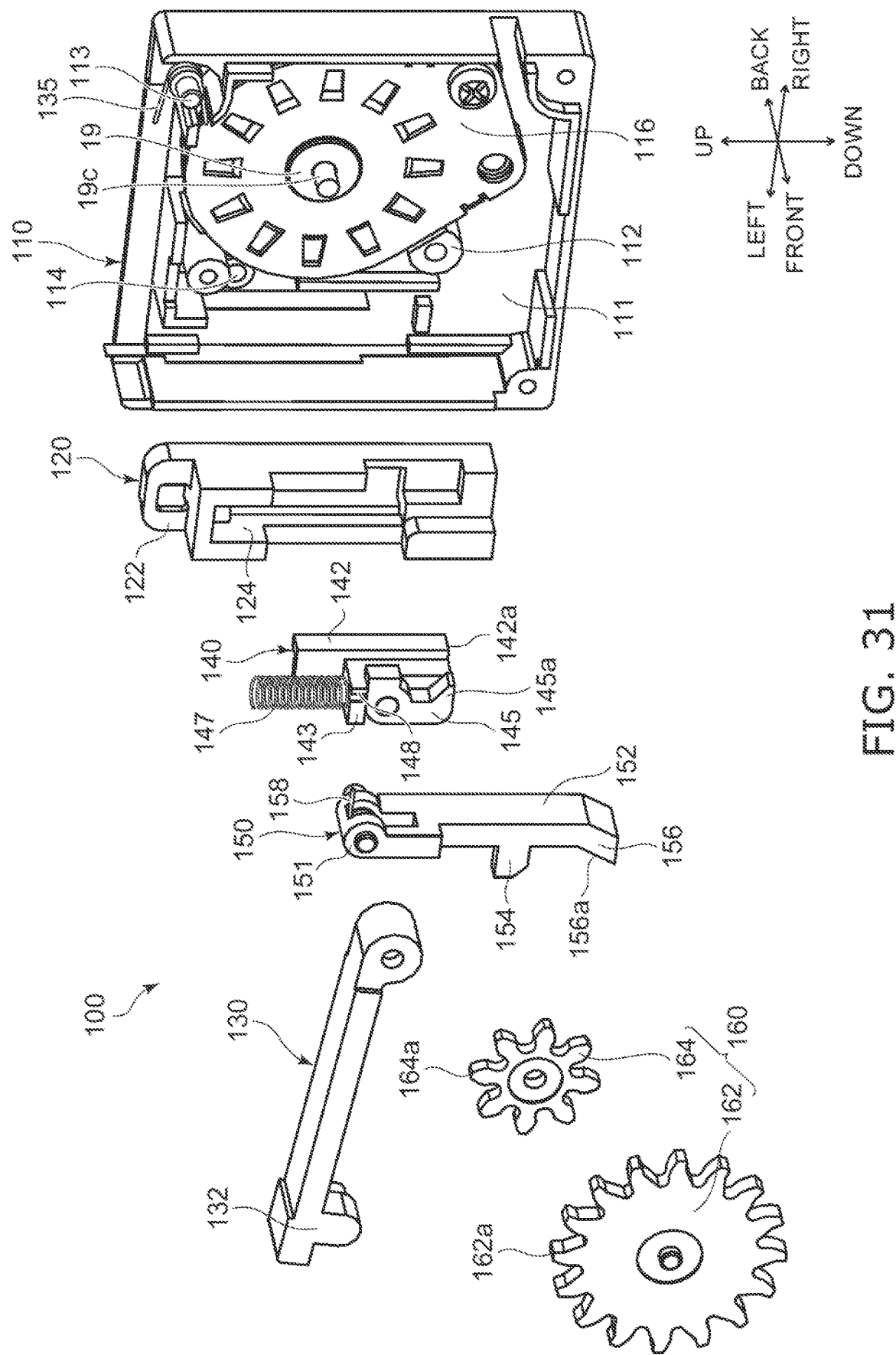
FIG. 31 is an exploded perspective view showing the disassembled power generation module of FIG. 30.

FIG. 31 is an exploded perspective view showing the disassembled power generation module of FIG. 30.

A main part 110 includes a guide part 111 slidably guiding a moving member 120, a supporter 112 to which a first wheel 162 is mounted, a shaft part 113 to which a rod part 130 is mounted, and a mounting part 114 to which the lock part 150 is mounted. In the example, the generator 19 is located inside the main part 110. As shown in FIGS. 30 and 31, the generator 19 is covered with a cover 116. In such a case, the rotary shaft 19c of the generator 19 protrudes frontward from the cover 116.

The moving member 120 is mounted inside the guide part 111 of the main part 110 to be slidable in the vertical direction. The moving member 120 includes a mounting part 122 to which the rod part 130 is mounted, and a recess 124 in which the transmission part 140 is mounted. The moving member 120 is formed in a concave shape having an opening at the front.

The rod part 130 is positioned above the generator 19 and the moving member 120 and is located inside the main part 110. One end of the rod part 130 is rotatably mounted to the shaft part 113. The other end of the rod part 130 is an input part 132 and is mounted to the mounting part 122 of the moving member 120. For example, the input part 132 of the rod part 130 is connected to the second link 4b of the remote control device 1. The rod part 130 moves the moving member 120 by being pressed with one end of the rod part 130 as a rotary fulcrum. The moving member 120 and the rod part 130 are movable parts that move with respect to the main part 110 when an operating force (energy) is input to the input part 132.

A first elastic member 135 is located between the rod part 130 and the shaft part 113. For example, the first elastic member 135 is made of a torsion coil spring and is wound on the outer circumference of the shaft part 113. One end of the first elastic member 135 engages the main part 110; and the other end of the first elastic member 135 engages the inner surface of the rod part 130. The first elastic member 135 urges the rod part 130 upward (from the prescribed position toward the initial position). The first elastic member 135 is a return spring that returns the input part 132 from the prescribed position to the initial position when the input to the input part 132 is released. In other words, the first elastic member 135 is the first return elastic member that returns the movable part (the moving member 120 and the rod part 130) to the original position when the energy (the input) to the input part 132 is released. The first elastic member 135 (the first return elastic member) connects the main part 110 and the rod part 130 included in the movable part.

The transmission part 140 is mounted inside the recess 124 of the moving member 120 to be slidable in the vertical direction. The transmission part 140 includes a first member 142, and a second member 145 rotatably mounted to the first member 142. The first member 142 includes a receiving part 143 that protrudes frontward of the vertical-direction central portion. The upper surface of the receiving part 143 supports the lower end side of a second elastic member 147. The second member 145 is located below the receiving part 143. A lower surface 142a of the first member 142 abuts an abutment part 154 of the lock part 150 while the input part 132 moves from the initial position to the prescribed position.

The lower end side of the second elastic member 147 is supported by the receiving part 143 of the transmission part 140; and the upper end side of the second elastic member 147 is supported by the upper surface of the recess 124 of the moving member 120. The second elastic member 147 is, for example, a compression coil spring. The second elastic member 147 urges the transmission part 140 downward. The second elastic member 147 is an elastic member that stores the energy of the force input to the input part 132. The transmission part 140 (the second member 145) transmits the energy stored in the second elastic member 147 to the first wheel 162.

The second member 145 is rotatably mounted with respect to the first member 142. The second member 145 is positioned further frontward than the lock part 150. A lower end portion 145a of the second member 145 is positioned inside the tooth space of the first wheel 162.

A third elastic member 148 is located between the second member 145 and the first member 142. For example, the third elastic member 148 is made of a torsion coil spring; one end of the third elastic member 148 engages the inner surface of the second member 145; and the other end of the third elastic member 148 engages the receiving part 143. The third elastic member 148 urges the second member 145 in the counterclockwise direction. The spring constant of the third elastic member 148 is less than the magnetic force between the stator 19a and the rotor 19b of the generator 19. The second member 145 also functions as a withdrawing part that withdraws from the first wheel 162 when the input part 132 moves from the prescribed position to the initial position. The third elastic member 148 is the second return elastic member that returns, to the original position, the transmission part 140 that moved in a direction away from the rotatable member (the first wheel 162) when the input of the energy to the input part 132 was released and the movable part returned to the original position.

The lock part 150 is positioned between the moving member 120 and the generator 19; and the upper end side of the lock part 150 is mounted to the mounting part 114 of the main part 110. The lock part 150 extends in the vertical direction along the moving member 120; the upper end side of the lock part 150 is a rotatable fixed end; and the lower end side of the lock part 150 is a free end. The lock part 150 includes a mounting part 151 positioned at the upper end side and mounted to the mounting part 114, an extension part 152 that extends downward from the mounting part 151, the abutment part 154 that abuts the lower surface 142a of the first member 142, and a sloped part 156 that is sloped from the lower end of the extension part 152 below the moving member 120. The lock part 150 restricts the rotation of the rotor 19b of the generator 19 by the transmission part 140.

The abutment part 154 protrudes from the vertical-direction central portion of the extension part 152. The abutment part 154 restricts the movement of the transmission part 140 by abutting the lower surface 142a of the first member 142 while the input part 132 moves from the initial position to the prescribed position. The lock part 150 restricts rotation of a wheel 160 by the transmission part 140 by restricting the movement of the transmission part 140. Accordingly, the lock part 150 indirectly restricts the rotation of the rotor 19b.

The sloped part 156 includes a sloped surface 156a (a lock part operation unit) that abuts the lower end of the moving member 120. The sloped surface 156a extends obliquely leftward and downward from the side surface of the extension part 152. Accordingly, the lock part 150 is rotated in the counterclockwise direction around the mounting part 151 as a rotary fulcrum by the sloped surface 156a being pressed downward by the moving member 120. In such a case, the lock part 150 rotates until the abutment part 154 moves to a position at which the abutment part 154 is released from the lower surface 142a of the first member 142. The position at which the abutment part 154 is released from the lower surface 142a of the first member 142 is when the input part 132 reaches the prescribed position.

A fourth elastic member 158 is located between the lock part 150 and the main part 110. For example, the fourth elastic member 158 is made of a torsion coil spring; one end of the fourth elastic member 158 engages the inner surface of the lock part 150; and the other end of the fourth elastic member 158 engages the main part 110. The fourth elastic member 158 urges the lock part 150 in the clockwise direction. When the input part 132 has moved from the prescribed position to the initial position, the lock part 150 is rotated by the urging force of the fourth elastic member 158 so that the abutment part 154 moves below the first member 142.

The wheel 160 includes the first wheel 162, and a second wheel 164 that meshes with the first wheel 162. The first wheel 162 and the second wheel 164 are included in the rotatable member of the invention. The first wheel 162 is positioned further frontward than the cover 116 and the lock part 150 and is rotatably mounted to the supporter 112 of the main part 110. The first wheel 160 includes a gear part 162a at the outer circumference.

The second wheel 164 is rotatably mounted to the rotary shaft 19c of the generator 19. In other words, the rotor 19b of the generator 19 rotates together with the second wheel 164. The second wheel 164 includes a gear part 164a at the outer circumference. The gear part 164a of the second wheel 164 meshes with the gear part 162a of the first wheel 162.

Thus, the power generation module 100 according to the fifth embodiment has a configuration such as that described above, and operations of the power generation module 100 will now be described with reference to FIGS. 32 to 35.

Figure 32:
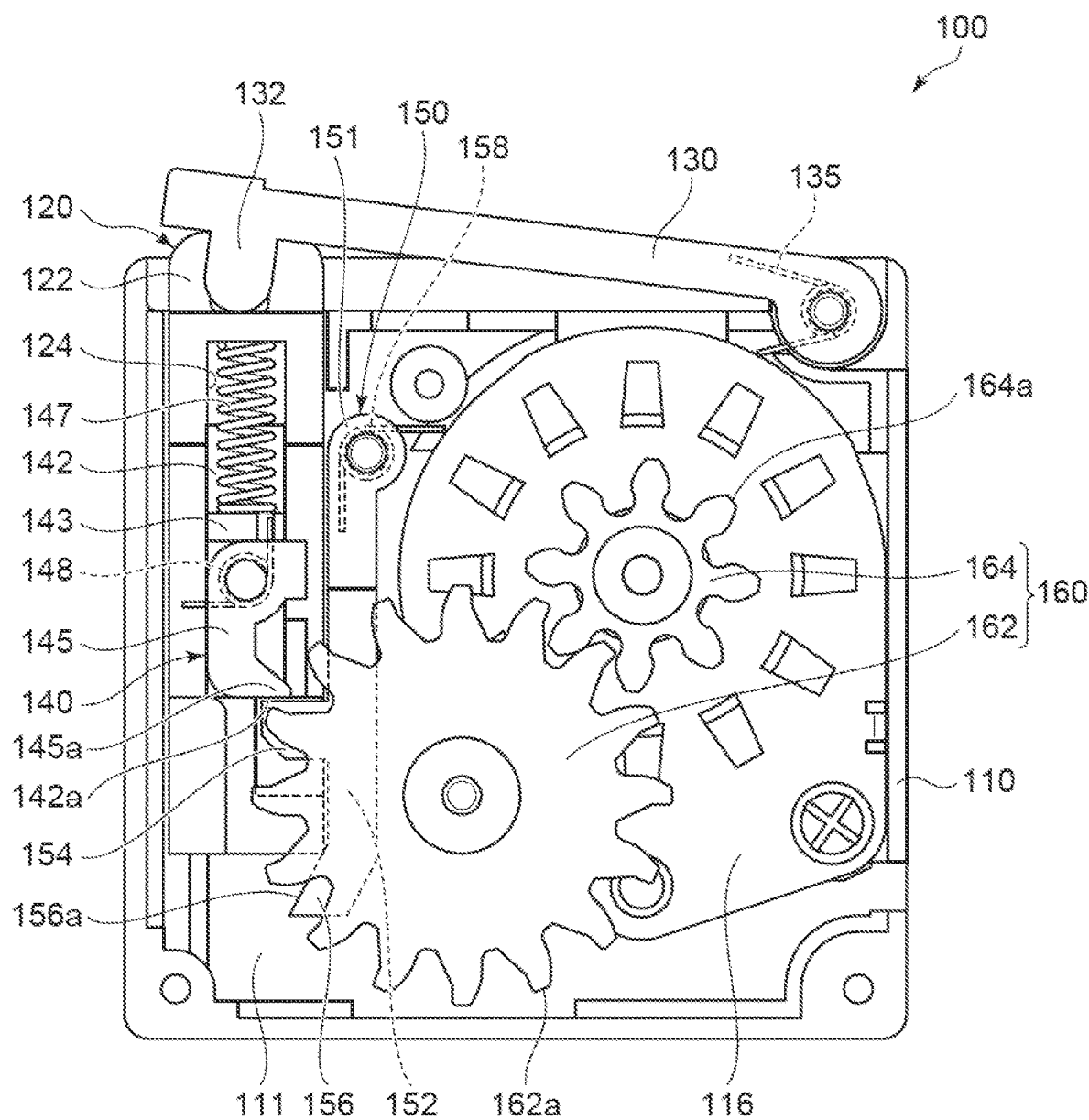
FIG. 32 is an explanatory drawing showing a state when there is no input to the input part.

FIG. 32 is an explanatory drawing showing a state when there is no input to the input part.

Figure 33:
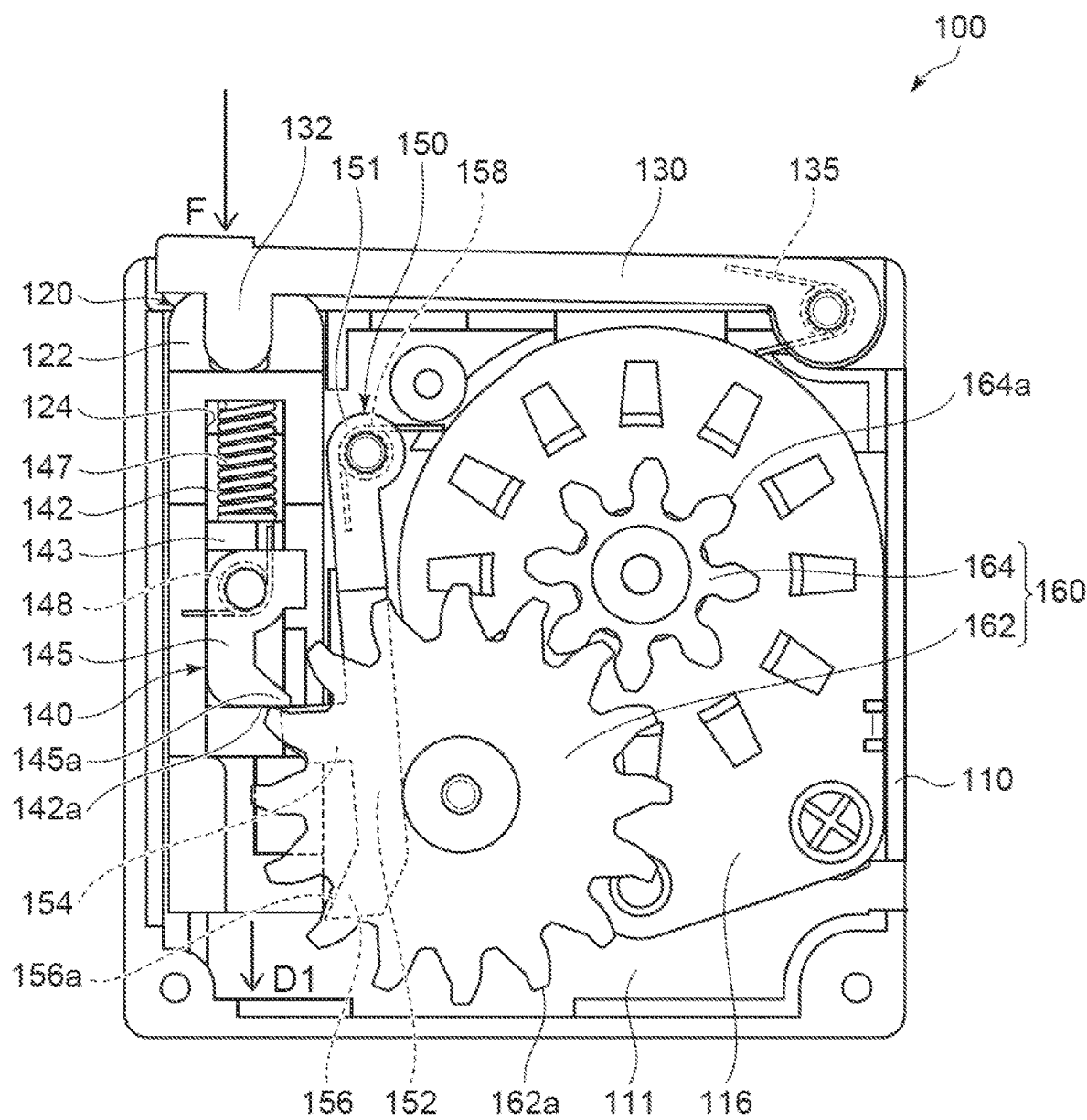
FIG. 33 is an explanatory drawing showing a state when an input is provided to the input part.

FIG. 33 is an explanatory drawing showing a state when an input is provided to the input part.

Figure 34:
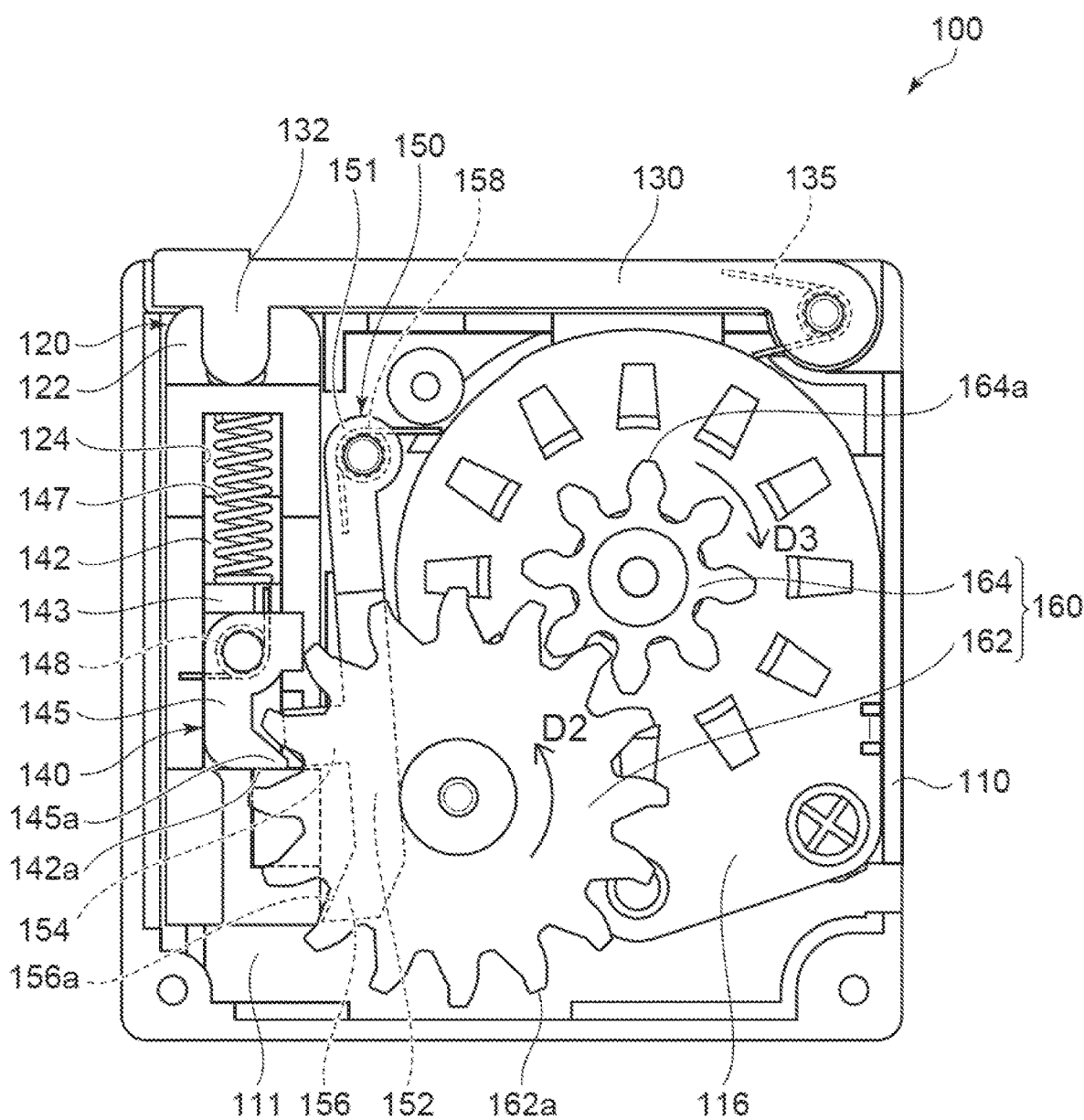
FIG. 34 is an explanatory drawing showing a state when the generator generates power.

FIG. 34 is an explanatory drawing showing a state when the generator generates power.

Figure 35:
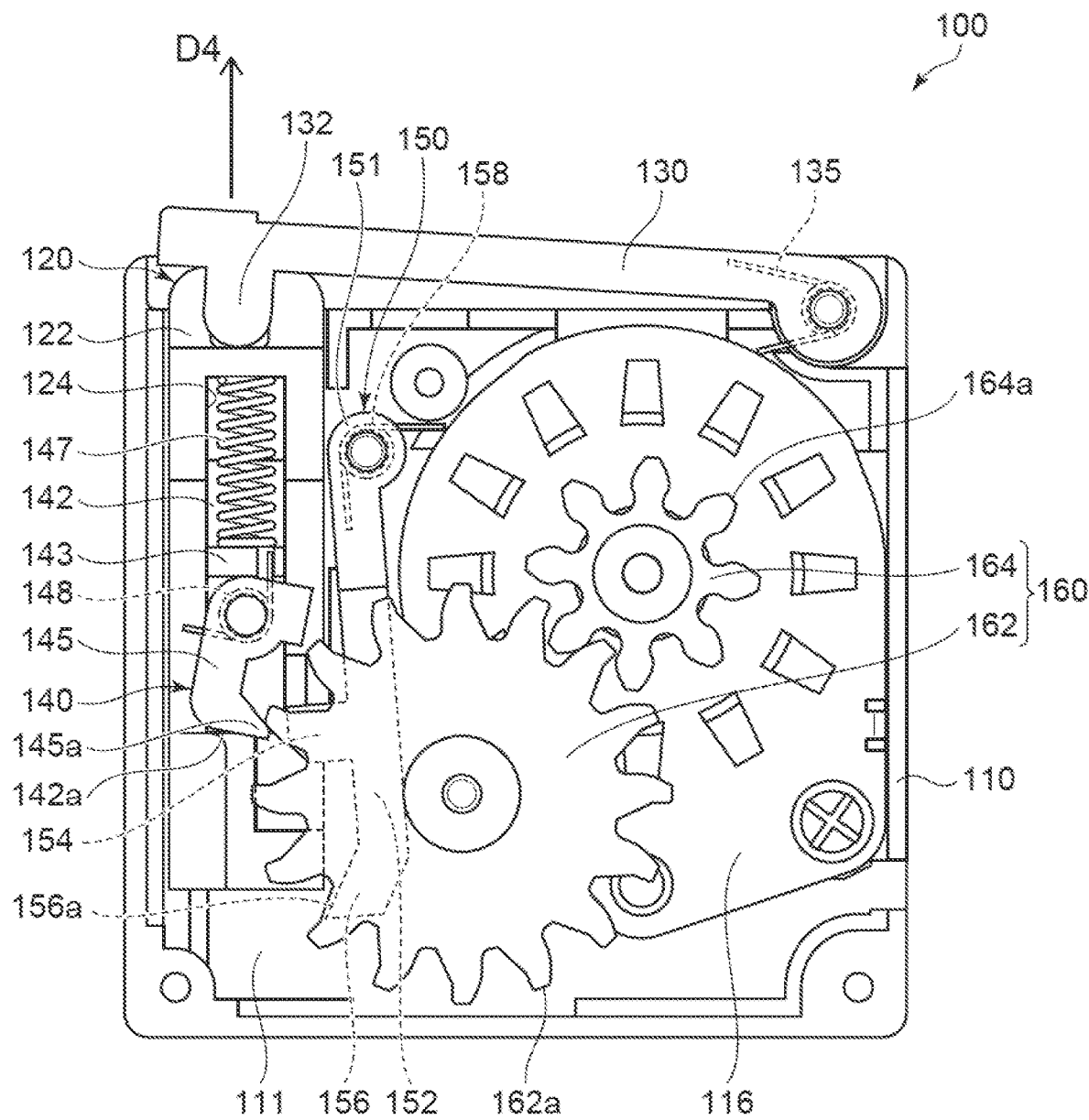
FIG. 35 is an explanatory drawing showing a state when the input to the input part is released.

FIG. 35 is an explanatory drawing showing a state when the input to the input part is released.

First, when the operation button 3 is not operated as shown in FIG. 32, the input part 132 is at the initial position, and the wheel 160 and the rotor 19b are at start positions. Then, when the operation button 3 is operated, the link mechanism 4 presses the input part 132. Accordingly, as shown in FIG. 33, the force F (the operating force) acts on the input part 132; and the rod part 130 presses the moving member 120 against the urging force of the first elastic member 135.

In such a case, the lower surface 142a of the first member 142 included in the transmission part 140 abuts the abutment part 154 of the lock part 150. Accordingly, the transmission part 140 moves upward relative to the moving member 120 against the urging force of the second elastic member 147. In other words, when the input part 132 presses the moving member 120, only the moving member 120 moves in the arrow D1-direction (downward) without the transmission part 140 moving from the current position. Accordingly, the second elastic member 147 stores energy (a spring force) by being contracted.

As shown in FIG. 33, the sloped part 156 of the lock part 150 is pressed by the moving member 120. Accordingly, the lock part 150 rotates in the counterclockwise direction against the urging force of the fourth elastic member 158. As the moving member 120 moves in the arrow D1-direction, the abutment part 154 moves in a direction away from the lower surface 142a of the first member 142.

As shown in FIG. 34, when the force F further acts on the input part 132 and the input part 132 moves to the prescribed position, the abutment part 154 of the lock part 150 is released from the lower surface 142a of the first member 142. In other words, the movement restriction of the transmission part 140 is released when the input part 132 moves to the prescribed position. Accordingly, the transmission part 140 is moved downward by the urging force of the second elastic member 147. The movement of the abutment part 154 of the lock part 150 in the clockwise direction is restricted by abutting the side surface of the first member 142.

The lower end portion 145a of the second member 145 included in the transmission part 140 presses the gear part 162a of the first wheel 162. As a result, the first wheel 162 rotates in the arrow D2-direction (the counterclockwise direction). The second wheel 164 is rotated in the arrow D3-direction (the clockwise direction) by the rotation of the first wheel 162. Accordingly, the rotor 19b of the generator 19 is rotated by the rotation of the second wheel 164. Accordingly, a current flows in the coils 19a2 of the generator 19 (power is generated).

When the input to the input part 132 is released as shown in FIG. 35, the rod part 130 is moved in the arrow D4-direction by the urging force of the first elastic member 135. In other words, the input part 132 is returned from the prescribed position to the initial position by the urging force of the first elastic member 135. The moving member 120 is pulled upward in the arrow D4-direction by the input part 132 because the mounting part 122 engages the input part 132.

The spring force of the third elastic member 148 is weaker than the magnetic force of the generator 19. Accordingly, when the transmission part 140 is moved upward, the lower end portion 145a of the second member 145 is rotated in the clockwise direction by being pressed by the gear part 162a of the first wheel 162. In other words, the second member 145 moves to withdraw from the first wheel 162 when the input part 132 returns from the prescribed position to the initial position.

Then, the second member 145 rotates in the counterclockwise direction due to the urging force of the third elastic member 148 when the lower end portion 145a moves past the gear part 162 of the first wheel 162. Accordingly, the lower end portion 145a of the second member 145 is positioned inside the tooth space of the first wheel 162.

The abutment part 154 of the lock part 150 is released from the side surface of the first member 142. Accordingly, the lock part 150 is rotated in the clockwise direction by the urging force of the fourth elastic member 158. As a result, the abutment part 154 of the lock part 150 moves below the first member 142; and the sloped part 156 of the lock part 150 moves below the moving member 120. Then, the input part 132 returns to the initial position, and the power generation module 100 waits for the next input to the input part 132.

It is sufficient for the state to be maintained in which the rotor 19b remains at the current pole and does not move to the adjacent pole when the input part 132 moves from the prescribed position to the initial position. In other words, the wheel 160 and the rotor 19b are allowed to move (rotate) in a range in which the rotor 19b does not move to the adjacent pole. In other words, the wheel 160 and the rotor 19b may have a slight reverse rotation when the input part 132 moves from the prescribed position to the initial position.

In the power generation module 100 according to the fifth embodiment, similarly to the power generation module 10 according to the first embodiment, energy can be efficiently stored in the second elastic member 147 because the wheel 160 and the rotor 19b are not rotated while the input part 132 moves from the initial position to the prescribed position. Also, cogging torque due to the generator 19 can be suppressed because the rotor 19b of the generator 19 does not rotate while the input part 132 moves from the initial position to the prescribed position. As a result, the operationability of the remote control device 1 can be improved.

Here, when the input part 132 is pressed, the second elastic member 147 is contracted, and energy is stored. At this time, the reaction force (the urging force) of the second elastic member 147 acts on the abutment part 154 of the lock part 150. A friction force is generated between the abutment part 154 and the first member 142 by the reaction force when the abutment part 154 moves in a direction away from the first member 142. Accordingly, the operating force of the input part 132 (the operation button 3) is the sum of the reaction force of the second elastic member 147 and the friction force of the abutment part 154 of the lock part 150.

The distance from the mounting part 151 used as the rotary fulcrum to the sloped surface 156a (the lock part operation unit) of the lock part 150 is greater than the distance from the mounting part 151 to the abutment part 154. In other words, the abutment part 154 is located further toward the mounting part 151 side (the rotary fulcrum side) than the sloped surface 156a. Accordingly, the distance that the abutment part 154 of the lock part 150 moves to release the restriction of the rotor 19b is less than the distance that the input part 132 moves from the initial position to the prescribed position.

In other words, due to the leverage principle, the distance for the abutment part 154 of the lock part 150 to release the rotation restriction of the wheel 160 is less than the distance that the input part 132 moves. As a result, the effects of the friction force between the abutment part 154 of the lock part 150 and the first member 142 of the transmission part 140 can be reduced when the operation button 3 is operated.

The transmission part 140 collides with the bottom surface of the recess 124 of the moving member 120 when generating power. In other words, the transmission part 140 collides with the movable part (the moving member 120) inside the main part 110 after the energy stored in the second elastic member 147 is released and the rotatable member (the wheel 160) is rotated. The main part 110 is covered with a cover. Because the transmission part 140 collides with the movable part inside the main part 110, the collision sound can be less than when the transmission part 140 collides with the main part 110. Discomfort of the user due to an abnormal noise can be suppressed thereby.

The first elastic member 135 is the first return elastic member that returns the movable part (the moving member 120 and the rod part 130) to the original position when the energy (the input) to the input part 132 is released. The first elastic member 135 (the first return elastic member) connects the main part 110 and the rod part 130. Accordingly, the movable part can be returned to the initial position by the first elastic member 135 after the power generation. Also, the first elastic member 135 can absorb the collision energy when the transmission part 140 collides with the movable part.

The transmission part 140 moves in the same direction as the movement direction of the movable part. In other words, when the force F acts on the input part 132, the moving member 120 moves downward. Then, when the rotation restriction of the wheel 160 by the lock part 150 is released, the transmission part 140 moves downward due to the urging force of the second elastic member 147. In such a case, the transmission part 140 collides with the moving member 120 after rotating the wheel 160. Thus, the collision energy of the transmission part 140 when the transmission part 140 and the moving member 120 collide can be dissipated in the movement direction of the moving member 120 because the movement directions of the transmission part 140 and the moving member 120 are the same direction (down). Accordingly, the collision sound between the transmission part 140 and the moving member 120 can be small.

The transmission part 140 may collide with the movable part while the movable part is moving. In other words, the rotation restriction of the wheel 160 by the lock part 150 may be released while the movable part is moving. Accordingly, the transmission part 140 and the moving member 120 can collide while the relative velocity between the transmission part 140 and the moving member 120 is small. Accordingly, the collision sound between the transmission part 140 and the moving member 120 can be small.

The power generation module 100 further includes the second return elastic member (the third elastic member 148) that returns, to the original position, the transmission part 140 that moved in a direction away from the rotatable member (the wheel 160) when the input of the energy to the input part 132 was released and the movable part (the moving member 120 and the rod part 130) returned to the original position. The third elastic member 148 returns, to the tooth space of the first wheel 162, the lower end portion 145a of the transmission part 140 that moved in the direction away from the first wheel 162 by being pressed by the first wheel 162. Accordingly, the third elastic member 148 can return the transmission part 140 to the original position after the power generation.

An example is described in the first embodiment described above in which the wheel 18 includes six protruding parts 18a1 to 18a6 and the wheel 18 revolves once by generating power six times. However, aspects of the invention are not limited thereto; for example, there may be more or less than six protruding parts. In other words, the numbers of protruding parts and/or gears are arbitrarily set based on the size of the power generation module 10, the necessary power generation amount of the generator 19, etc. This is similar for the second to fifth embodiments as well.

Figure 36A:
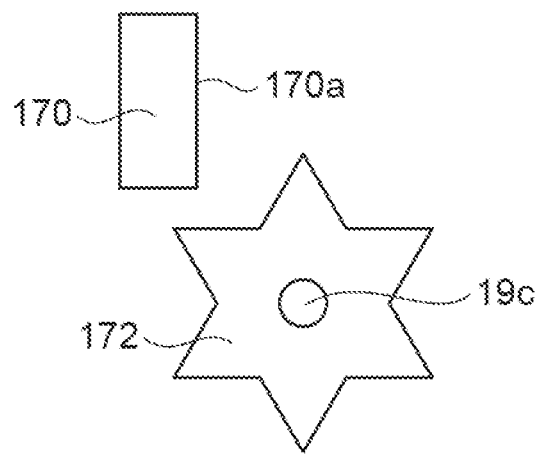
FIGS. 36A to 36D are explanatory drawings showing the relationship between a transmission part and a wheel according to a modification of the invention.
Figure 36B:
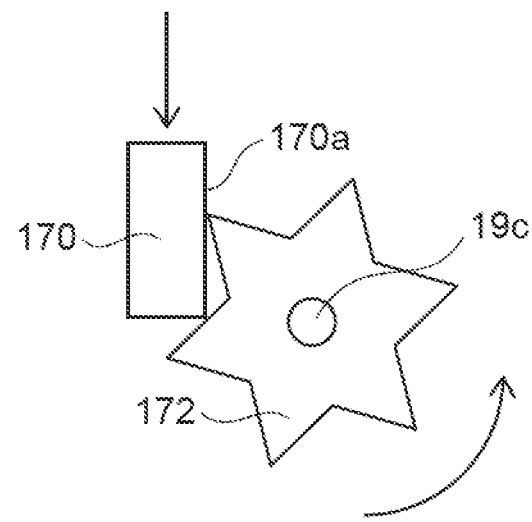
Figure 36C:
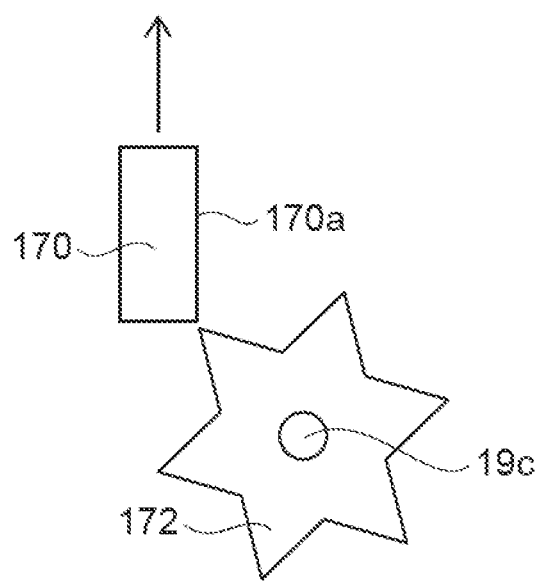
Figure 36D:
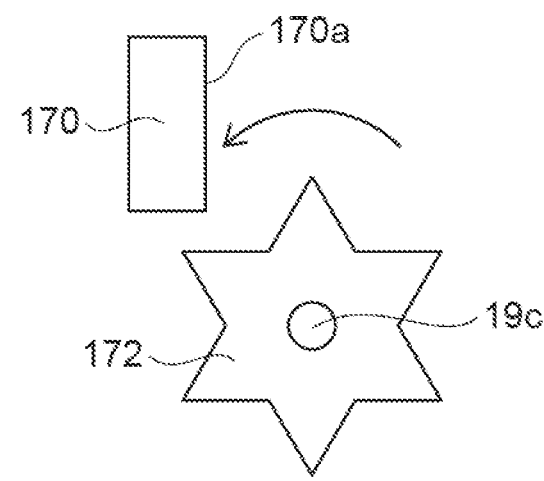

FIGS. 36A to 36D are explanatory drawings showing the relationship between a transmission part and a wheel according to a modification of the invention. FIG. 36A shows a state in which the input part 13a is at the initial position, and a transmission part 170 is not pressing a wheel 172. FIG. 36B shows a state in which the transmission part 170 presses the wheel 172 and generates power by rotating the wheel 172. FIG. 36C shows when the transmission part 170 is moved by the input part 13a moving from the prescribed position to the initial position. FIG. 36D shows a state in which the input part 13a has returned to the initial position, and the wheel 172 has been moved to a start position by the magnetic force of the generator 19.

An example is described in the first embodiment described above in which the wheel 18 has a reverse rotation due to the transmission part 16 pressing the wheel 18 when the input part 13a moves from the prescribed position to the initial position. However, aspects of the invention are not limited thereto; for example, as in the modification shown in FIGS. 36A to 36D, the wheel 172 may not have a reverse rotation when the input part 13a moves from the prescribed position to the initial position.

For example, when an abutment surface 170a of the transmission part 170 with the wheel 172 is formed in a vertical shape, the transmission part 170 slides along the wheel 172 as shown in FIGS. 36B and 36C when the input part 13a moves from the prescribed position to the initial position. In other words, the wheel 172 is not pressed by the transmission part 170. In other words, a reverse rotation of the wheel 172 is not caused by the transmission part 170. Then, as shown in FIG. 36D, the wheel 172 is moved to the start position by the magnetic force of the generator when the transmission part 170 is released from the wheel 172.

FIGS. 37 to 42 show a power generation module 200 according to a sixth embodiment of the invention. The power generation module 200 according to the sixth embodiment shows when the movement distance of an input part 221a and the movement distance of a lock part 243 are different. According to the sixth embodiment, the same components as those of the first embodiment are marked with the same reference numerals; and a description is omitted.

Figure 37:
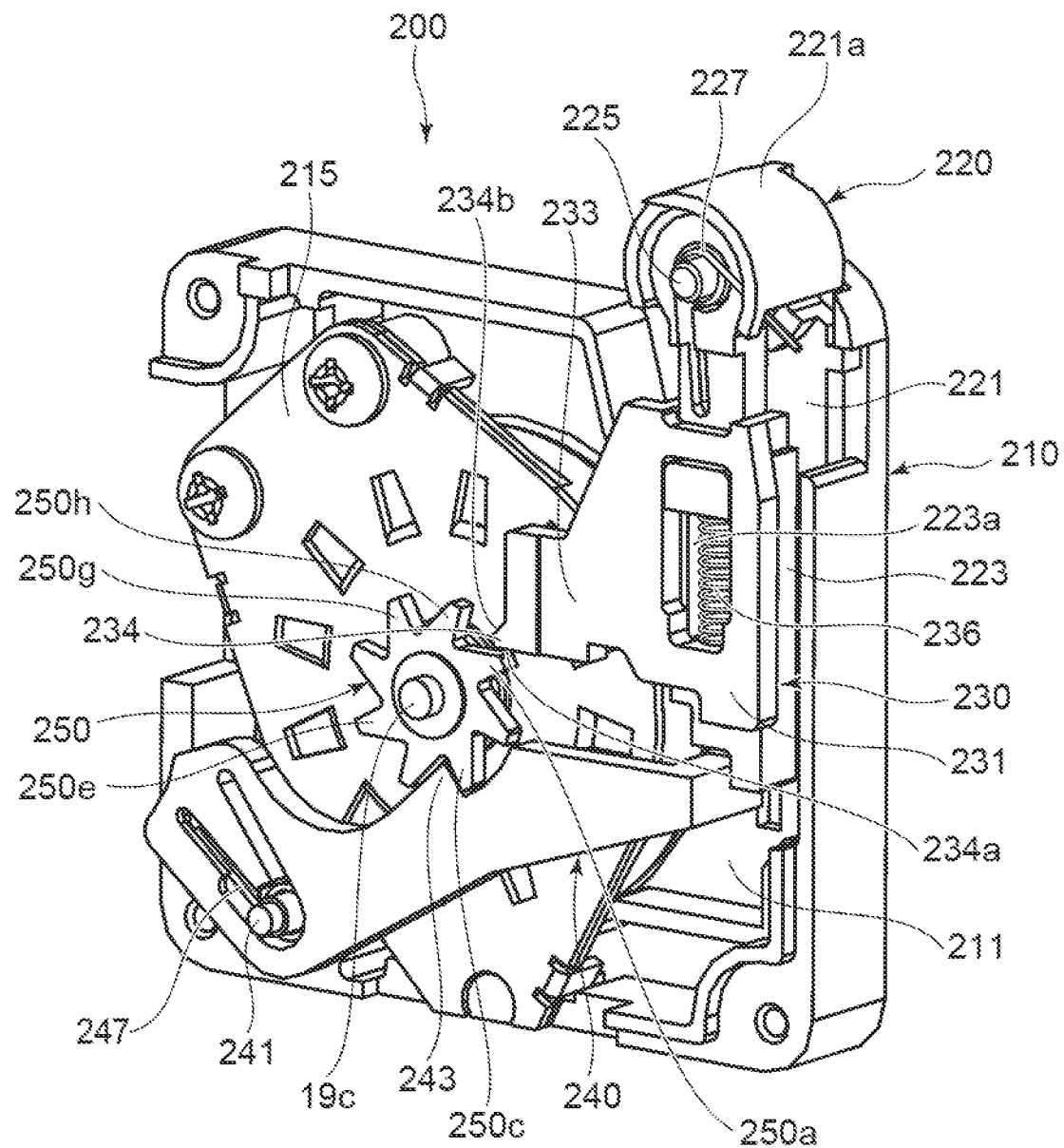
FIG. 37 is a perspective view showing the power generation module according to the sixth embodiment of the invention.
Figure 37:
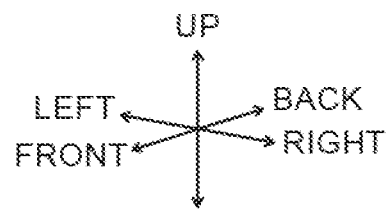

FIG. 37 is a perspective view showing the power generation module according to the sixth embodiment of the invention.

Figure 38:
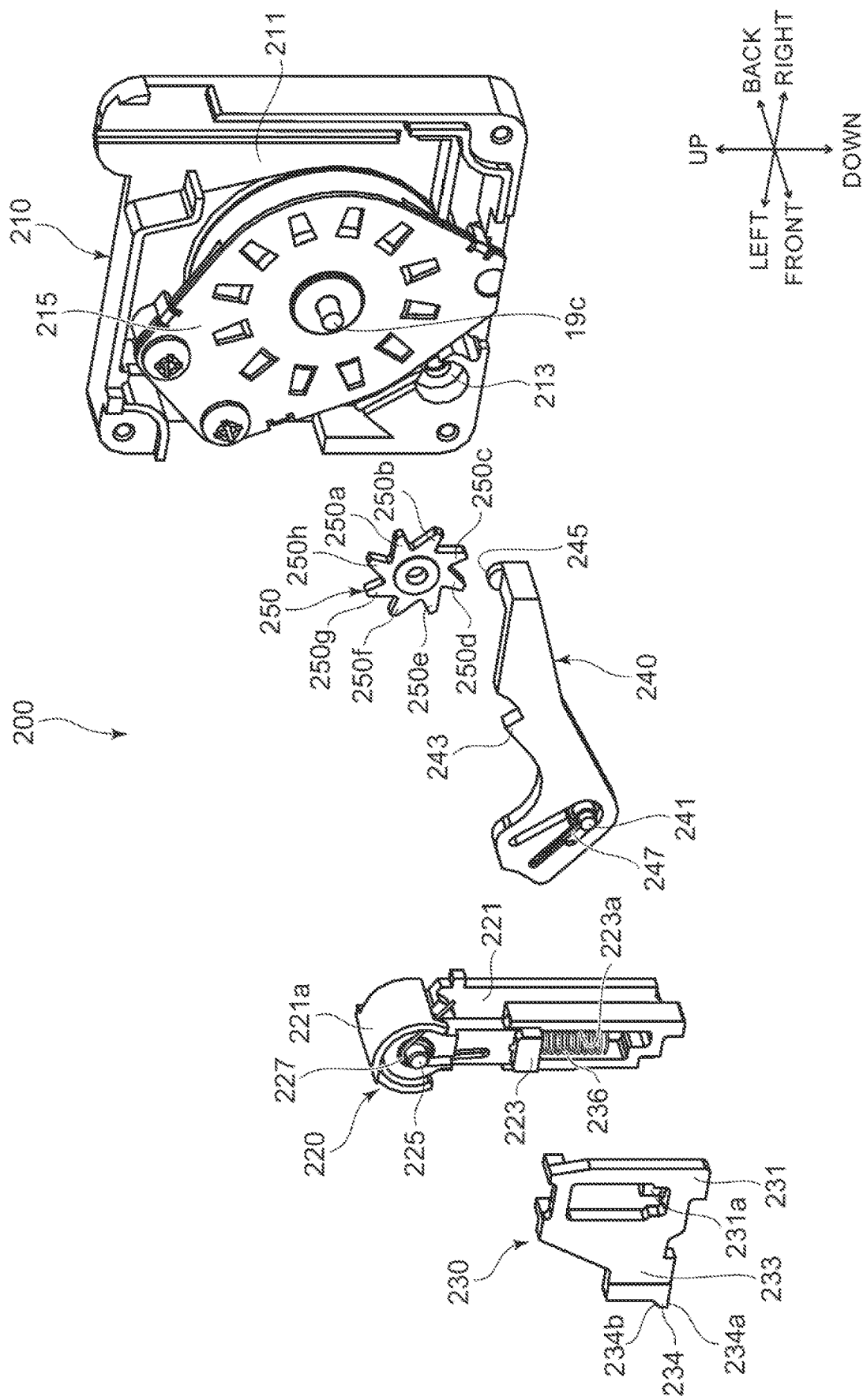
FIG. 38 is an exploded perspective view showing the disassembled power generation module of FIG. 37.

FIG. 38 is an exploded perspective view showing the disassembled power generation module of FIG. 37.

A main part 210 includes a guide part 211 slidably guiding a moving member 220, and a mounting part 213 to which a rod-like body 240 is mounted. In the example, the generator 19 is located inside the main part 210. As shown in FIGS. 37 and 38, the generator 19 is covered with a cover 215. In such a case, the rotary shaft 19c of the generator 19 protrudes frontward from the cover 215.

The moving member 220 is mounted inside the guide part 211 of the main part 210 to be slidable in the vertical direction. The moving member 220 includes a first member 221 that moves along the guide part 211, and a second member 223 that can rotate with respect to the first member 221. The first member 221 is formed in a plate shape extending in the vertical direction. The first member 221 includes the input part 221a protruding from the main part 210.

The second member 223 includes a recess 223a positioned frontward of the first member 221. The recess 223a extends through the second member 223 in the longitudinal direction (the thickness direction). A second elastic member 236 that is described below is located in the recess 223a. The second member 223 is rotatably mounted with respect to the first member 221 via a shaft part 225 at the upper end side. In other words, the upper end side of the second member 223 is a rotatable fixed end; and the lower end side of the second member 223 is a free end.

A first elastic member 227 is located between the first member 221 and the second member 223. For example, the first elastic member 227 is made of a torsion coil spring and is wound on the outer circumference of the shaft part 225. One end of the first elastic member 227 engages the first member 221; and the other end of the first elastic member 227 engages the second member 223. The first elastic member 227 urges the second member 223 in the clockwise direction. The first elastic member 227 is the second return elastic member that returns, to the original position, a transmission part 230 that moved in a direction away from the rotatable member (a wheel 250) when the input of the energy was released and the movable part (the moving member 220 and the rod-like body 240) returned to the original position.

The transmission part 230 is positioned frontward of the moving member 220 and is mounted to the moving member 220 to be slidable in the vertical direction. The transmission part 230 includes a mounting part 231 mounted to the moving member 220, and an extension part 233 extending from the mounting part 231 toward the wheel 250 that is described below. The mounting part 231 includes a receiving part 231a that supports the lower end side of the second elastic member 236. The receiving part 231a is positioned at the lower end side of the recess 223a of the second member 223.

The extension part 233 includes an abutment part 234 that abuts protruding parts 250a to 250h of the wheel 250. The abutment part 234 is positioned between the protruding parts of the wheel 250. The abutment part 234 includes a pressing surface 234a that presses the protruding parts 250a to 250h when the lock part 243 that is described below is released, and a sloped surface 234b that is pressed by the protruding parts 250a to 250h when the input to the input part 221a is released.

The second elastic member 236 is located between the transmission part 230 and the second member 223 of the moving member 220. The second elastic member 236 is, for example, a compression coil spring. One end (the upper end side) of the second elastic member 236 is supported by the upper surface of the recess 223a of the second member 223; and the other end (the lower end side) of the second elastic member 236 is supported by the receiving part 231a of the transmission part 230. Accordingly, the second elastic member 236 urges the transmission part 230 downward. The second elastic member 236 is an elastic member that stores the energy of the force input to the input part 221a. The transmission part 230 transmits the energy stored in the second elastic member 236 to the wheel 250.

The rod-like body 240 is mounted to the mounting part 213 of the main part 210 with a shaft part 241 as a rotary fulcrum. The rod-like body 240 is positioned below the wheel 250 and the moving member 220 and extends in the lateral direction inside the main part 210. The rod-like body 240 includes the lock part 243 that is positioned inside the adjacent protruding parts 250a to 250h of the wheel 250 and restricts the rotation of the rotor 19b by the transmission part 230, and a lock part operation unit 245 that abuts the lower surface of the moving member 220. The moving member 220 and the rod-like body 240 are movable parts that move with respect to the main part 210 when the operating force (the energy) is input to the input part 221a.

The lock part 243 is positioned between the shaft part 241 and the lock part operation unit 245. The lock part 243 restricts the rotation of the wheel 250 by abutting the protruding parts 250a to 250h of the wheel 250 while the input part 221a moves from the initial position to the prescribed position. When the input part 221a moves to the prescribed position, the lock part 243 is released from the protruding parts 250a to 250h of the wheel 250; and the rotation restriction of the wheel 250 is released.

The lock part operation unit 245 is a part that is pressed by the moving member 220. In other words, the lock part operation unit 245 is a point of force for moving the lock part 243. The lock part operation unit 245 abuts the lower surface of the first member 221 of the moving member 220. When the lock part operation unit 245 is pressed downward by the moving member 220, the rod-like body 240 rotates clockwise around the shaft part 241 as the rotary fulcrum. In other words, the lock part 243 and the lock part operation unit 245 rotate around the same rotary fulcrum according to the movement of the input part 221a.

A third elastic member 247 is located between the rod-like body 240 and the main part 210. For example, the third elastic member 247 is made of a torsion coil spring and is wound on the outer circumference of the shaft part 241. One end of the third elastic member 247 engages the rod-like body 240; and the other end of the third elastic member 247 engages the main part 210. The third elastic member 247 urges the rod-like body 240 in the counterclockwise direction. In other words, the lock part operation unit 245 of the rod-like body 240 presses the moving member 220 upward due to the urging force of the third elastic member 247 when the input to the input part 221a is released. In other words, the third elastic member 247 is the first return elastic member that returns the movable part (the moving member 220 and the rod-like body 240) to the original position when the energy (the input) to the input part 221a is released. The third elastic member 247 (the first return elastic member) connects the main part 210 and the rod-like body 240 included in the movable part.

The wheel 250 is positioned inside the main part 210 and is located at the rotary shaft 19c of the generator 19. The wheel 250 is included in the rotatable member of the invention. The rotary shaft 19c of the generator 19 is mounted to the central part of the wheel 250. Accordingly, the rotary shaft 19c of the generator 19 can be rotated by rotating the wheel 250. In other words, the wheel 250 and the rotary shaft 19c rotate together in the same direction. The wheel 250 is rotated by the pressing of the transmission part 230 due to the energy (the urging force) of the second elastic member 236.

The wheel 250 includes the multiple (in the example, eight) protruding parts 250a to 250h spreading radially from the central part. The wheel 250 is rotated (a forward rotation) in the clockwise direction by the protruding parts 250a to 250h being pressed by the abutment part 234 of the transmission part 230. The number of the protruding parts 250a to 250h may be more or less than eight.

As shown in FIG. 37, the protruding part (in the example, the protruding part 250c) abuts the lock part 243 while the input part 221a moves from the initial position to the prescribed position. Accordingly, the lock part 243 restricts the rotation of the wheel 250 in the clockwise direction (the forward rotation).

Thus, the power generation module 200 according to the sixth embodiment has a configuration such as that described above, and operations of the power generation module 200 will now be described with reference to FIGS. 39 to 42.

Figure 39:
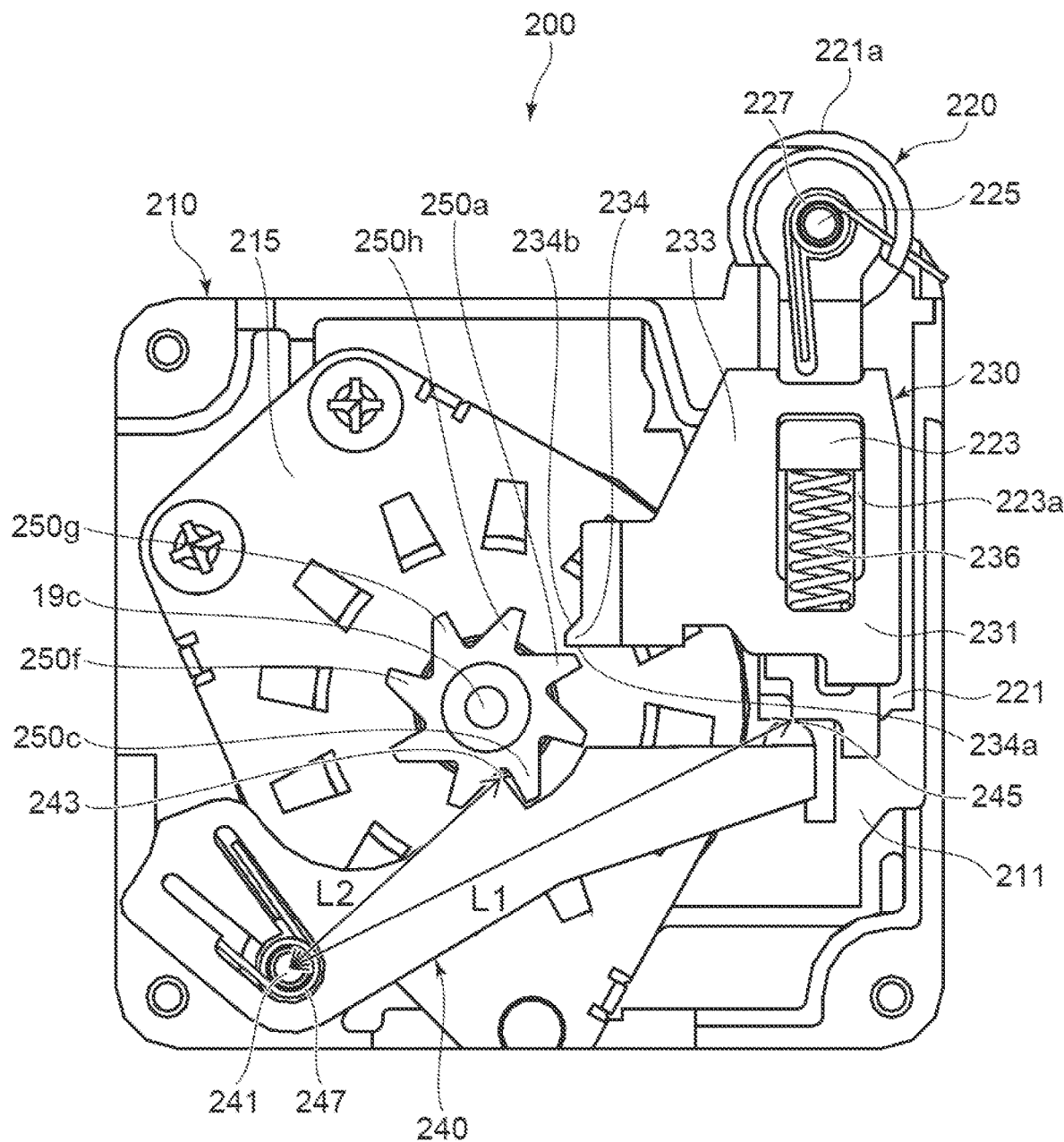
FIG. 39 is an explanatory drawing showing a state when there is no input to the input part.

FIG. 39 is an explanatory drawing showing a state when there is no input to the input part.

Figure 40:
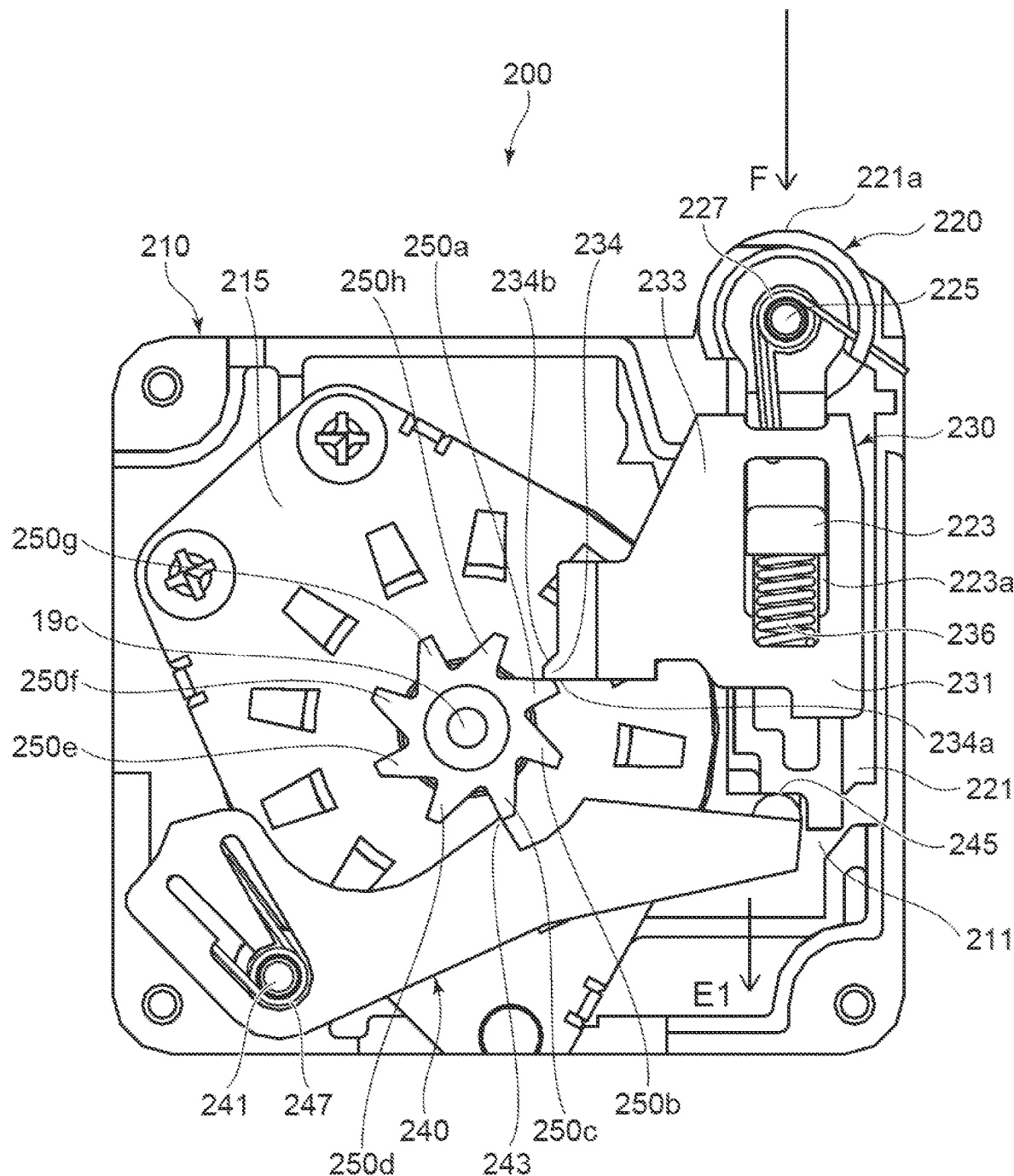
FIG. 40 is an explanatory drawing showing a state when an input is provided to the input part.

FIG. 40 is an explanatory drawing showing a state when an input is provided to the input part.

Figure 41:
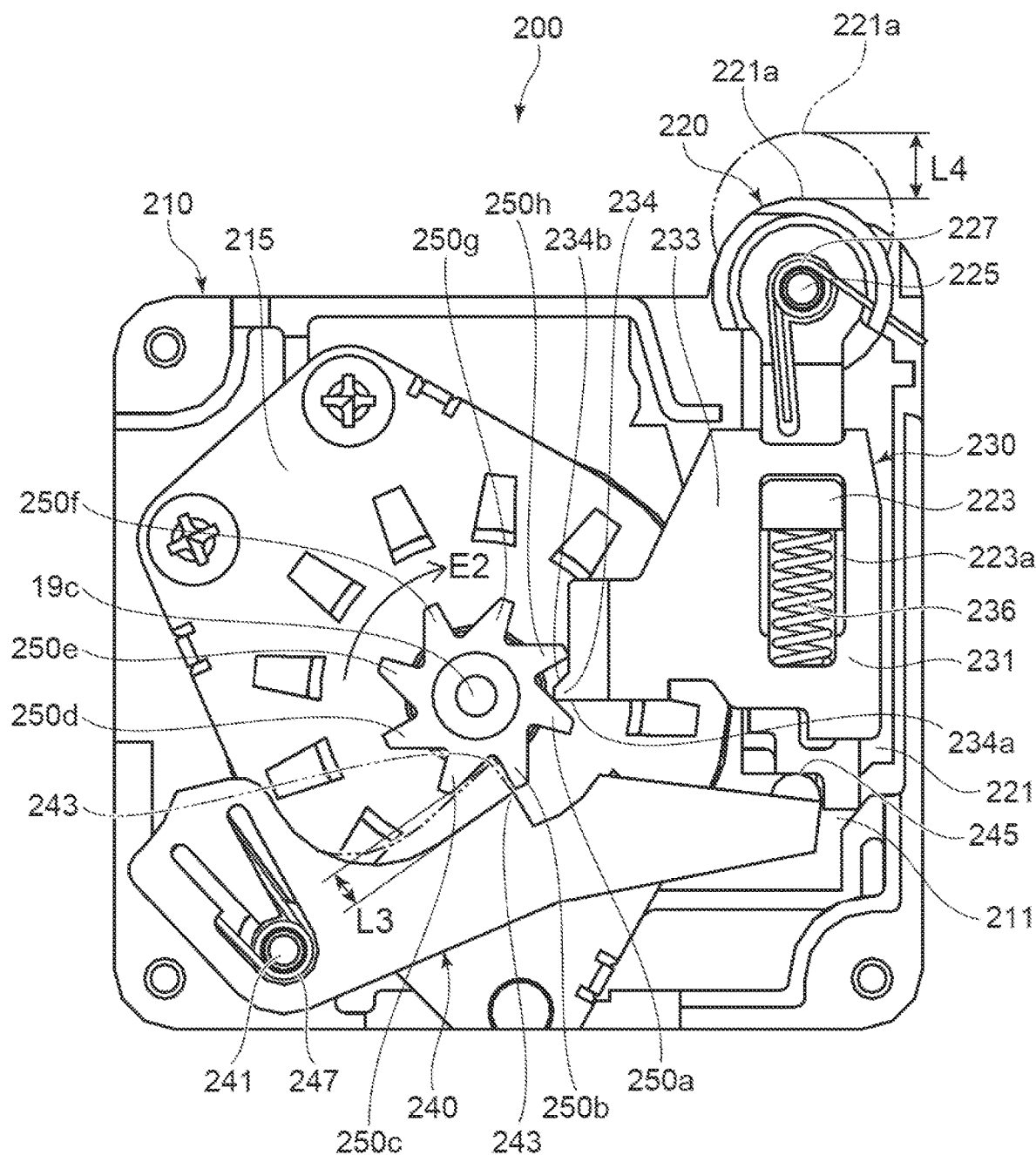
FIG. 41 is an explanatory drawing showing a state when the generator generates power.

FIG. 41 is an explanatory drawing showing a state when the generator generates power.

Figure 42:
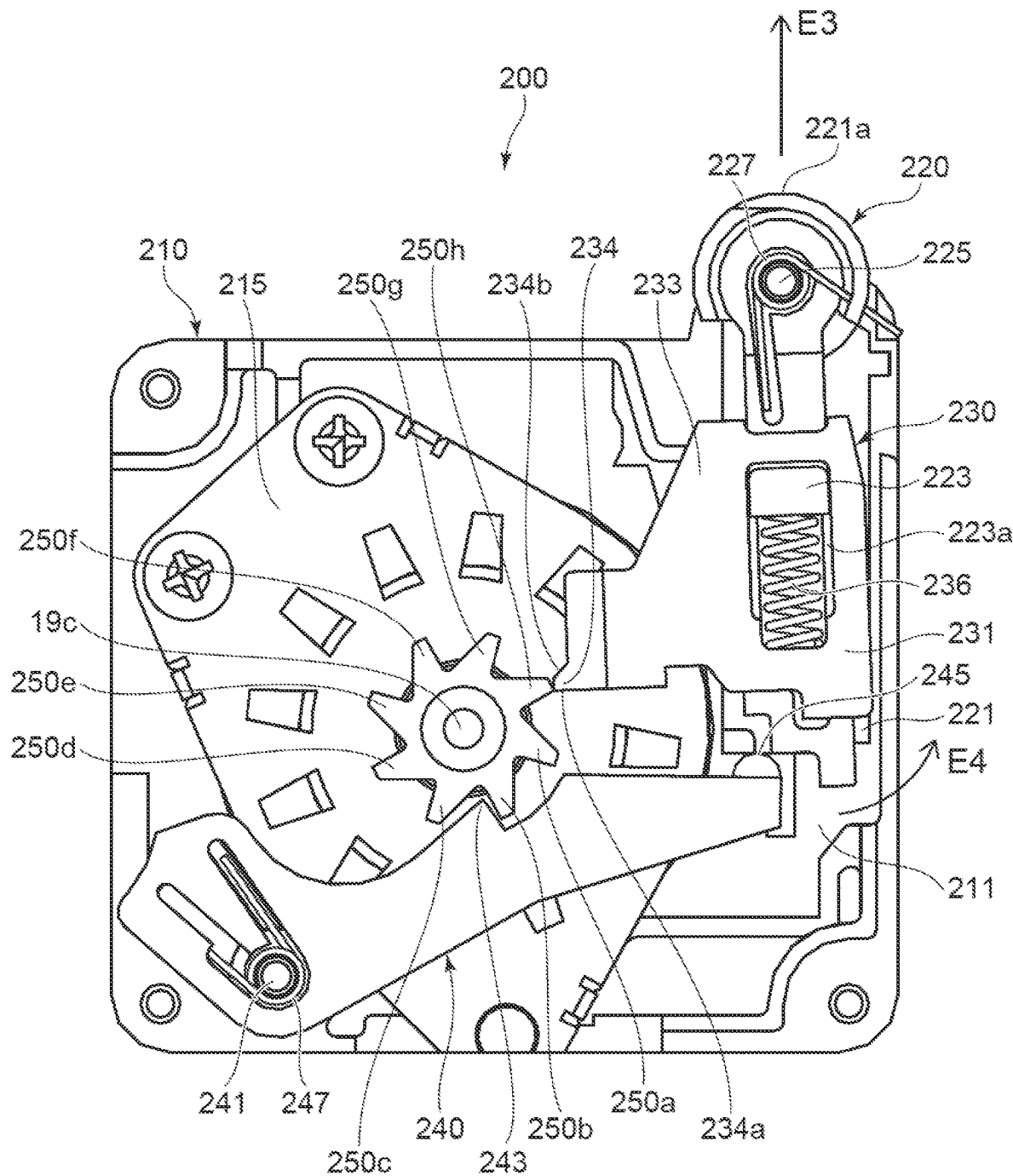
FIG. 42 is an explanatory drawing showing a state when the input to the input part is released.

FIG. 42 is an explanatory drawing showing a state when the input to the input part is released.

First, when the operation button 3 is not operated as shown in FIG. 39, the input part 221a is at the initial position, and the wheel 250 and the rotor 19b are at start positions. Then, when the operation button 3 is operated, the link mechanism 4 presses the input part 221a. Accordingly, as shown in FIG. 40, the force F (the operating force) acts on the input part 221a; and the moving member 220 moves downward.

The input to the input part 221a is transmitted to the transmission part 230 via the second elastic member 236. The abutment part 234 of the transmission part 230 presses the protruding part 250a of the wheel 250. At this time, the lock part 243 of the rod-like body 240 restricts the rotation of the wheel 250 by abutting the protruding part 250c of the wheel 250. Accordingly, the transmission part 230 moves upward relative to the moving member 220 against the urging force of the second elastic member 236. In other words, even when the input part 221a is pressed and the moving member 220 moves downward, only the moving member 220 moves in the arrow E1-direction (downward) without the transmission part 230 moving from the current position. Accordingly, the second elastic member 236 stores energy (a spring force) by being contracted.

When the input part 221a is pressed, the moving member 220 presses the lock part operation unit 245 of the rod-like body 240 downward. Accordingly, the rod-like body 240 is rotated clockwise around the shaft part 241 as a rotary fulcrum. The lock part 243 moves downward (in a direction away from the wheel 250) due to the rotation of the rod-like body 240.

As shown in FIG. 41, when the force F further acts on the input part 221a and the input part 221a moves to the prescribed position, the lock part 243 is released from the wheel 250 by the rod-like body 240 moving further downward. In other words, the rotation restriction of the wheel 250 is released when the input part 221a moves to the prescribed position. Accordingly, the transmission part 230 is moved downward by the urging force of the second elastic member 236; and the wheel 250 is rotated in the clockwise direction.

The rotor 19b of the generator 19 is rotated by rotating the wheel 250 in the arrow E2-direction (the clockwise direction). Accordingly, a current flows in the coils 19a2 of the generator 19 (power is generated).

When the input to the input part 221a is released as shown in FIG. 42, the rod-like body 240 rotates in the counterclockwise direction around the shaft part 241 as the rotary fulcrum due to the urging force of the third elastic member 247. Accordingly, the lock part operation unit 245 of the rod-like body 240 presses the moving member 220 in the arrow E3-direction (upward). In other words, the input part 221a is returned from the prescribed position to the initial position by the urging force of the third elastic member 247. The lock part 243 is inserted between the protruding part 250b and the protruding part 250c of the wheel 250.

In such a case, the sloped surface 234b of the abutment part 234 of the transmission part 230 is pressed by the protruding part 250h of the wheel 250. Accordingly, the transmission part 230 and the second member 223 of the moving member 220 rotate in the arrow E4-direction (the counterclockwise direction) with respect to the first member 221 against the urging force of the first elastic member 227. When the abutment part 234 moves past the protruding part 250h of the wheel 250, the transmission part 230 and the second member 223 are rotated in the clockwise direction by the urging force of the first elastic member 227. Accordingly, the abutment part 234 is inserted between the protruding part 250h and the protruding part 250g of the wheel 250. Then, the input part 221a returns to the initial position, and the power generation module 200 waits for the next input to the input part 221a.

It is sufficient for the state to be maintained in which the rotor 19b remains at the current pole and does not move to the adjacent pole when the input part 221a moves from the prescribed position to the initial position. In other words, the wheel 250 and the rotor 19b are allowed to move (rotate) in a range in which the rotor 19b does not move to the adjacent pole. In other words, the wheel 250 and the rotor 19b may have a slight reverse rotation when the input part 221a moves from the prescribed position to the initial position.

Similarly to the power generation module 10 according to the first embodiment, the power generation module 200 according to the sixth embodiment also can efficiently store energy in the second elastic member 236 because the wheel 250 and the rotor 19b are not rotated while the input part 221a moves from the initial position to the prescribed position. Also, cogging torque due to the generator 19 can be suppressed because the rotor 19b of the generator 19 does not rotate while the input part 221a moves from the initial position to the prescribed position. As a result, the operationability of the remote control device 1 can be improved.

Here, when the input part 221a is pressed, the second elastic member 236 stores energy by being contracted. At this time, the reaction force (the urging force) of the second elastic member 236 acts on the lock part 243. A friction force is generated between the lock part 243 and the wheel 250 by the reaction force when the lock part 243 moves in a direction away from the wheel 250. Accordingly, the operating force of the input part 221a (the operation button 3) is the sum of the reaction force of the second elastic member 236 and the friction force of the lock part 243.

As shown in FIG. 39, the rod-like body 240 includes the lock part 243 and the lock part operation unit 245. The lock part 243 and the lock part operation unit 245 rotate around the same rotary fulcrum (the shaft part 241) according to the movement of the input part 221a. A distance L1 from the rotary fulcrum (the shaft part 241) to the lock part operation unit 245 is greater than a distance L2 from the rotary fulcrum (the shaft part 241) to the lock part 243.

Accordingly, as shown in FIG. 41, a distance L3 that the lock part 243 moves to release the restriction of the rotor 19b is less than a distance L4 that the input part 221a moves from the initial position to the prescribed position. The lock part operation unit 245 is positioned directly under the input part 221a. Accordingly, the movement distance of the lock part operation unit 245 is equal to the movement distance L4 of the input part 221a.

The lock part 243 is located further toward the rotary fulcrum side than the lock part operation unit 245. Accordingly, due to the leverage principle, in the rod-like body 240, the distance L3 for the lock part 243 to release the rotation restriction of the wheel 250 is less than the distance L4 that the input part 221a and the lock part operation unit 245 move. As a result, the effects of the friction force between the lock part 243 and the wheel 250 can be reduced when the operation button 3 is operated.

The transmission part 230 collides with the bottom surface of the recess 223a of the moving member 220 when generating power. In other words, the transmission part 230 collides with the movable part (the moving member 220) inside the main part 210 after the energy stored in the second elastic member 236 is released and the rotatable member (the wheel 250) is rotated. The main part 210 is covered with a cover. Because the transmission part 230 collides with the movable part inside the main part 210, the collision sound can be less than when the transmission part 230 collides with the main part 210. Discomfort of the user due to an abnormal noise can be suppressed thereby.

The third elastic member 247 is the first return elastic member that returns the movable part (the moving member 220 and the rod-like body 240) to the original position when the energy (the input) to the input part 221a is released. The third elastic member 247 (the first return elastic member) connects the main part 210 and the rod-like body 240. The movable part can be returned to the initial position by the third elastic member 247 after the power generation thereby. Also, the third elastic member 247 can absorb the collision energy when the transmission part 230 collides with the movable part.

The transmission part 230 moves in the same direction as the movement direction of the movable part. In other words, when the force F acts on the input part 221a, the moving member 220 and the rod-like body 240 move together downward. Then, the transmission part 230 is moved downward by the urging force of the second elastic member 236 when the rotation restriction of the wheel 250 by the lock part 243 is released. In such a case, the transmission part 230 collides with the moving member 220 included in the movable part after rotating the wheel 250. Thus, the collision energy of the transmission part 230 when the transmission part 230 and the moving member 220 collide can be dissipated in the movement direction of the moving member 220 because the movement directions of the transmission part 230 and the moving member 220 are the same direction (down). Accordingly, the collision sound between the transmission part 230 and the moving member 220 can be small.

The transmission part 230 may collide with the movable part while the movable part is moving. In other words, the rotation restriction of the wheel 250 by the lock part 243 may be released while the movable part (the moving member 220) is moving. Accordingly, the transmission part 230 and the movable part can collide while the relative velocity between the transmission part 230 and the movable part is small. Accordingly, the collision sound between the transmission part 230 and the movable part can be small.

The power generation module 200 further includes the second return elastic member (the first elastic member 227) that returns, to the original position, the transmission part 230 that moved in a direction away from the rotatable member (the wheel 250) when the input of the energy to the input part 221a was released and the movable part (the moving member 220 and the rod-like body 240) returned to the original position. The transmission part 230 moves together with the second member 223 in a direction away from the wheel 250. The first elastic member 227 returns, to the space between the protruding parts of the wheel 250, the abutment part 234 of the transmission part 230 that moved in the direction away from the wheel 250 by being pressed by the wheel 250. Accordingly, the first elastic member 227 can return the transmission part 230 to the original position after the power generation.

FIGS. 43 to 48 show a power generation module 300 according to a seventh embodiment of the invention. The power generation module 300 according to the seventh embodiment shows when the movement distance of an input part 342 and the movement distance of a lock part 343 are different. According to the seventh embodiment, the same components as those of the first embodiment are marked with the same reference numerals; and a description is omitted.

Figure 43:
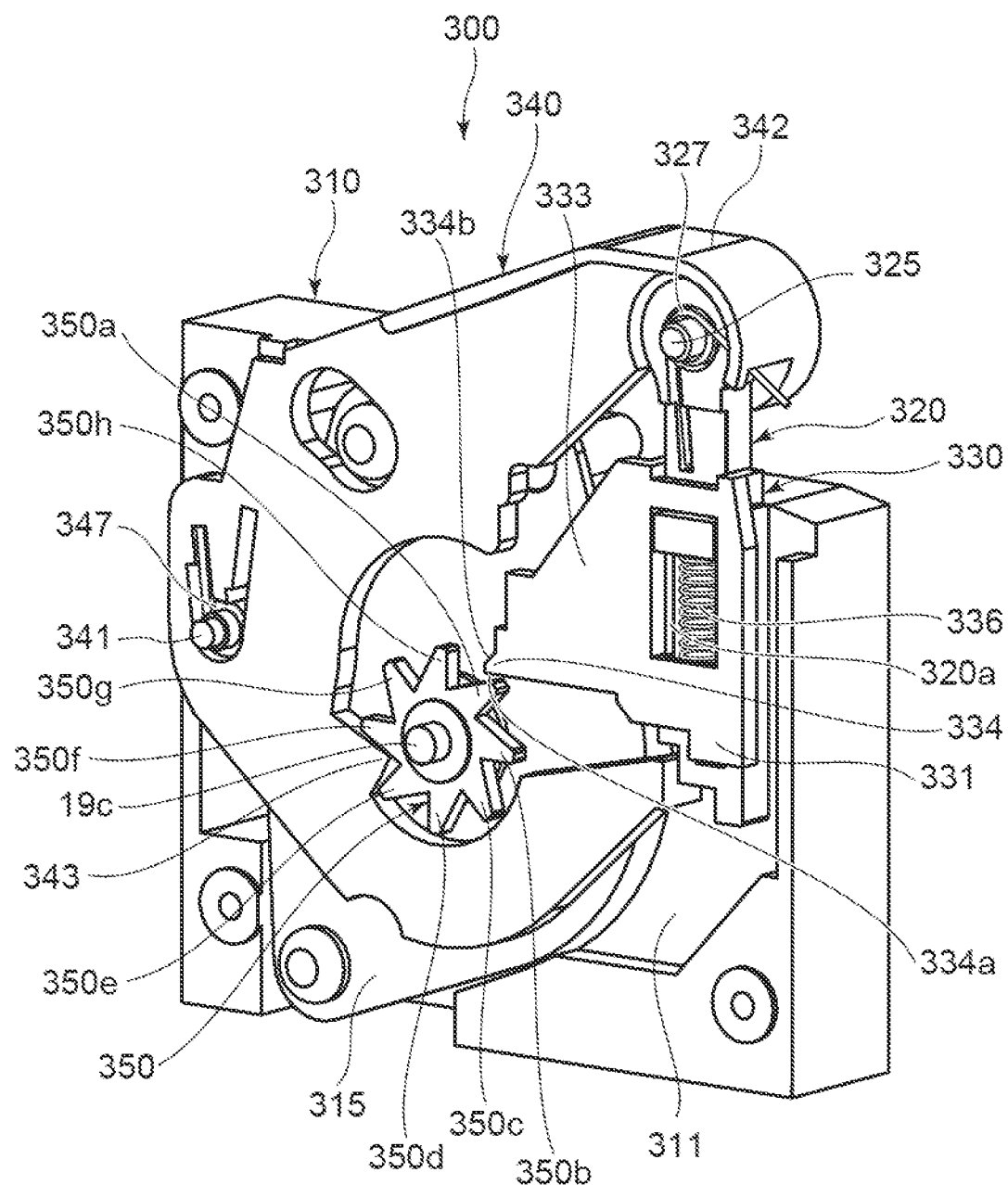
FIG. 43 is a perspective view showing the power generation module according to the seventh embodiment of the invention.
Figure 43:
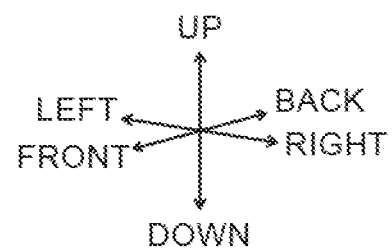

FIG. 43 is a perspective view showing the power generation module according to the seventh embodiment of the invention.

Figure 44:
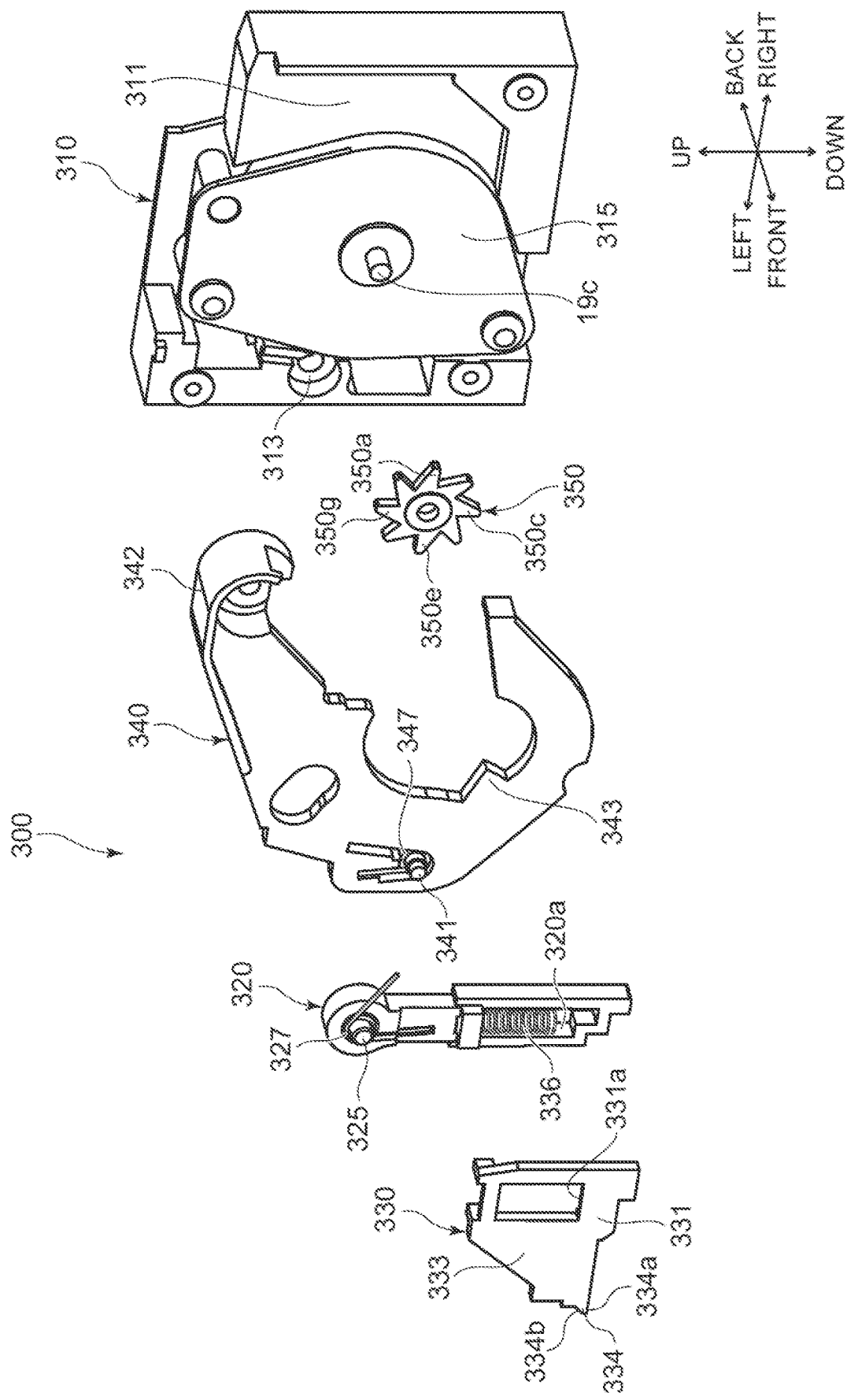
FIG. 44 is an exploded perspective view showing the disassembled power generation module of FIG. 43.

FIG. 44 is an exploded perspective view showing the disassembled power generation module of FIG. 43.

A main part 310 includes a guide part 311 slidably guiding a moving member 320, and a mounting part 313 to which a plate-shaped body 340 is mounted. In the example, the generator 19 is located inside the main part 310. As shown in FIGS. 43 and 44, the generator 19 is covered with a cover 315. In such a case, the rotary shaft 19c of the generator 19 protrudes frontward from the cover 315.

The moving member 320 is mounted inside the guide part 311 of the main part 310 to be slidable in the vertical direction. The moving member 320 moves along the guide part 311. The upper end side of the moving member 320 is rotatably mounted with respect to the plate-shaped body 340 that is described below via a shaft part 325. The moving member 320 includes a recess 320a. A second elastic member 336 that is described below is located in the recess 320a.

A first elastic member 327 is located between the moving member 320 and the plate-shaped body 340. For example, the first elastic member 327 is made of a torsion coil spring and is wound on the outer circumference of the shaft part 325. One end of the first elastic member 327 engages the moving member 320; and the other end of the first elastic member 327 engages the plate-shaped body 340. The first elastic member 327 urges the moving member 320 in the clockwise direction. The first elastic member 327 is the second return elastic member that returns, to the original position, a transmission part 330 that moved in a direction away from the rotatable member (a wheel 350) when the input of the energy was released and the movable part (the moving member 320 and the plate-shaped body 340) returned to the original position.

The transmission part 330 is positioned frontward of the moving member 320 and is mounted to the moving member 320 to be slidable in the vertical direction. The transmission part 330 includes a mounting part 331 mounted to the moving member 320, and an extension part 333 that extends from the mounting part 331 toward the wheel 350 that is described below. The mounting part 331 includes a receiving part 331a that supports the lower end side of the second elastic member 336. The receiving part 331a is positioned at the lower end side of the recess 320a of the moving member 320.

The extension part 333 includes an abutment part 334 that abuts protruding parts 350a to 350h of the wheel 350. The abutment part 334 is positioned between the protruding part of the wheel 350. The abutment part 334 includes a pressing surface 334a that presses the protruding parts 350a to 350h when the lock part 343 that is described below is released, and a sloped surface 334b that presses the protruding parts 350a to 350h when the input to the input part 342 is released.

The second elastic member 336 is located between the moving member 320 and the transmission part 330. The second elastic member 336 is, for example, a compression coil spring. One end (the upper end side) of the second elastic member 336 is supported by the upper surface of the recess 320a of the moving member 320; and the other end (the lower end side) of the second elastic member 336 is supported by the receiving part 331a of the transmission part 330. Accordingly, the second elastic member 336 urges the transmission part 330 downward. The second elastic member 336 is an elastic member that stores the energy of the force input to the input part 342. The transmission part 330 transmits the energy stored in the second elastic member 336 to the wheel 350.

The plate-shaped body 340 is mounted to the mounting part 313 of the main part 310 with a shaft part 341 as a rotary fulcrum. The plate-shaped body 340 is formed in a C-shape surrounding the wheel 350. The plate-shaped body 340 includes the input part 342 pressed by the link mechanism 4, and the lock part 343 that is positioned inside the adjacent protruding parts 350a to 350h of the wheel 350 and restricts the rotation of the rotor 19b by the transmission part 330. The moving member 320 and the plate-shaped body 340 are movable parts that move with respect to the main part 310 when the operating force (the energy) is input to the input part 342.

The input part 342 protrudes from the main part 310. The moving member 320 is mounted below the input part 342. The plate-shaped body 340 extends from the input part 342 to surround the periphery of the wheel 350 below the moving member 320. The input part 342 is a lock part operation unit that is the point of force for moving the lock part 343. The plate-shaped body 340 rotates clockwise around the shaft part 341 as a rotary fulcrum when the input part 342 (the lock part operation unit) is pressed by the link mechanism 4. In other words, the input part 342 and the lock part 343 rotate around the same rotary fulcrum.

A third elastic member 347 is located between the plate-shaped body 340 and the main part 310. For example, the third elastic member 347 is made of a torsion coil spring and is wound on the outer circumference of the shaft part 341. One end of the third elastic member 347 engages the plate-shaped body 340; and the other end of the third elastic member 347 engages the main part 310. The third elastic member 347 urges the plate-shaped body 340 in the counterclockwise direction. In other words, the plate-shaped body 340 pulls the moving member 320 upward by the urging force of the third elastic member 347 when the input to the input part 342 is released. In other words, the third elastic member 347 is the first return elastic member that returns the movable part (the moving member 320 and the plate-shaped body 340) to the original position when the energy (the input) to the input part 342 is released. The third elastic member 347 (the first return elastic member) connects the main part 310 and the plate-shaped body 340 included in the movable part.

The wheel 350 is positioned inside the main part 310 and located at the rotary shaft 19c of the generator 19. The wheel 350 is included in the rotatable member of the invention. The rotary shaft 19c of the generator 19 is mounted to the central part of the wheel 350. Accordingly, the rotary shaft 19c of the generator 19 can be rotated by rotating the wheel 350. In other words, the wheel 350 and the rotary shaft 19c rotate together in the same direction. The wheel 350 is rotated by the pressing of the transmission part 330 due to the energy (the urging force) of the second elastic member 336.

The wheel 350 includes the multiple (in the example, eight) protruding parts 350a to 350h spreading radially from the central part. The wheel 350 is rotated (a forward rotation) in the clockwise direction by the protruding parts 350a to 350h being pressed by the abutment part 334 of the transmission part 330. The number of the protruding parts 350a to 350h may be more or less than eight.

As shown in FIG. 43, the protruding part (in the example, the protruding part 350e) abuts the lock part 343 while the input part 342 moves from the initial position to the prescribed position. Accordingly, the lock part 343 restricts the rotation of the wheel 350 in the clockwise direction (the forward rotation).

Thus, the power generation module 300 according to the seventh embodiment has a configuration such as that described above, and operations of the power generation module 300 will now be described with reference to FIGS. 45 to 48.

Figure 45:
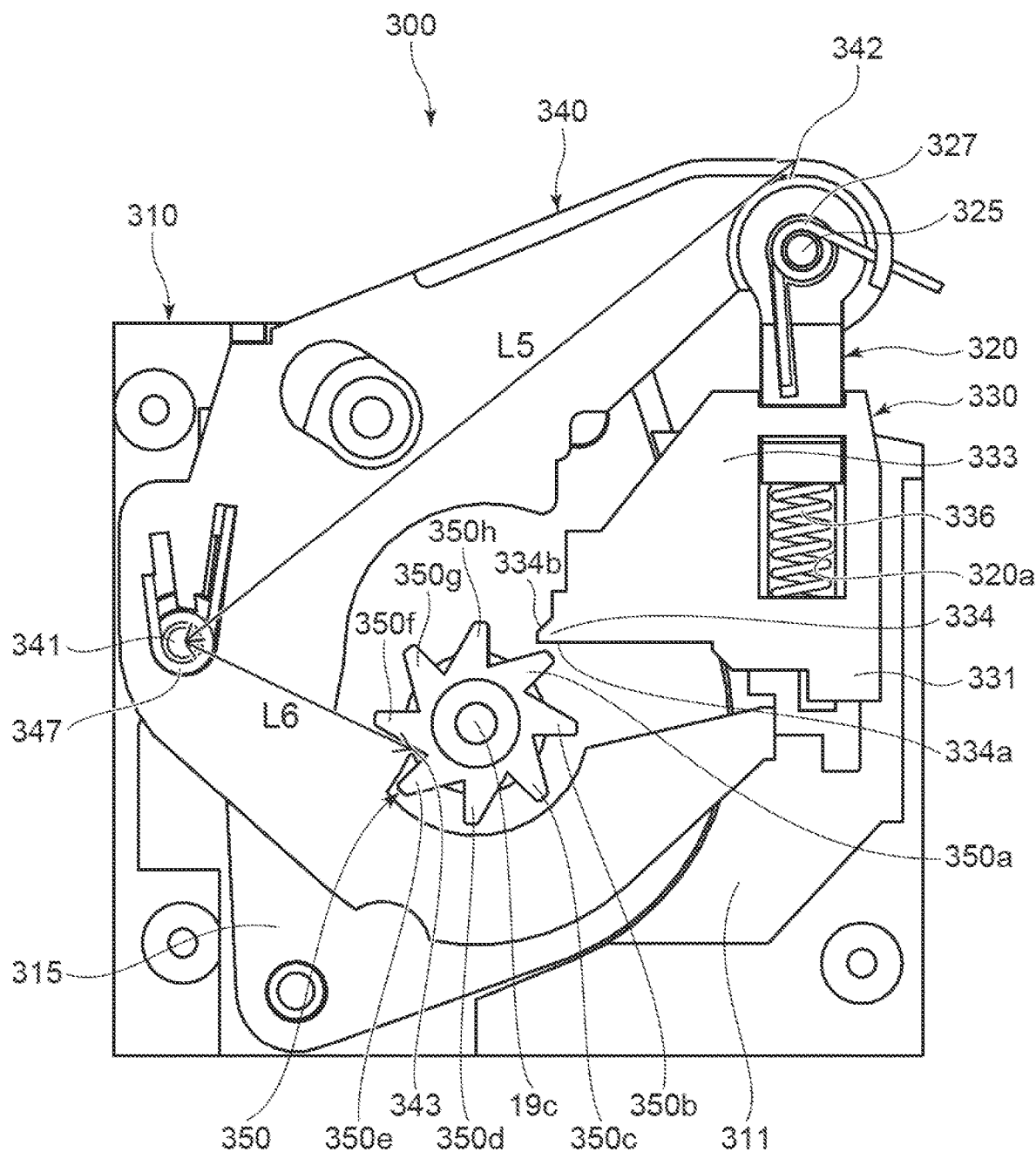
FIG. 45 is an explanatory drawing showing a state when there is no input to the input part.

FIG. 45 is an explanatory drawing showing a state when there is no input to the input part.

Figure 46:
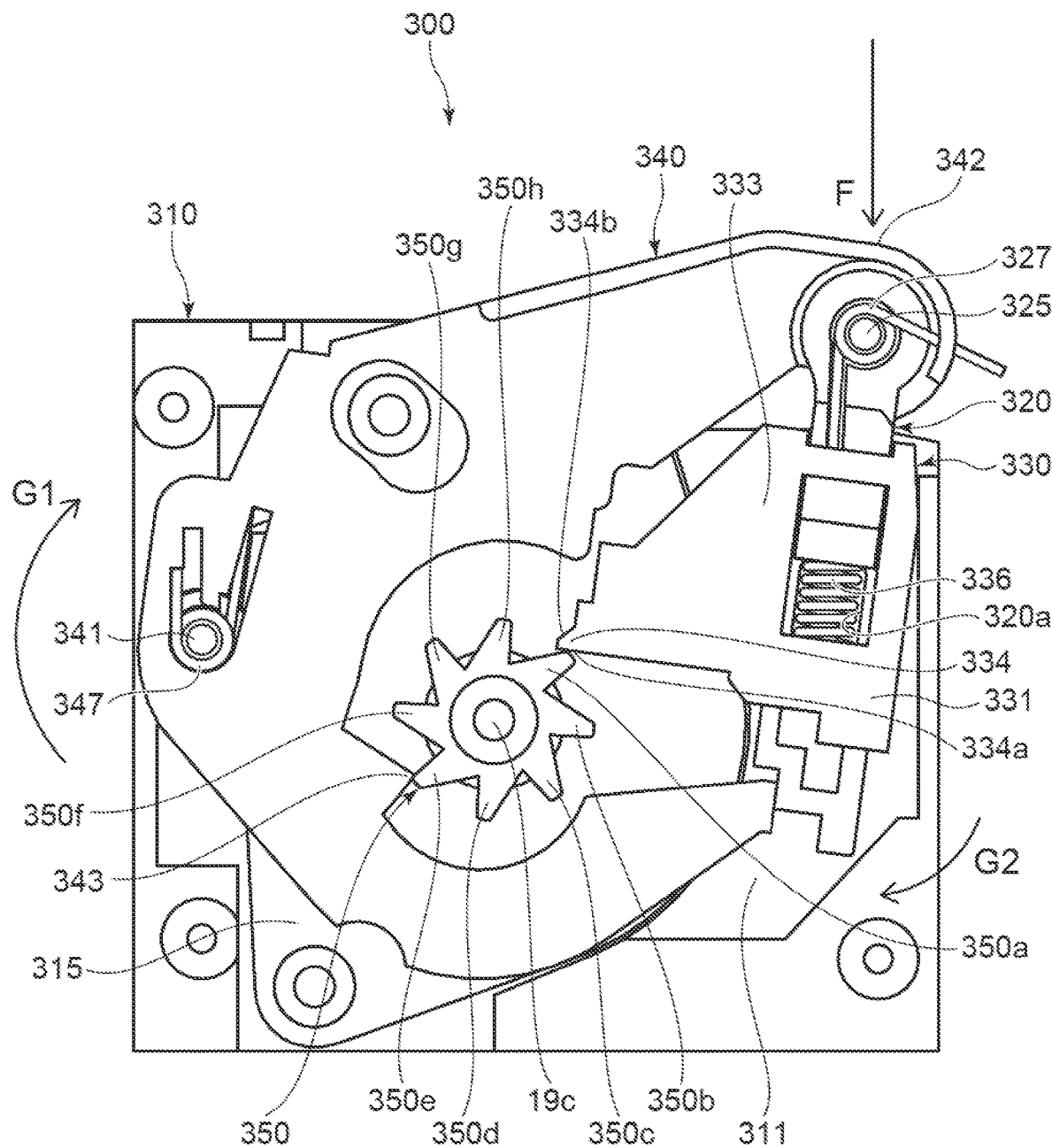
FIG. 46 is an explanatory drawing showing a state when an input is provided to the input part.

FIG. 46 is an explanatory drawing showing a state when an input is provided to the input part.

Figure 47:
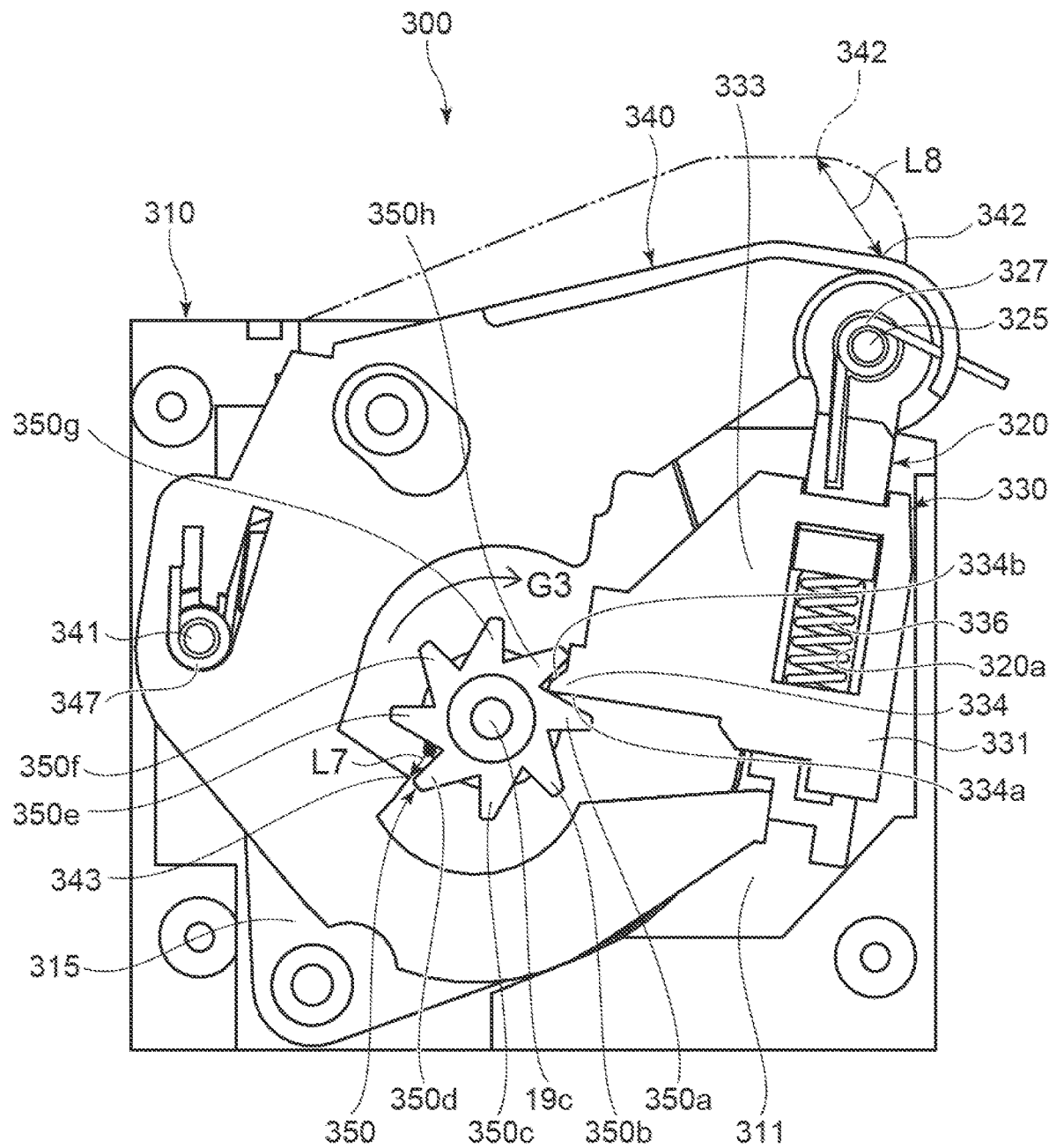
FIG. 47 is an explanatory drawing showing a state when the generator generates power.

FIG. 47 is an explanatory drawing showing a state when the generator generates power.

Figure 48:
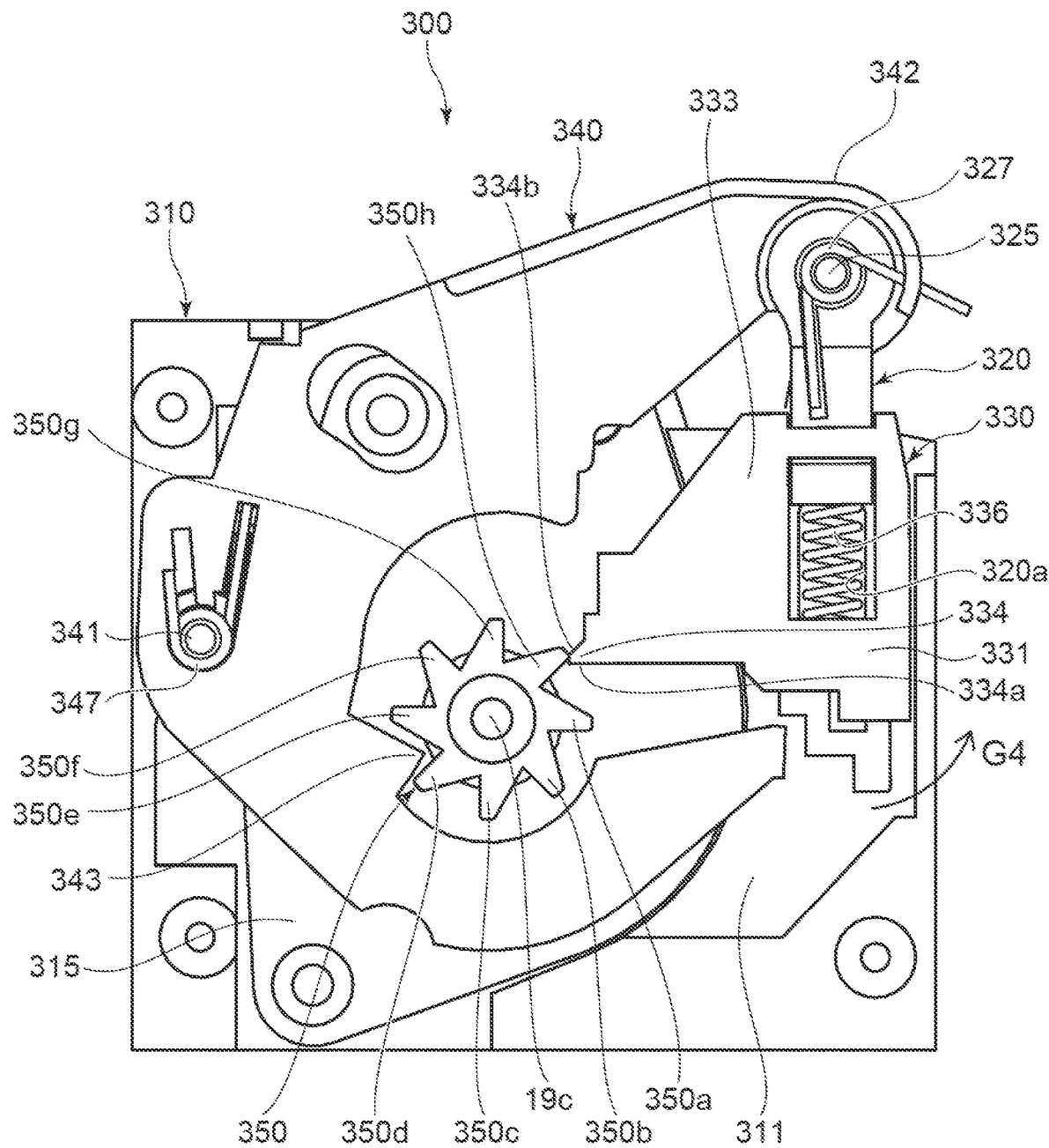
FIG. 48 is an explanatory drawing showing a state when the input to the input part is released.

FIG. 48 is an explanatory drawing showing a state when the input to the input part is released.

First, when the operation button 3 is not operated as shown in FIG. 45, the input part 342 is at the initial position, and the wheel 350 and the rotor 19b are at start positions. Then, when the operation button 3 is operated, the link mechanism 4 presses the input part 342. Accordingly, as shown in FIG. 46, the force F (the operating force) acts on the input part 342; and the plate-shaped body 340 rotates in the arrow G1-direction (the clockwise direction) around the shaft part 341 as a rotary fulcrum. Also, the moving member 320 moves downward while tilting in the arrow G2-direction.

The input to the input part 342 is transmitted to the transmission part 330 via the second elastic member 336. The abutment part 334 of the transmission part 330 presses the protruding part 350a of the wheel 350. At this time, the lock part 343 of the plate-shaped body 340 restricts the rotation of the wheel 350 by abutting the protruding part 350e of the wheel 350. Accordingly, the transmission part 330 moves upward relative to the moving member 320 against the urging force of the second elastic member 336. In other words, even when the input part 342 is pressed and the moving member 320 moves downward, only the moving member 320 moves downward without the transmission part 330 moving downward. Accordingly, the second elastic member 336 stores energy (a spring force) by being contracted. The lock part 343 is moved in a direction away from the wheel 350 by the rotation of the plate-shaped body 340.

As shown in FIG. 47, when the force F further acts on the input part 342 and the input part 342 moves to the prescribed position, the lock part 343 is released from the wheel 350 by further rotation of the plate-shaped body 340. In other words, the rotation restriction of the wheel 350 is released when the input part 342 moves to the prescribed position. Accordingly, the transmission part 330 rotates the wheel 350 in the clockwise direction by moving downward due to the urging force of the second elastic member 336.

The wheel 350 rotates the rotor 19b of the generator 19 by rotating in the arrow G3-direction (the clockwise direction). Accordingly, a current flows in the coils 19a2 of the generator 19 (power is generated).

When the input to the input part 342 is released as shown in FIG. 48, the plate-shaped body 340 is rotated in the counterclockwise direction around the shaft part 341 as a rotary fulcrum by the urging force of the third elastic member 347. Accordingly, the plate-shaped body 340 pulls the moving member 320 upward as the input part 342 returns from the prescribed position to the initial position. The lock part 343 is inserted between the protruding part 350d and the protruding part 350e of the wheel 350.

In such a case, the sloped surface 334b of the abutment part 334 of the transmission part 330 presses the protruding part 350h of the wheel 350. Accordingly, the transmission part 330 and the moving member 320 rotate in the arrow G4-direction (the counterclockwise direction) against the urging force of the first elastic member 327. The transmission part 330 and the moving member 320 are rotated in the clockwise direction by the urging force of the first elastic member 327 when the abutment part 334 moves past the protruding part 350h of the wheel 350. Accordingly, the abutment part 334 is inserted between the protruding part 350h and the protruding part 350g of the wheel 350. Then, the input part 342 returns to the initial position, and the power generation module 300 waits for the next input to the input part 342.

It is sufficient for the state to be maintained in which the rotor 19b remains at the current pole and does not move to the adjacent pole when the input part 342 moves from the prescribed position to the initial position. In other words, the wheel 350 and the rotor 19b are allowed to move (rotate) in a range in which the rotor 19b does not move to the adjacent pole. In other words, the wheel 350 and the rotor 19b may have a slight reverse rotation when the input part 342 moves from the prescribed position to the initial position.

Similarly to the power generation module 10 according to the first embodiment, the power generation module 300 according to the seventh embodiment also can efficiently store energy in the second elastic member 336 because the wheel 350 and the rotor 19b are not rotated while the input part 342 moves from the initial position to the prescribed position. Also, cogging torque due to the generator 19 can be suppressed because the rotor 19b of the generator 19 does not rotate while the input part 342 moves from the initial position to the prescribed position. As a result, the operationability of the remote control device 1 can be improved.

Here, the second elastic member 336 stores energy by being contracted when the input part 342 is pressed. At this time, the reaction force (the urging force) of the second elastic member 336 acts on the lock part 343. A friction force is generated between the lock part 343 and the wheel 350 by the reaction force when the lock part 343 moves in a direction away from the wheel 350. Accordingly, the operating force of the input part 342 (the operation button 3) is the sum of the reaction force of the second elastic member 336 and the friction force of the lock part 343.

As shown in FIG. 45, the plate-shaped body 340 includes the lock part 343 and the lock part operation unit (the input part 342). The lock part 343 and the lock part operation unit rotate around the same rotary fulcrum (the shaft part 341) according to the movement of the input part 342. A distance L5 from the rotary fulcrum (the shaft part 341) to the lock part operation unit (the input part 342) is greater than a distance L6 from the rotary fulcrum (the shaft part 341) to the lock part 343.

Accordingly, as shown in FIG. 47, a distance L7 that the lock part 343 moves to release the restriction of the rotor 19b is less than a distance L8 that the input part 342 moves from the initial position to the prescribed position.

The lock part 343 is located further toward the rotary fulcrum side than the lock part operation unit. Accordingly, in the plate-shaped body 340, due to the leverage principle, the distance L7 for the lock part 343 to release the rotation restriction of the wheel 350 is less than the distance L8 that the lock part operation unit (the input part 342) moves. As a result, the effects of the friction force between the lock part 343 and the wheel 350 can be reduced when the operation button 3 operates.

The transmission part 330 collides with the bottom surface of the recess 320a of the moving member 320 when generating power. In other words, the transmission part 330 collides with the movable part (the moving member 320) inside the main part 310 after the energy stored in the second elastic member 336 is released and the rotatable member (the wheel 350) is rotated. The main part 310 is covered with a cover. Because the transmission part 330 collides with the movable part inside the main part 310, the collision sound can be less than when the transmission part 330 collides with the main part 310. Discomfort of the user due to an abnormal noise can be suppressed thereby.

The third elastic member 347 is the first return elastic member that returns the movable part (the moving member 320 and the plate-shaped body 340) to the original position when the energy (the input) to the input part 342 is released. The third elastic member 347 (the first return elastic member) connects the main part 310 and the plate-shaped body 340. Accordingly, the movable part can be returned to the initial position by the third elastic member 347 after the power generation. Also, the third elastic member 347 can absorb the collision energy when the transmission part 330 collides with the movable part.

The transmission part 330 moves in the same direction as the movement direction of the moving member 320 included in the movable part. In other words, the moving member 320 moves downward when the force F acts on the input part 342. Then, the transmission part 330 is moved downward by the urging force of the second elastic member 336 when the rotation restriction of the wheel 350 by the lock part 343 is released. In such a case, the transmission part 330 collides with the moving member 320 included in the movable part after rotating the wheel 350. Thus, the collision energy of the transmission part 330 can be dissipated in the movement direction of the moving member 320 when the transmission part 330 and the moving member 320 collide because the movement directions of the transmission part 330 and the moving member 320 are the same direction (down). Accordingly, the collision sound between the transmission part 330 and the moving member 320 can be small.

The transmission part 330 may collide with the movable part while the movable part is moving. In other words, the rotation restriction of the wheel 350 by the lock part 343 may be released while the movable part (the moving member 320) is moving. Accordingly, the transmission part 330 and the movable part can collide while the relative velocity between the transmission part 330 and the movable part is small. Accordingly, the collision sound between the transmission part 330 and the movable part can be small.

The power generation module 300 further includes the second return elastic member (the first elastic member 327) that returns, to the original position, the transmission part 330 that moved in a direction away from the rotatable member (the wheel 350) when the input of the energy to the input part 342 was released and the movable part (the moving member 320 and the plate-shaped body 340) returned to the original position. The transmission part 330 moves in a direction away from the wheel 350 together with the moving member 320. The first elastic member 327 returns, to the space between the protruding parts of the wheel 350, the abutment part 334 of the transmission part 330 that moved in a direction away from the wheel 350 by being pressed by the wheel 350. Accordingly, the first elastic member 327 can return the transmission part 330 to the original position after the power generation.

An example is described in the third embodiment described above in which the third elastic member 67 and the block body 65 of the second wheel 60 are used to maintain the non-rotating state of the rotor 19b of the generator 19 when the input part 43a returns from the prescribed position to the initial position. However, aspects of the invention are not limited thereto; for example, the withdrawing part 75 according to the fourth embodiment may be used instead of the block body 65 and the third elastic member 67. In other words, the cylindrical part 61 of the second wheel 60 may be mounted to the rotary shaft 19c of the generator 19; and the withdrawing part 75 according to the fourth embodiment may be used.

An example is described in the embodiments described above in which the rotatable member is a wheel. However, aspects of the invention are not limited thereto; for example, the rotatable member may convert a piston action into rotational motion as in a reciprocating engine. In other words, the rotatable member may have any mechanism that can rotate the rotor of a generator.

Examples are described in the embodiments described above in which the power generation modules 10, 20, 40, 70, 100, 200, and 300 are applied to the remote control device 1. However, aspects of the invention are not limited thereto; for example, a power generation module according to an aspect of the invention is applicable to an IoT device. For example, an IoT device may include sensors provided in the IoT device, a transmitter that transmits the state of the IoT device, and a notification part that notifies the states of the sensors provided in the IoT device. More specifically, a power generation module may generate power due to the opening and closing of a door, the open or closed state of the door may be detected by a sensor, and the open or closed state may be notified or transmitted to a user and/or a manager by the transmitter or the notification part. Also, when a user uses a toilet paper holder, the existence or absence of paper can be notified or transmitted to a manager by the power generation module generating power according to the rotation of the paper roll by the user.

Embodiments may include the following configurations.

Configuration 1

A power generation module, comprising:
an input part;
an elastic member configured to store energy input to the input part;
a generator generating power when a rotor of the generator is rotated;
a rotatable member rotating the rotor;
a transmission part transmitting the energy stored in the elastic member to the rotatable member; and
a lock part restricting a rotation of the rotor by the transmission part,
the energy being stored in the elastic member by the lock part restricting the rotation of the rotor while the input part moves from an initial position to a prescribed position, the restriction of the rotor by the lock part being released and the rotor being rotated by the energy stored in the elastic member when the input part moves to the prescribed position.

Configuration 2

The power generation module according to Configuration 1, wherein
the rotor and the rotatable member are moved to a start position by a magnetic force of the generator when the input part moves from the prescribed position to the initial position.

Configuration 3

The power generation module according to Configuration 1 or 2, wherein
a state is maintained in which the rotor remains at a current pole and does not move to an adjacent pole when the input part moves from the prescribed position to the initial position.

Configuration 4

The power generation module according to any one of Configurations 1 to 3, wherein
the rotatable member includes:
a first wheel rotated by the transmission part; and
a second wheel transmitting a rotation of the first wheel to the rotor,
the transmission part rotates the second wheel and the rotor via the first wheel when the input part has moved to the prescribed position, and
the state is maintained in which the rotor remains at the current pole and does not move to the adjacent pole when the input part moves from the prescribed position to the initial position.

Configuration 5

The power generation module according to any one of Configurations 1 to 3, wherein
the rotatable member includes:
a first wheel rotated by the transmission part; and
a second wheel transmitting a rotation of the first wheel to the rotor,
the first wheel includes:
a disc part; and
a gear part provided in the disc part,
the second wheel includes:
a cylindrical part;
a gear part provided in the cylindrical part, the gear part meshing with the gear part of the first wheel; and
a block body provided to be movable inside the cylindrical part, the block body being mounted to a rotary shaft of the generator,
the transmission part rotates the second wheel and the rotor via the first wheel when the input part has moved to the prescribed position, and
the state is maintained in which the rotor remains at the current pole and does not move to the adjacent pole when the input part moves from the prescribed position to the initial position.

Configuration 6

The power generation module according to any one of Configurations 1 to 3, further comprising:
a withdrawing part allowing the transmission part to withdraw from the rotatable member while maintaining the state in which the rotor remains at the current pole and does not move to the adjacent pole when the input part moves from the prescribed position to the initial position.

Configuration 7

The power generation module according to Configuration 1, wherein
a distance of the lock part moving until the restriction of the rotor is released is less than a distance of the input part moving from the initial position to the prescribed position.

Configuration 8

The power generation module according to Configuration 1, further comprising:
a lock part operation unit used as a point of force for moving the lock part,
the lock part and the lock part operation unit being rotated around a same rotary fulcrum according to the movement of the input part,
a distance from the rotary fulcrum to the lock part operation unit being greater than a distance from the rotary fulcrum to the lock part.

Configuration 9

A remote control device, comprising:
a case;
an operation button located at the case;
a link mechanism moved by an operation of the operation button; and
the power generation module according to one of Configurations 1 to 8,
the power generation module being connected to the link mechanism.

Configuration 10

A power generation module, comprising:
a main part;
a movable part moving with respect to the main part when energy is input;
an elastic member configured to store the energy that is input;
a generator generating power when a rotor of the generator is rotated;
a rotatable member rotating the rotor;
a transmission part transmitting the energy stored in the elastic member to the rotatable member; and
a lock part restricting a rotation of the rotor by the transmission part,
the transmission part colliding with the movable part inside the main part after the energy stored in the elastic member is released and the rotatable member is rotated.

Configuration 11

The power generation module according to Configuration 10, further comprising:
a first return elastic member returning the movable part to an original position when the input of the energy is released,
the first return elastic member connecting the main part and the movable part.

Configuration 12

The power generation module according to Configuration 10 or 11, wherein
the transmission part moves in a same direction as a movement direction of the movable part.

Configuration 13

The power generation module according to Configuration 12, wherein
the transmission part collides with the movable part while the movable part is moving.

Configuration 14

The power generation module according to any one of Configurations 10 to 13, further comprising:
a second return elastic member,
the transmission part that has moved in a direction away from the rotatable member being returned to an original position by the second return elastic member when the input of the energy is released and the movable part is returned to an original position.

Configuration 15

A remote control device, comprising:
a case;
an operation button located at the case;
a link mechanism moved by an operation of the operation button; and
the power generation module according to one of Configurations 10 to 14,
the power generation module being connected to the link mechanism.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, the shape, the dimension, the material, the disposition, the installation feature or the like of the components included in the power generation module and the remote control device are not limited to the illustration and can be appropriately modified. The components included in the embodiments described above may be combined within the extent of technical feasibility, and any combinations of these components also are included in the scope of the invention to the extent that they include the feature of the invention.

What is claimed is:

1. A power generation module, comprising:
an input part;
an elastic member configured to store energy input to the input part;
a generator including a stator and a rotor and generating power when the rotor is rotated with respect to the stator;
a rotatable member rotating the rotor;
a transmission part transmitting the energy stored in the elastic member to the rotatable member; and
a lock part restricting a rotation of the rotor by the transmission part,
the energy being stored in the elastic member by the lock part restricting the rotation of the rotor while the input part moves from an initial position to a prescribed position,
the restriction of the rotor by the lock part being released and the rotor being rotated by the energy stored in the elastic member when the input part moves to the prescribed position, wherein
the rotor and the rotatable member are moved to a start position by a magnetic force of the generator when the input part moves from the prescribed position to the initial position,
the rotatable member includes a central part and multiple protruding parts spreading radially from the central part,
the transmission part transmitting the energy stored in the elastic member to the protruding parts, and
a number of magnetic poles of the stator and a number of magnetic poles of the rotor each are integer multiples of a number of the protruding parts.

2. The module according to claim 1, wherein
a distance of the lock part moving until the restriction of the rotor is released is less than a distance of the input part moving from the initial position to the prescribed position.

3. A remote control device, comprising:
a case;
an operation button located at the case;
a link mechanism moved by an operation of the operation button; and
the module according to claim 1, the module being connected to the link mechanism.

4. A power generation module, comprising:
an input part;
an elastic member configured to store energy input to the input part;
a generator including a stator and a rotor and generating power when the rotor is rotated with respect to the stator;
a rotatable member rotating the rotor;
a transmission part transmitting the energy stored in the elastic member to the rotatable member; and
a lock part restricting a rotation of the rotor by the transmission part,
the energy being stored in the elastic member by the lock part restricting the rotation of the rotor while the input part moves from an initial position to a prescribed position,
the restriction of the rotor by the lock part being released and the rotor being rotated by the energy stored in the elastic member when the input part moves to the prescribed position, wherein
a state is maintained in which the rotor remains at a current pole and does not move to an adjacent pole when the input part moves from the prescribed position to the initial position,
the rotatable member includes a central part and multiple protruding parts spreading radially from the central part,
the transmission part transmitting the energy stored in the elastic member to the protruding parts, and
a number of magnetic poles of the stator and a number of magnetic poles of the rotor each are integer multiples of a number of the protruding parts.

5. The module according to claim 4, wherein
the rotatable member includes:
a first wheel rotated by the transmission part; and
a second wheel transmitting a rotation of the first wheel to the rotor,
the transmission part rotates the second wheel and the rotor via the first wheel when the input part has moved to the prescribed position, and
the state is maintained in which the rotor remains at the current pole and does not move to the adjacent pole when the input part moves from the prescribed position to the initial position.

6. The module according to claim 4, wherein
the rotatable member includes:
a first wheel rotated by the transmission part; and
a second wheel transmitting a rotation of the first wheel to the rotor,
the first wheel includes:
a disc part; and
a gear part provided in the disc part, the second wheel includes:
a cylindrical part;
a gear part provided in the cylindrical part, the gear part meshing with the gear part of the first wheel; and
a block body provided to be movable inside the cylindrical part, the block body being mounted to a rotary shaft of the generator,
the transmission part rotates the second wheel and the rotor via the first wheel when the input part has moved to the prescribed position, and
the state is maintained in which the rotor remains at the current pole and does not move to the adjacent pole when the input part moves from the prescribed position to the initial position.

7. The module according to claim 4, further comprising:
a withdrawing part allowing the transmission part to withdraw from the rotatable member while maintaining the state in which the rotor remains at the current pole and does not move to the adjacent pole when the input part moves from the prescribed position to the initial position.

8. A power generation module, comprising:
an input part;
a moving member configured to move when energy is input to the input part;
an elastic member configured to store the energy input to the input part;
a generator generating power when a rotor of the generator is rotated;
a rotatable member rotating the rotor;
a transmission part transmitting the energy stored in the elastic member to the rotatable member; and
a lock part restricting a rotation of the rotor by the transmission part,
the energy being stored in the elastic member by the lock part restricting the rotation of the rotor while the input part moves from an initial position to a prescribed position,
the restriction of the rotor by the lock part being released and the rotor being rotated by the energy stored in the elastic member when the input part moves to the prescribed position, wherein the module further comprises:
a lock part operation unit used as a point of force for moving the lock part,
the lock part operation unit includes a sloped surface abutting the moving member,
the lock part is rotated when the sloped surface is pressed,
the lock part and the lock part operation unit being rotated around a same rotary fulcrum according to the movement of the input part,
a distance from the rotary fulcrum to the lock part operation unit being greater than a distance from the rotary fulcrum to the lock part.

9. A power generation module, comprising:
a main part;
a movable part moving with respect to the main part when energy is input;
an elastic member configured to store the energy that is input;
a generator generating power when a rotor of the generator is rotated;
a rotatable member rotating the rotor;
a transmission part transmitting the energy stored in the elastic member to the rotatable member; and
a lock part restricting a rotation of the rotor by the transmission part,
the transmission part colliding with the movable part inside the main part after the energy stored in the elastic member is released and the rotatable member is rotated.

10. The module according to claim 9, further comprising:
a first return elastic member returning the movable part to an original position when the input of the energy is released,
the first return elastic member connecting the main part and the movable part.

11. The module according to claim 9, wherein
the transmission part moves in a same direction as a movement direction of the movable part.

12. The module according to claim 11, wherein
the transmission part collides with the movable part while the movable part is moving.

13. The module according to claim 9, further comprising:
a second return elastic member,
the transmission part that has moved in a direction away from the rotatable member being returned to an original position by the second return elastic member when the input of the energy is released and the movable part is returned to an original position.

14. A remote control device, comprising:
a case;
an operation button located at the case;
a link mechanism moved by an operation of the operation button; and
the module according to claim 9,
the module being connected to the link mechanism.

* * * * *